(12) United States Patent
Mochizuki et al.

(10) Patent No.: US 12,132,681 B2
(45) Date of Patent: Oct. 29, 2024

(54) COMMUNICATION SYSTEM

(71) Applicant: Mitsubishi Electric Corporation, Tokyo (JP)

(72) Inventors: Mitsuru Mochizuki, Tokyo (JP); Tadahiro Shimoda, Tokyo (JP); Noriyuki Fukui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/202,568

(22) Filed: May 26, 2023

(65) Prior Publication Data

US 2023/0318789 A1    Oct. 5, 2023

Related U.S. Application Data

(60) Continuation of application No. 17/391,231, filed on Aug. 2, 2021, now abandoned, which is a division of
(Continued)

(30) Foreign Application Priority Data

Aug. 9, 2016 (JP) .................. 2016-156767
Nov. 1, 2016 (JP) .................. 2016-214184

(51) Int. Cl.
*H04L 5/00* (2006.01)
*H04W 72/0446* (2023.01)
(Continued)

(52) U.S. Cl.
CPC ....... *H04L 5/0053* (2013.01); *H04W 72/0446* (2013.01); *H04W 72/21* (2023.01); *H04W 72/23* (2023.01)

(58) Field of Classification Search
None
See application file for complete search history.

(56) References Cited

U.S. PATENT DOCUMENTS 6,782,277 B1    8/2004  Chen et al.
10,225,065 B2   3/2019  Ang
(Continued)

FOREIGN PATENT DOCUMENTS

CN    105453624 A      3/2016
EP    3 383 093 A1    10/2018
(Continued)

OTHER PUBLICATIONS

U.S. Appl. No. 62/344,406, filed Jun. 2, 2016, Kwak et al., "Power Control for Uplink Transmission in New Radio Access Technology".*
(Continued)

*Primary Examiner* — Gregory B Sefcheck
(74) *Attorney, Agent, or Firm* — PROCOPIO, CORY, HARGREAVES & SAVITCH LLP

(57) ABSTRACT

A communication system that can reduce latency while preventing reduction in a transmission rate. An eNB communicates with a UE #1 using a self-contained subframe including a first downlink signal (DL #1) and a first uplink signal (UL #1), and with a UE #2 using a self-contained subframe including a second downlink signal (DL #2) and a second uplink signal (UL #2). The self-contained subframe for the UE #1 includes a first gap duration (Gap #1) during which neither the DL #1 nor the UL #1 is transmitted, between transmission durations of the DL #1 and the UL #1. The self-contained subframe for the UE #2 includes a second gap duration (Gap #2) during which neither the DL #2 nor the UL #2 is transmitted, between transmission durations of the DL #2 and the UL #2. The Gaps #1 and #2 are set to each UE.

18 Claims, 45 Drawing Sheets

Related U.S. Application Data application No. 16/316,753, filed as application No. PCT/JP2017/027852 on Aug. 1, 2017, now Pat. No. 11,115,167.

(51) Int. Cl.
*H04W 72/21* (2023.01)
*H04W 72/23* (2023.01)

(56) References Cited

U.S. PATENT DOCUMENTS

| | | | |
|---|---|---|---|
| 10,524,206 B2* | 12/2019 | Agarwal | H04W 52/0216 |
| 10,560,174 B2* | 2/2020 | He | H04L 1/1812 |
| 10,756,864 B2* | 8/2020 | Seo | H04W 56/0045 |
| 11,595,164 B2* | 2/2023 | Liu | H04L 41/0803 |
| 11,595,953 B2 | 2/2023 | Deenoo | |
| 11,705,982 B2* | 7/2023 | Li | H04L 5/0058 370/329 |
| 2012/0069795 A1 | 3/2012 | Chung et al. | |
| 2013/0322235 A1 | 12/2013 | Khoryaev et al. | |
| 2014/0128109 A1 | 5/2014 | Li et al. | |
| 2015/0117270 A1 | 4/2015 | Um et al. | |
| 2015/0188793 A1* | 7/2015 | Zhao | H04W 74/004 370/242 |
| 2015/0201383 A1 | 7/2015 | Papasakellariou | |
| 2016/0295583 A1* | 10/2016 | Kazmi | H04W 36/0088 |
| 2017/0034842 A1* | 2/2017 | Xu | H04W 64/00 |
| 2017/0085346 A1 | 3/2017 | Tiirola | |
| 2017/0201968 A1* | 7/2017 | Nam | H04L 5/0007 |
| 2017/0208568 A1* | 7/2017 | Nam | H04W 72/23 |
| 2017/0208583 A1* | 7/2017 | Jiang | H04L 5/0057 |
| 2017/0215188 A1 | 7/2017 | Kim | |
| 2017/0353947 A1* | 12/2017 | Ang | H04L 5/0048 |
| 2017/0366311 A1 | 12/2017 | Iyer | |
| 2017/0367110 A1 | 12/2017 | Li | |
| 2017/0367120 A1* | 12/2017 | Murray | H04B 7/0695 |
| 2018/0063820 A1 | 3/2018 | Xiong | |
| 2018/0077680 A1 | 3/2018 | Tenny et al. | |
| 2018/0220434 A1 | 8/2018 | Takeda | |
| 2018/0248616 A1* | 8/2018 | Tiirola | H04L 5/0007 |
| 2019/0014560 A1 | 1/2019 | Takeda | |
| 2019/0037640 A1* | 1/2019 | Xiong | H04B 7/0626 |
| 2019/0068355 A1 | 2/2019 | Ode | |
| 2019/0074918 A1* | 3/2019 | Huang | H04B 17/391 |
| 2019/0075003 A1* | 3/2019 | Wang | H04L 27/26025 |
| 2019/0089502 A1 | 3/2019 | Yi | |
| 2019/0103931 A1 | 4/2019 | Yi | |
| 2019/0123864 A1* | 4/2019 | Zhang | H04L 5/005 |
| 2019/0141555 A1* | 5/2019 | Tooher | H04W 24/10 |
| 2019/0141696 A1* | 5/2019 | Kim | H04L 5/0055 |
| 2019/0150007 A1 | 5/2019 | Frenne | |
| 2019/0246387 A1 | 8/2019 | Lee | |
| 2019/0280909 A1* | 9/2019 | Werner | H04L 27/2613 |
| 2019/0288801 A1* | 9/2019 | Yang | H04L 5/0055 |
| 2019/0319686 A1 | 10/2019 | Chen, IV | |
| 2019/0342838 A1* | 11/2019 | Kwak | H04W 52/38 |
| 2019/0357208 A1* | 11/2019 | Liu | H04L 5/0092 |
| 2020/0092899 A1 | 3/2020 | Ryu | |
| 2020/0169375 A1* | 5/2020 | Yi | H04L 5/0064 |
| 2020/0260526 A1* | 8/2020 | Xiong | H04W 80/08 |
| 2020/0296765 A1* | 9/2020 | Kim | H04W 56/0015 |
| 2020/0304256 A1* | 9/2020 | Park | H04L 25/03 |
| 2021/0307068 A1* | 9/2021 | Kim | H04B 7/0695 |

FOREIGN PATENT DOCUMENTS

| | | |
|---|---|---|
| JP | 2006-217242 A | 8/2006 |
| KR | 10-2014-0058372 A | 5/2014 |
| TW | 201409971 A | 3/2014 |
| WO | WO 2015/021181 A1 | 2/2015 |

OTHER PUBLICATIONS

U.S. Appl. No. 62/371,227, filed Aug. 5, 2016, Kwak et al. "Power Control for Uplink Transmission in New Radio Access Technology".*
U.S. Appl. No. 62/303,348, filed Mar. 3, 2016, Seo et al. "Uplink/Downlink Transmission on Residual Resources".*
U.S. Appl. No. 62/371,238, filed Aug. 5, 2016, Kim et al. "Method of Data Transmission for New RAT on Unlicensed Spectrum".*
U.S. Appl. No. 62/371,851, filed Aug. 8, 2016, Kim et al. "Cell Identification and Preamble Transmission for New RAT on Unlicensed Spectrum".*
International Search Report issued on Oct. 24, 2017 in PCT/JP2017/027852 filed on Aug. 1, 2017.
3GPP TS 36.300 V13.4.0 (Jun. 2016), "3rd Generation Partnership Project; Technical Specification Group Radio Access Network; Evolved Universal Terrestrial Radio Access (E-UTRA) and Evolved Universal Terrestrial Radio Access Network (E-UTRAN)", Overall description; Stage 2 (Release 13), 2016, total 310 pages.
3GPP TSG-SA1 #42, S1-083461, "LS on HNB/HeNB Open Access Mode", Release No. 9, Seoul, South Korea, Oct. 13-17, 2008, total 2 pages.
3GPP TR 36.814 V9.0.0 (Mar. 2010), "3rd Generation Partnership Project; Technical Specification Group Radio Access Network; Evolved Universal Terrestrial Radio Access (E-UTRA); Further advancements for E-UTRA physical layer aspects (Release 9)", 2010, total 144 pages.
3GPP TR 36.912 V10.0.0 (Mar. 2011), "3rd Generation Partnership Project; Technical Specification Group Radio Access Network; Feasibility study for Further Advancements for E-UTRA (LTE-Advanced) (Release 10)", 2011, total 212 pages.
Popovski, P. et al., "Scenarios, requirements and KPIs for 5G mobile and wireless system", Document No. ICT-317669-METIS/D1.1; Project Name: Mobile and wireless communications Enablers for the Twenty-twenty Information Society (METIS), Apr. 30, 2013, [Searched on Aug. 2, 2016], URL: <https://www.metis2020.com/documents/deliverables/>, total 83 pages.
3GPP TR 23. 799 V0.5.0 (May 2016); 3rd Generation Partnership Project; Technical Specification Group Services and System Aspects; Study on Architecture for Next Generation System (Release 14); 2016; total 178 pages.
3GPP TR 38.912 V0.0.1 (Jun. 2016), "3rd Generation Partnership Project; Technical Specification Group Radio Access Network; Study on New Radio Access Technology (Release 14)", 2016, total 10 pages.
3GPP TSG RAN #72, RP-160697, "Status Report for RAN WG 1 to TSG-RAN #72", Busan, Korea, Jun. 13-16, 2016, total 38 pages.
Huawei, et al., "Discussion on frame structure for NR", 3GPP TSG RAN WG 1 Meeting #85, R1-164032, Nanjing, China, May 23-27, 2016, total 8 pages.
LG Electronics, et al., "WF on minimum HARQ Timing", 3GPP TSG RAN WG 1 Meeting #85, R1-165887, Agenda Item: 7.1.4. Nanjing, China, May 23-27, 2016, total 4 pages.
3GPP TS 36.211 V13.2.0 (Jun. 2016), "3rd Generation Partnership Project; Technical Specification Group Radio Access Network; Evolved Universal Terrestrial Radio Access (E-UTRA); Physical channels and modulation (Release 13)", 2016, total 170 pages.
3GPP TS 36.213 V13.2.0 (Jun. 2016), "3rd Generation Partnership Project; Technical Specification Group Radio Access Network; Evolved Universal Terrestrial Radio Access (E-UTRA); Physical layer procedures (Release 13)", 2016, total 381 pages.
3GPP TS 36.331 V13.1.0 (Mar. 2016), "3rd Generation Partnership Project; Technical Specification Group Radio Access Network; Evolved Universal Terrestrial Radio Access (E-UTRA); Radio Resource Control (RRC); Protocol specification (Release 13)", 2016, total 551 pages.
Samsung; "Discussion on TTI, subframe and signalling timing for NR"; 3GPP TSG RAN WG1 #85; R1-164004; Nanjing, China; May 23-27, 2016; total 5 pages.
Huawei et al., "f-OFDM scheme and filter design", 3GPP TSG RAN Wg 1 Meeting #85, R1-164033, Nanjing, China, May 23-27, 2016, total 8 pages.

(56) References Cited

OTHER PUBLICATIONS

Intel Corporation, "Discussion on channel modeling framework for UE-UE and eNB-eNB interference", 3GPP TSG RAN WG1 Meeting #85", R1-164174, Nanjing, China, May 23-27, 2016, total 5 pages.
3GPP TS 36.304 V13.2.0 (Jun. 2016), "3rd Generation Partnership Project; Technical Specification Group Radio Access Network; Evolved Universal Terrestrial Radio Access (E-UTRA); User Equipment (UE) procedures in idle mode (Release 13)", 2016, total 46 pages.
Nokia et al., "Support for Beam Based Common Control Plane", 3GPP TSG-RAN WG 1#85, R1-165364, Nanjing, P.R. China, May 23-27, 2016, total 5 pages.
Samsung, "Framework for beamformed access", 3GPP TSG RAN WG 1 #85, R1-164013, Nanjing, China, May 23-27, 2016, total 4 pages.
3GPP TS 36.104 V14.0.0 (Jun. 2016), "3rd Generation Partnership Project; Technical Specification Group Radio Access Network; Evolved Universal Terrestrial Radio Access (E-UTRA); Base Station (BS) radio transmission and reception (Release 14)", 2016, total 202 pages.
Qualcomm et al., "Way Forward On Frame Structure", 3GPP TSG RAN WG1 #85, R1-165669, Nanjing, China, May 23-27, 2016, Agenda item 7.1.4, total 2 pages.
Ericsson, "Infrequent small data transmissions for inactive UEs", 3GPP TSG-RAN WG2 #94, Tdoc R2-164028, Agenda Item 9.4.2, Nanjing, P.R. China, May 23-27, 2016, total 5 pages.
Nokia et al., "Discussion of RRC States in NR", 3GPP TSG-RAN WG2 Meeting #94, R2-163441, Nanjing, China, May 23-27, 2016, total 6 pages.
Extended European Search Report issued Feb. 28, 2020 in corresponding European Patent Application No. 17839284.1 7 pages.
Indian Office Action issued Sep. 10, 2021 in Indian Patent Application No. 201947002036 (with English translation), 6 pages.
Office Action issued Oct. 20, 2021 in corresponding European Patent Application No. 17 839 284.1, 5 pages.
Combined Chinese Office Action and Search Report issued Sep. 5, 2022 in Chinese Patent Application No. 201780048148.4 (with unedited computer-generated English translation), 13 pages.
"Summary of Email Discussion on Frame Structure", 3GPP TSG-RAN WG1 #85, R1-165456, Qualcomm Incorporated, 2016, pp. 1-28.
Office Action issued Dec. 2, 2022, in corresponding Indian Patent Application No. 202248032993 (with English Translation), 6 pages.
Office Action issued Dec. 2, 2022, in corresponding Indian Patent Application No. 202248033016 (with English Translation), 6 pages.
Office Action issued Dec. 5, 2022, in corresponding Indian Patent Application No. 202248033041 (with English Translation), 6 pages.
Office Action issued Feb. 11, 2023, in corresponding Chinese Patent Application No. 201780048148.4 (with English Translation), 9 pages.
Combined Chinese Office Action and Search Report issued May 11, 2023, in corresponding Chinese Patent Application No. 201780048148.4 (with English Translation), 15 pages.
Nokia, Alcatel-Lucent Shanghai Bell, "Basic frame structure principles for 5G", 3GPP TSG-RAN WG1#85, R1-165027, Nanjing, P.R. China, May 23-27, 2016, 6 pages.
European Patent Office, Office Action, Application No. 17 839 284.1, dated Aug. 8, 2024, in 5 pages.
Government of India, Hearing Notice, Application No. 202248033041, dated Sep. 3, 2024, in 2 pages.
Government of India, Hearing Notice, Application No. 202248032993, dated Sep. 3, 2024, in 2 pages.

* cited by examiner

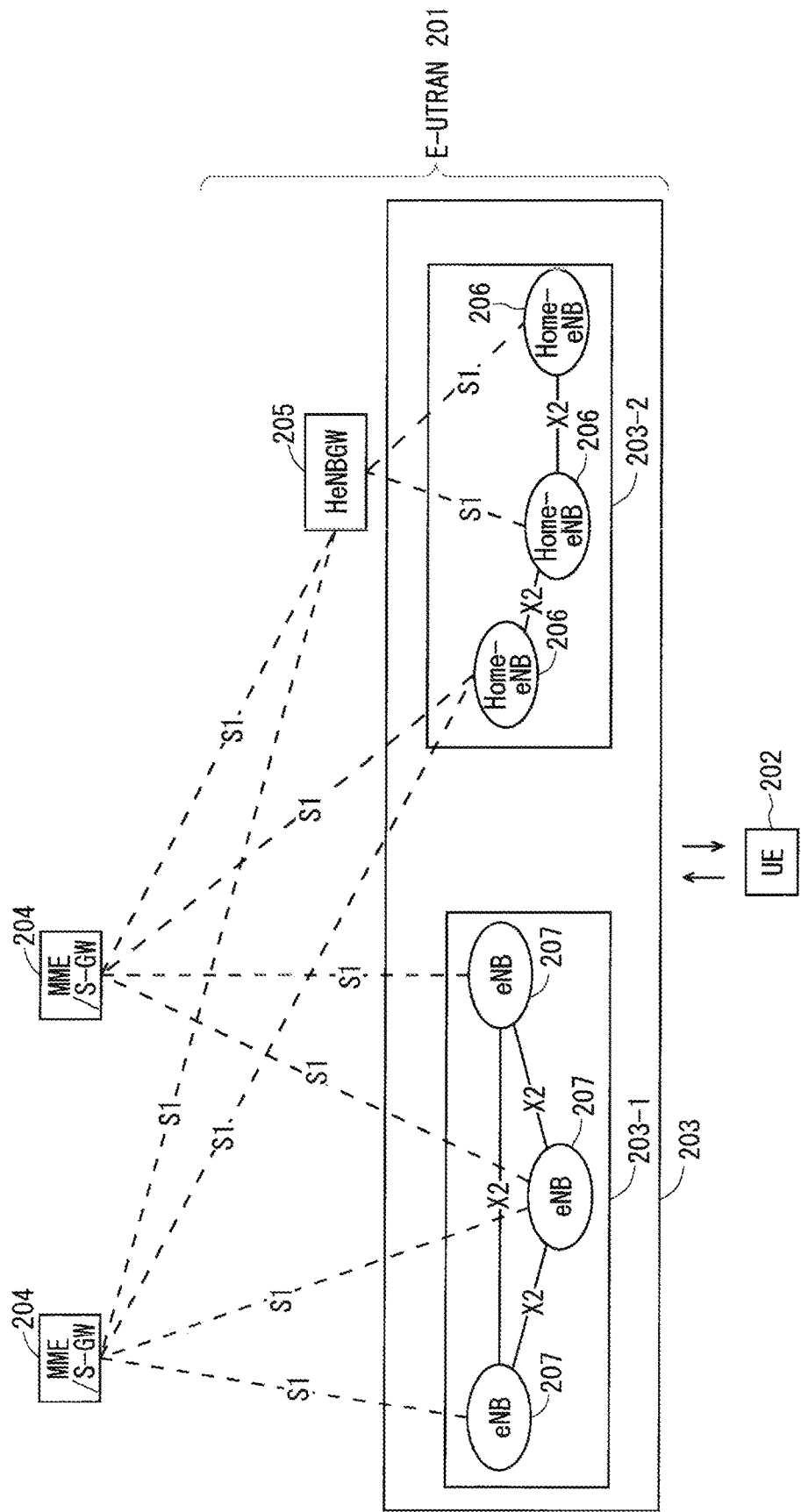
F I G. 2

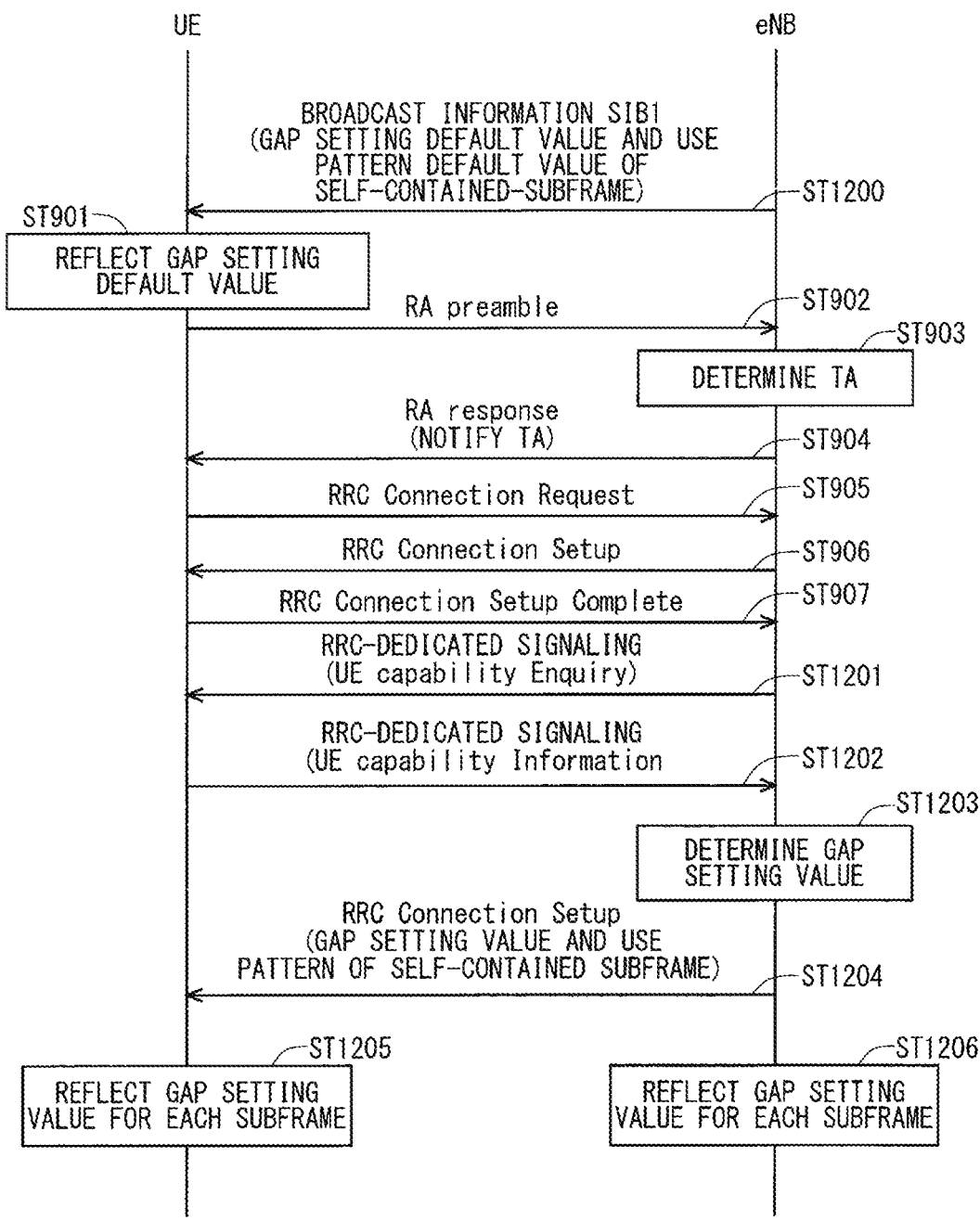
F I G . 1 2

F I G . 2 2
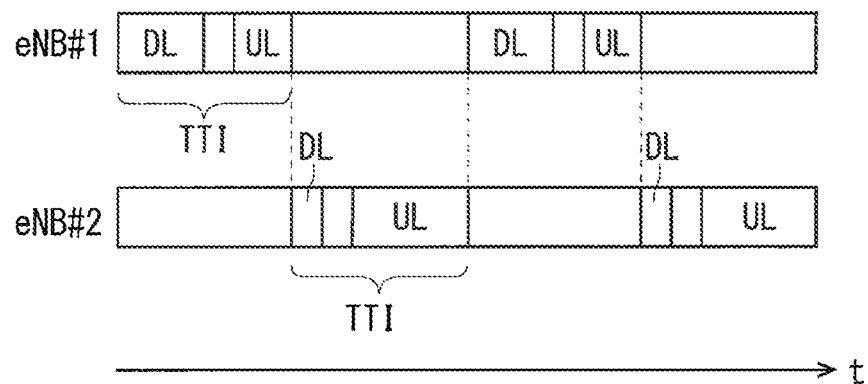

F I G. 2 5
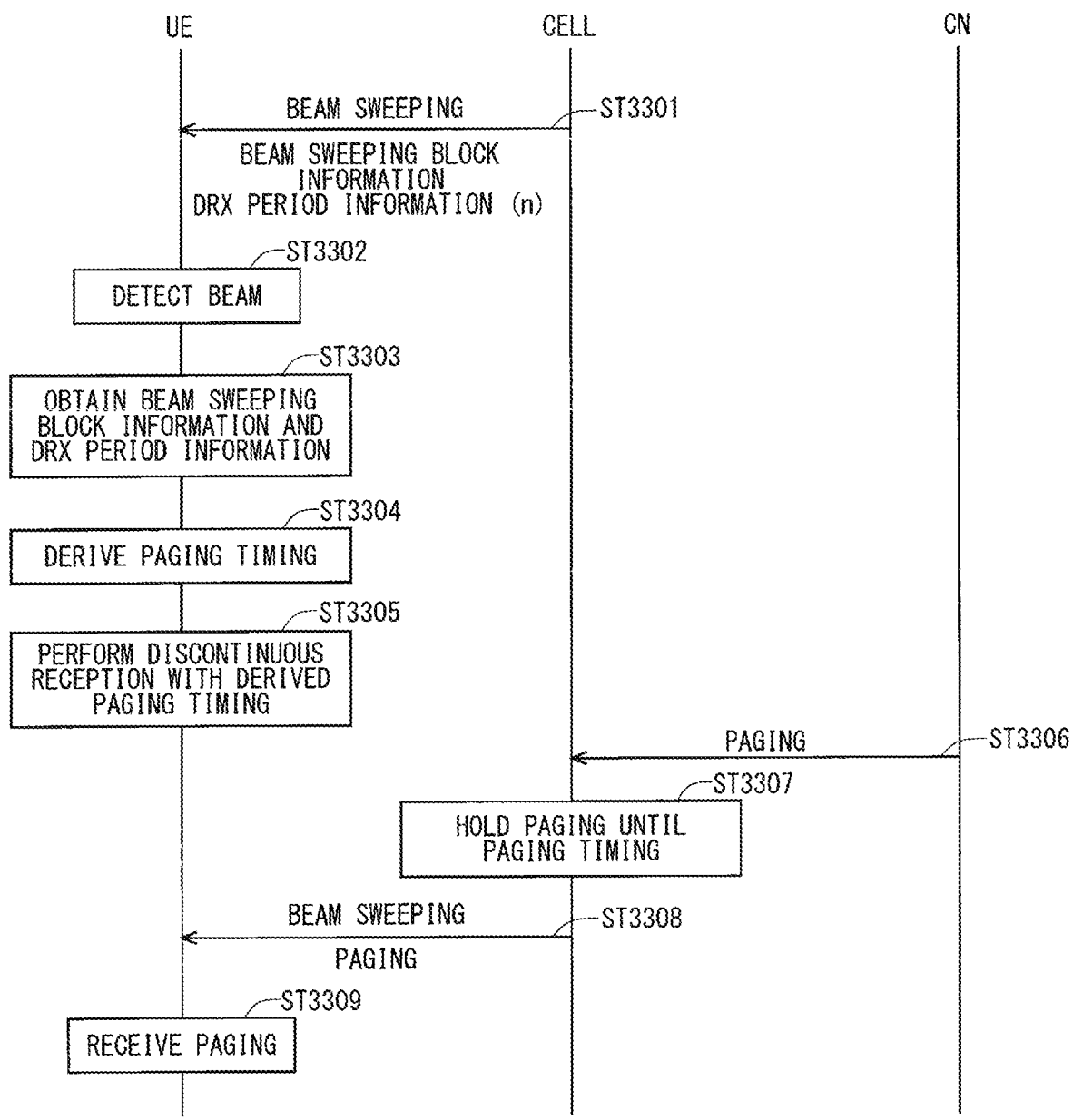

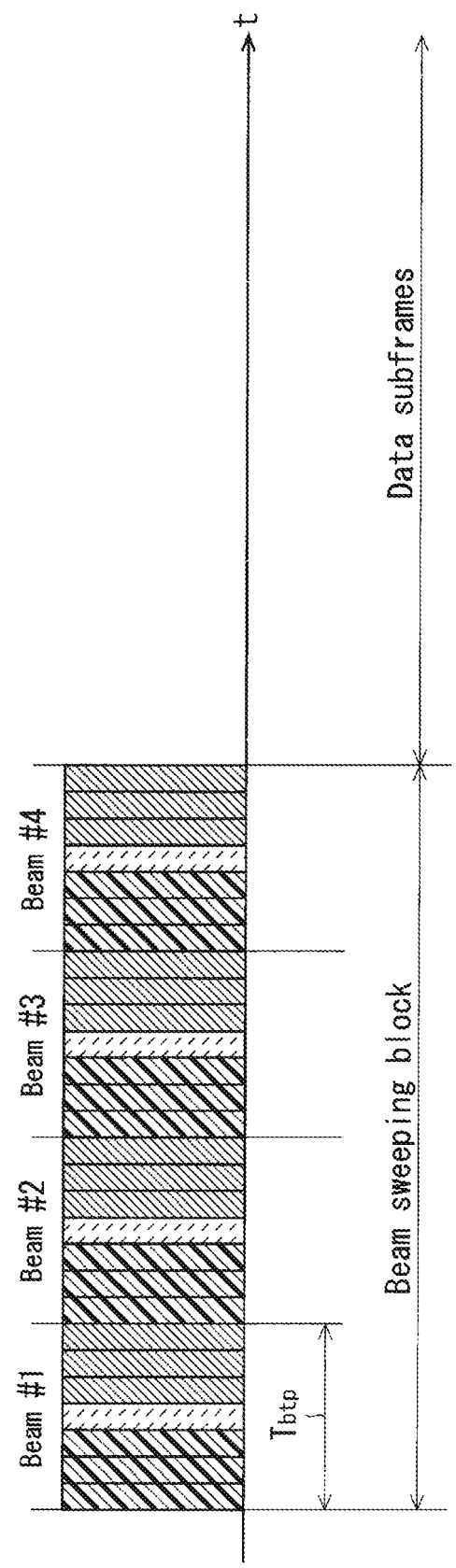

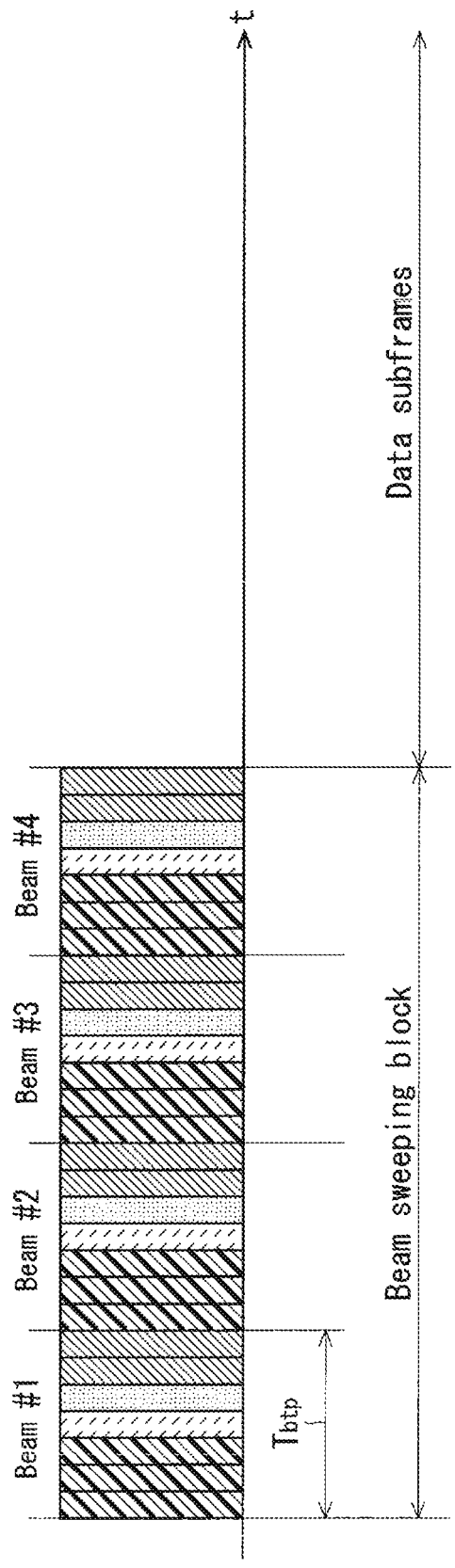

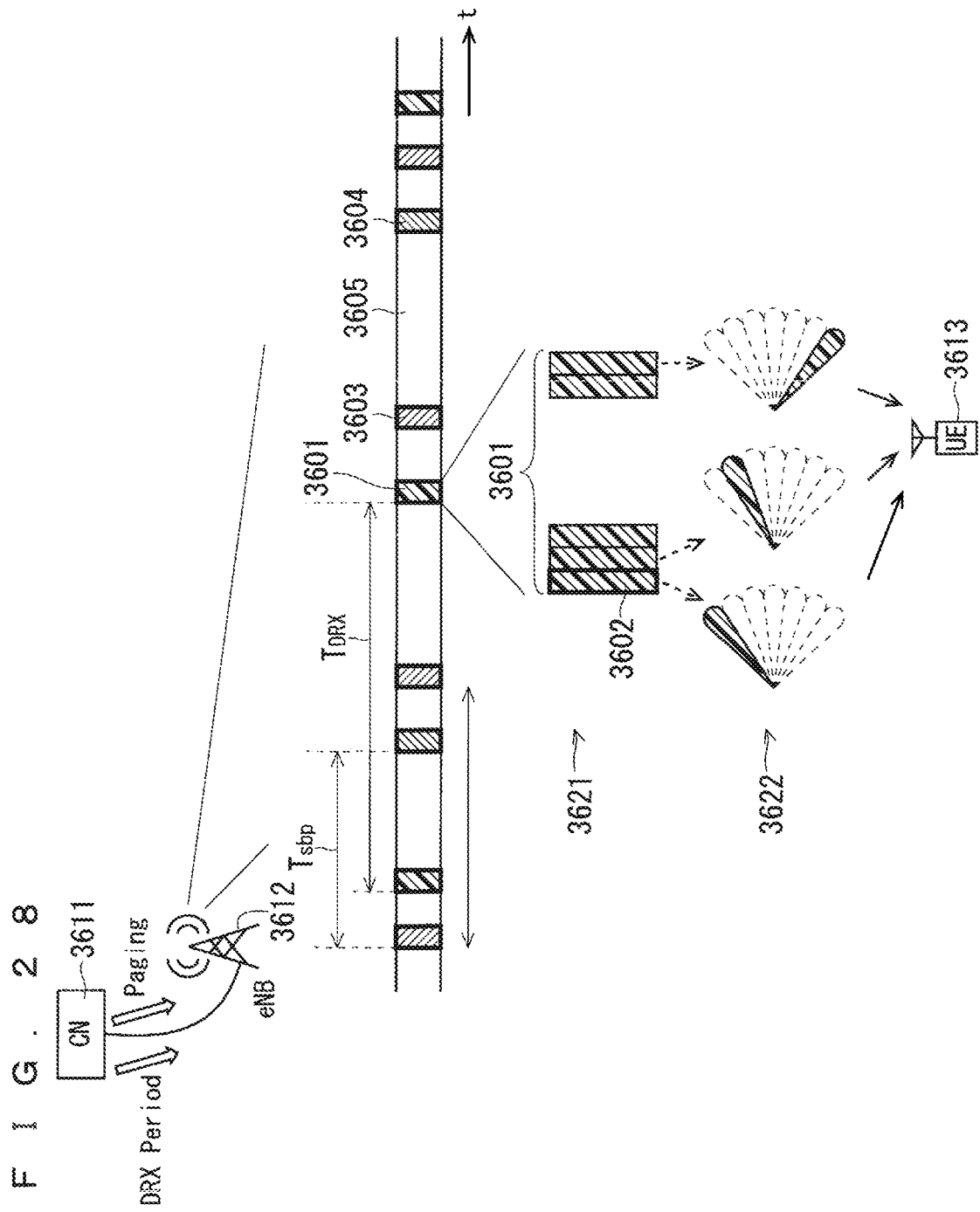

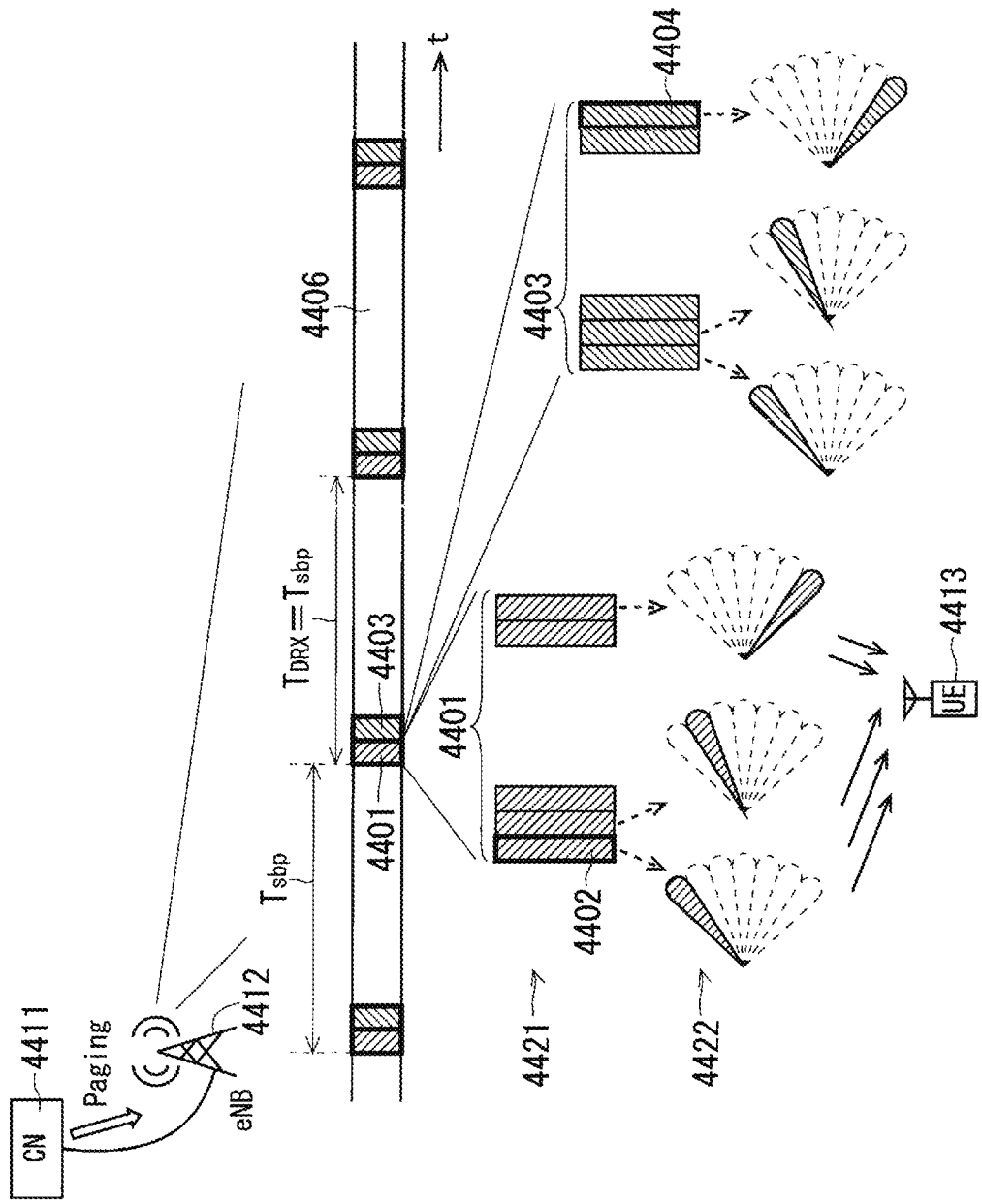
F I G. 37

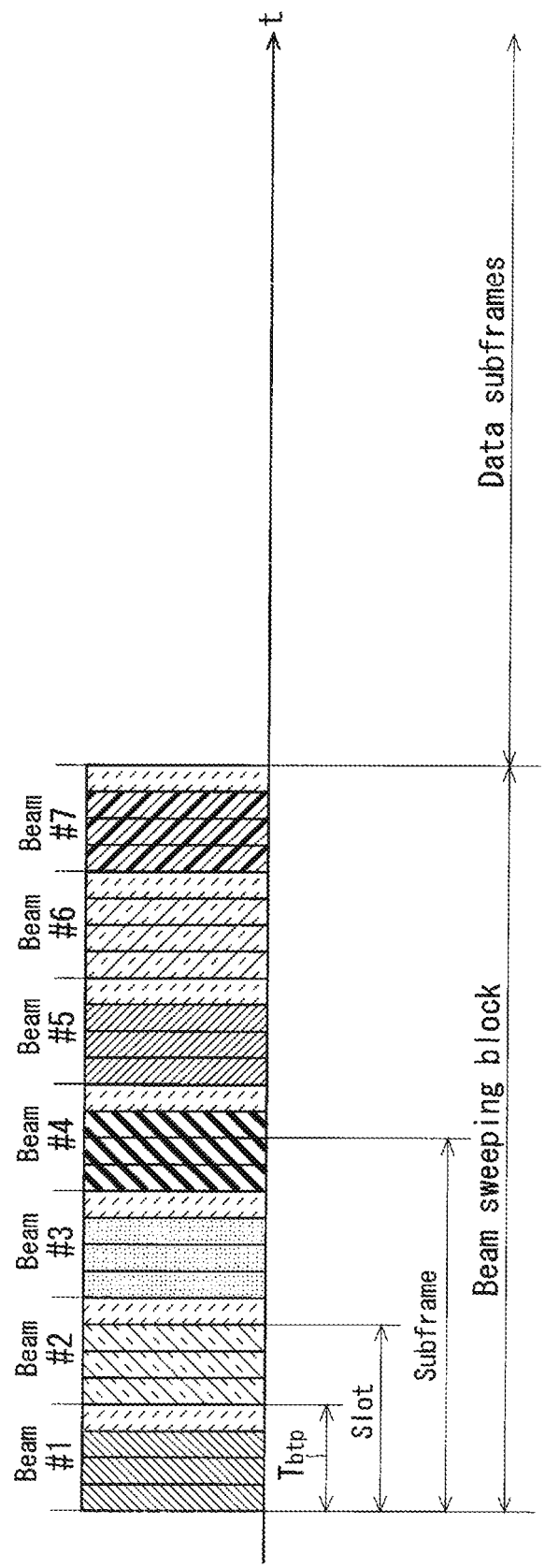

COMMUNICATION SYSTEM

CROSS-REFERENCE TO RELATED APPLICATIONS

This application is a continuation of and claims the benefit of priority under 35 U.S.C. § 120 from U.S. application Ser. No. 17/391,231, filed Aug. 2, 2021, now abandoned, which is a divisional of U.S. application Ser. No. 16/316,753 (now U.S. Pat. No. 11,115,167) filed Jan. 10, 2019, the entire contents of which are incorporated herein by reference. U.S. application Ser. No. 16/316,753 is a National Stage of PCT/JP2017/027852 filed Aug. 1, 2017, which claims the benefit of priority under 35 U.S.C. § 119 from Japanese Application Nos. 2016-156767 filed Aug. 9, 2016 and 2016-214184 filed Nov. 1, 2016.

TECHNICAL FIELD

The present invention relates to a communication system in which radio communication is performed between a communication terminal device such as a user equipment device and a base station device.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network, which will be hereinafter collectively referred to as a network as well (for example, see Non-Patent Documents 1 to 20). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions by 3GPP regarding the frame configuration in the LTE system described in Non-Patent Document 1 (Chapter 5) will be described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received power (RSRP).

The transport channels described in Non-Patent Document 1 (Chapter 5) will be described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in the case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below.

The closed subscriber group (CSG) cell is a cell in which subscribers who are allowed use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in the LTE communication system. The CSG IDs are used by communication terminals (UEs) for making access from CSG-related members easier.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

3GPP is studying base stations referred to as Home-NodeB (Home-NB: HNB) and Home-eNodeB (Home-eNB; HeNB). HNB/HeNB is a base station for, for example, household, corporation, or commercial access service in UTRAN/E-UTRAN. Non-Patent Document 2 discloses three different modes of the access to the HeNB and HNB. Specifically, an open access mode, a closed access mode, and a hybrid access mode are disclosed.

Further, 3GPP is pursuing specifications standard of long term evolution advanced (LTE-A) as Release 10 (see Non- Patent Documents 3 and 4). The LTE-A is based on the LTE radio communication system and is configured by adding several new techniques to the system.

Carrier aggregation (CA) is studied for the LTE-A system, in which two or more component carriers (CCs) are aggregated to support wider transmission bandwidths up to 100 MHz. Non-Patent Document 1 describes the CA.

In the case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form and a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The COMP studied for LTE-A in 3GPP is described in Non-Patent Document 1.

Furthermore, 3GPP is studying the use of small eNBs (hereinafter also referred to as "small-scale base station devices") configuring small cells to satisfy tremendous traffic in the future. In an example technique under study, etc., a large number of small eNBs will be installed to configure a large number of small cells, thus increasing spectral efficiency and communication capacity. The specific techniques include dual connectivity (abbreviated as DC) in which a UE communicates with two eNBs through connection thereto. Non-Patent Document 1 describes the DC.

Among eNBs that perform dual connectivity (DC), one of them may be referred to as a master eNB (abbreviated as MeNB), and the other may be referred to as a secondary eNB (abbreviated as SeNB).

The traffic flow of a mobile network is on the rise, and the communication rate is also increasing. It is expected that the communication rate will be further increased when the operations of the LTE and the LTE-A are fully initiated.

For increasingly sophisticated mobile communications, the fifth generation (hereinafter also referred to as "5G") radio access system is studied, whose service is aimed to be launched in 2020 and afterward. For example, in the Europe, an organization named METIS summarizes the requirements for 5G (see Non-Patent Document 5).

Among the requirements in the 5G radio access system are a system capacity 1000 times as high as, a data transmission rate 100 times as high as, a data latency one tenth (1/10) as low as, and simultaneously connected communication terminals 100 times as many as those in the LTE system, to further reduce the power consumption and device cost.

To satisfy such requirements, 3GPP is pursuing the study of 5G specifications as Release 14 (see Non-Patent Documents 6 and 7). The techniques on 5G radio sections are referred to as "New Radio (abbreviated as NR) Access Technology", and several new techniques are being studied (see Non-Patent Document 8). Examples of the techniques include a NR frame structure using a self-contained subframe, beamforming using a multi-element antenna, etc.

PRIOR-ART DOCUMENTS

Non-Patent Documents

Non-Patent Document 1: 3GPP TS36.300 V13.4.0
Non-Patent Document 2: 3GPP S1-083461
Non-Patent Document 3: 3GPP TR 36.814 V9.0.0
Non-Patent Document 4: 3GPP TR 36.912 V10.0.0
Non-Patent Document 5: "Scenarios, requirements and KPIs for 5G mobile and wireless system", [online], Apr. 30, 2013, ICT-317669-METIS/D1.1, [Searched on Aug. 2, 2016], Internet <https://www.metis2020.com/documents/deliverables/>
Non-Patent Document 6: 3GPP TR 23.799 V0.5.0
Non-Patent Document 7: 3GPP TR 38.912 V0.0.1
Non-Patent Document 8: 3GPP RP-160697
Non-Patent Document 9: 3GPP R1-164032
Non-Patent Document 10: 3GPP R1-165887
Non-Patent Document 11: 3GPP TS 36.211 V13.2.0
Non-Patent Document 12: 3GPP TS 36.213 V13.2.0
Non-Patent Document 13: 3GPP TS 36.331 V13.1.0
Non-Patent Document 14: 3GPP R1-164004
Non-Patent Document 15: 3GPP R1-164033
Non-Patent Document 16: 3GPP R1-164174
Non-Patent Document 17: 3GPP TS 36.304 V13.2.0
Non-Patent Document 18: 3GPP R1-165364
Non-Patent Document 19: 3GPP R1-164013
Non-Patent Document 20: 3GPP TS 36.104 V14.0.0
Non-Patent Document 21: 3GPP R1-165669
Non-Patent Document 22: 3GPP R2-164028
Non-Patent Document 23: 3GPP R2-163441

SUMMARY

Problems to be Solved by the Invention 5G requires performance, for example, a data transmission rate 100 times as high as and a data latency one tenth (1/10) as low as those in the LTE system.

To reduce latency, 5G propose a self-contained subframe that consists of downlink and uplink in one subframe and returns a response to the downlink in the same subframe, as an NR frame structure (see Non-Patent Document 9).

The self-contained subframe has an interval (hereinafter also referred to as a "gap") for a UE during a shift from the downlink to the uplink to demodulate and decode a downlink signal, generate an uplink signal to be coded, and code and modulate the uplink signal.

Although the processing will be eased with a gap duration consistent among all the UEs in a cell, the gap duration has to be set to suit the UE whose processing time is the longest. Thus, the gap duration is useless for the UE whose processing time is shorter, which reduces the use efficiency of resources and also the transmission rate.

5G also proposes to perform communication via beamforming for forming narrow beams using a plurality of antennas to increase the transmission rate. 5G proposes a method for covering a coverage necessary for a cell with the narrow beams (see Non-Patent Document 18). In the method disclosed in Non-Patent Document 18, a wide coverage is covered by sweeping one or more beams at different timings to perform beam sweeping.

The transmission timing of each of the beams in the beam sweeping differs. Meanwhile, the paging timing is determined by a UE-ID.

Thus, even when a cell intends to transmit the paging with application of the beam sweeping, the paging timing for the UE may not coincide with the beam sweeping timing. With this, the cell has a problem with incapability to transmit the paging.

When the paging timing is different from the beam sweeping timing, the UE has a problem with incapability to receive the paging even through a reception operation with a predetermined paging timing.

The object of the present invention is to provide a communication system that can reduce the latency while preventing reduction in the transmission rate.

Means to Solve the Problems

A communication system according to the present invention includes a base station device and a plurality of communication terminal devices capable of radio communication with the base station device, wherein the base station device communicates with each of the plurality of communication terminal devices using a self-contained subframe, the self-contained subframe including a downlink signal transmitted from the base station device to the communication terminal device, and an uplink signal transmitted from the communication terminal device to the base station device in response to the downlink signal, the self-contained subframe includes a gap duration during which neither the downlink signal nor the uplink signal is transmitted, between a downlink transmission duration during which the downlink signal is transmitted and an uplink transmission duration during which the uplink signal is transmitted, and the gap duration is set to each of the plurality of communication terminal devices.

Effects of the Invention

According to the present invention, a communication system includes a base station device and a plurality of communication terminal devices. The base station device communicates with each of the plurality of communication terminal devices using a self-contained subframe, the self-contained subframe including a downlink signal transmitted from the base station device to the communication terminal device, and an uplink signal transmitted from the communication terminal device to the base station device in response to the downlink signal. The self-contained subframe includes a gap duration during which neither the downlink signal nor the uplink signal is transmitted, between a downlink transmission duration and an uplink transmission duration. The gap duration is set to each of the plurality of communication terminal devices. This can increase transmission rates of the downlink signal and the uplink signal for each of the communication terminal devices. Thus, the latency can be reduced while reduction in the transmission rates is prevented.

These and other objects, features, aspects and advantages of the present invention will become more apparent from the following detailed description of the present invention when taken in conjunction with the accompanying drawings.

BRIEF DESCRIPTION OF DRAWINGS

FIG. 2 is a block diagram showing the overall configuration of an LTE communication system 200 under discussion of 3GPP.

FIG. 12 illustrates an example sequence on a method for changing the gap setting according to a type of the self-contained subframe.

FIG. 22 illustrates an example time-division allocation of communication sections between eNBs in the communication system illustrated in FIG. 21.

FIG. 25 illustrates an example sequence on paging processes according to the fourth embodiment.

FIG. 26 illustrates example resources to which PCCHs transmitted via each beam are mapped.

FIG. 27 illustrates example resources when scheduling information of the PCCHs is transmitted via the same beam as that for transmitting the PCCHs.

FIG. 28 illustrates a method for transmitting the paging when the beam sweeping for paging is provided.

FIG. 37 illustrates a method for setting an uplink beam sweeping timing immediately subsequent to a downlink beam sweeping timing.

FIG. 45 illustrates an example where a transmission duration of each of the beams in the beam sweeping block is of an arbitrary symbol length.

DESCRIPTION OF EMBODIMENTS

First Embodiment

Figure 1:
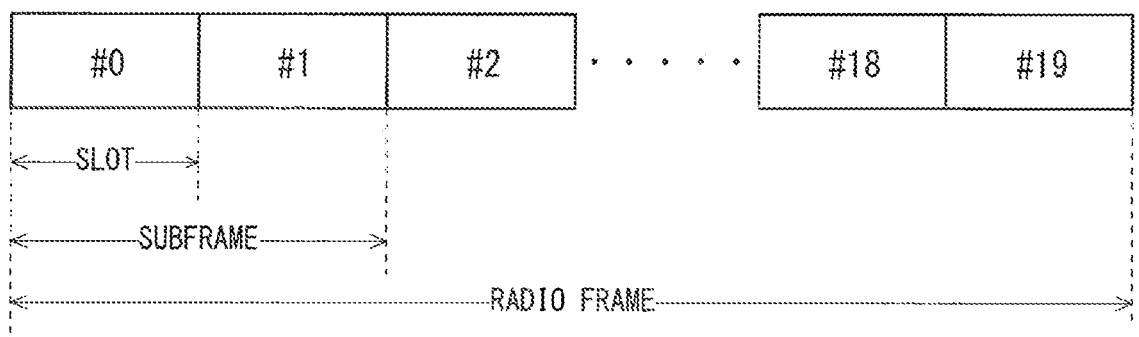
FIG. 1 is a diagram illustrating the configuration of a radio frame for use in an LTE communication system.

FIG. 2 is a block diagram showing an overall configuration of an LTE communication system 200, which is under discussion of 3GPP. FIG. 2 will be described. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a movable mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs broadcast, paging, RRC connection management, and the like. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 are classified into eNBs 207 and Home-eNBs 206. The communication system 200 includes an eNB group 203-1 including a plurality of eNBs 207 and a Home-eNB group 203-2 including a plurality of Home-eNBs 206. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW), or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204. Or, the Home-eNBs 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Home-eNB 206 being base stations. The MME units 204 configure an EPC being a core network. The base station 203 and the HeNBGW 205 configure the E-UTRAN 201.

Further, 3GPP is studying the configuration below. The X2 interface between the Home-eNBs 206 is supported. In other words, the Home-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MME unit 204 through the HeNBGW 205 and it is directly connected to the MME unit 204.

The base station device 203 may configure a single cell or a plurality of cells. Each cell has a range predetermined as a coverage in which the cell can communicate with the user equipment 202 and performs radio communication with the user equipment 202 within the coverage. In the case where one base station device 203 configures a plurality of cells, every cell is configured so as to communicate with the user equipment 202.

Figure 3:
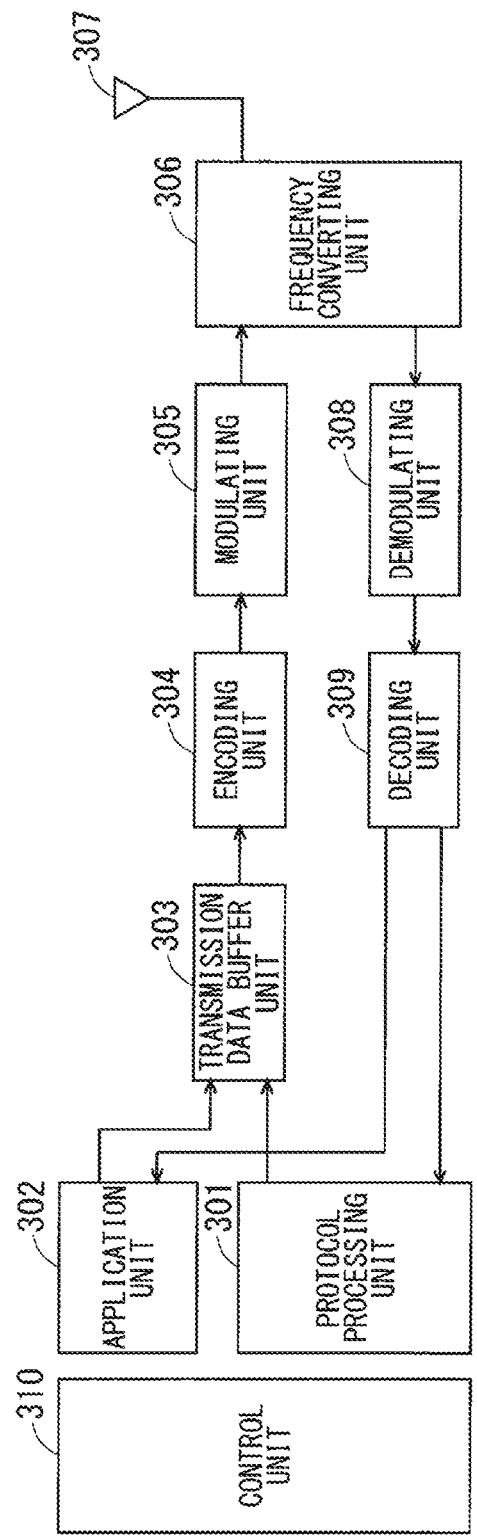
FIG. 3 is a block diagram showing the configuration of a user equipment 202 shown in FIG. 2, which is a communication terminal according to the present invention.

FIG. 3 is a block diagram showing the configuration of the user equipment 202 of FIG. 2 that is a communication terminal according to the present invention. The transmission process of the user equipment 202 shown in FIG. 3 will be described. First, a transmission data buffer unit 303 stores the control data from a protocol processing unit 301 and the user data from an application unit 302. The data stored in the transmission data buffer unit 303 is passed to an encoding unit 304 and is subjected to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309 and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 3, the control unit 310 is connected to the individual units 301 to 309.

Figure 4:
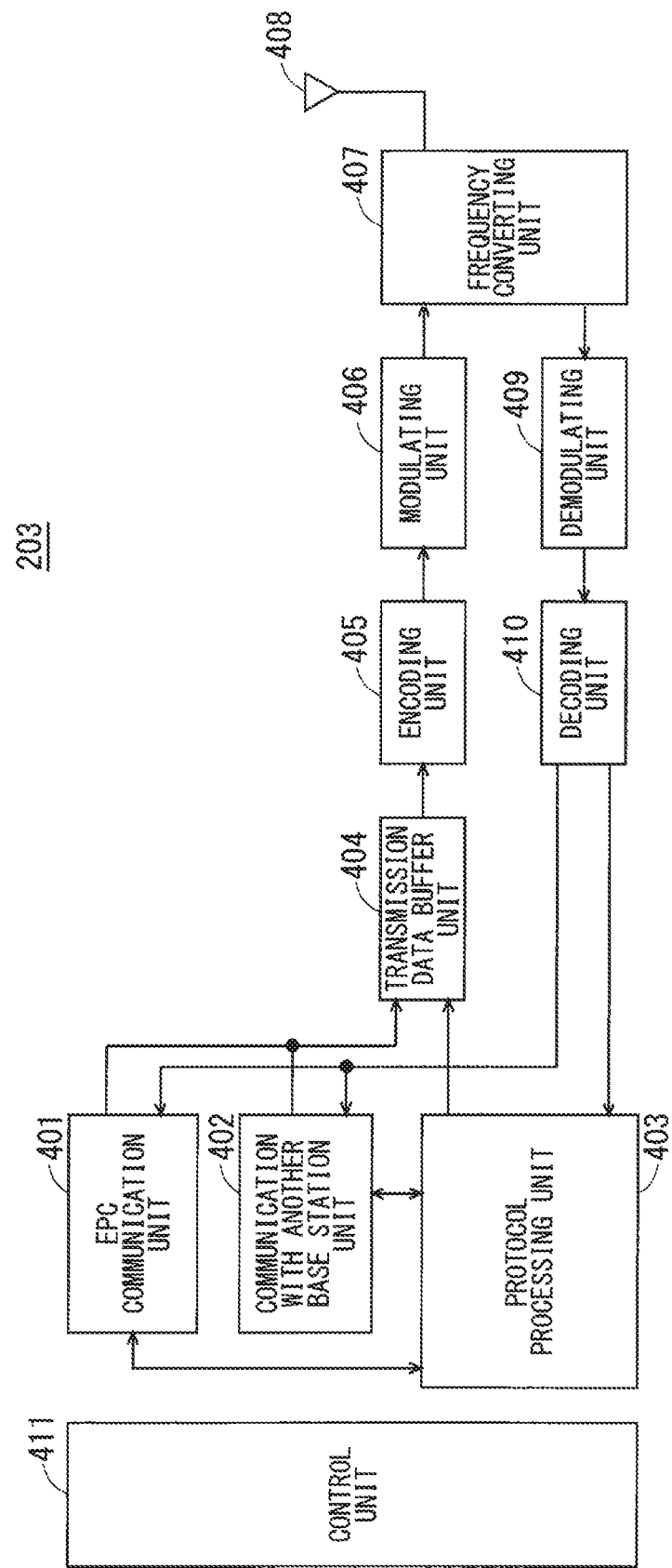
FIG. 4 is a block diagram showing the configuration of a base station 203 shown in FIG. 2, which is a base station according to the present invention.

FIG. 4 is a block diagram showing the configuration of the base station 203 of FIG. 2 that is a base station according to the present invention. The transmission process of the base station 203 shown in FIG. 4 will be described. An EPC communication unit 401 performs data transmission and reception between the base station 203 and the EPC (such as the MME unit 204), HeNBGW 205, and the like. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405 and is then subjected to an encoding process such as error correction. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and is then subjected to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410.

Figure 5:
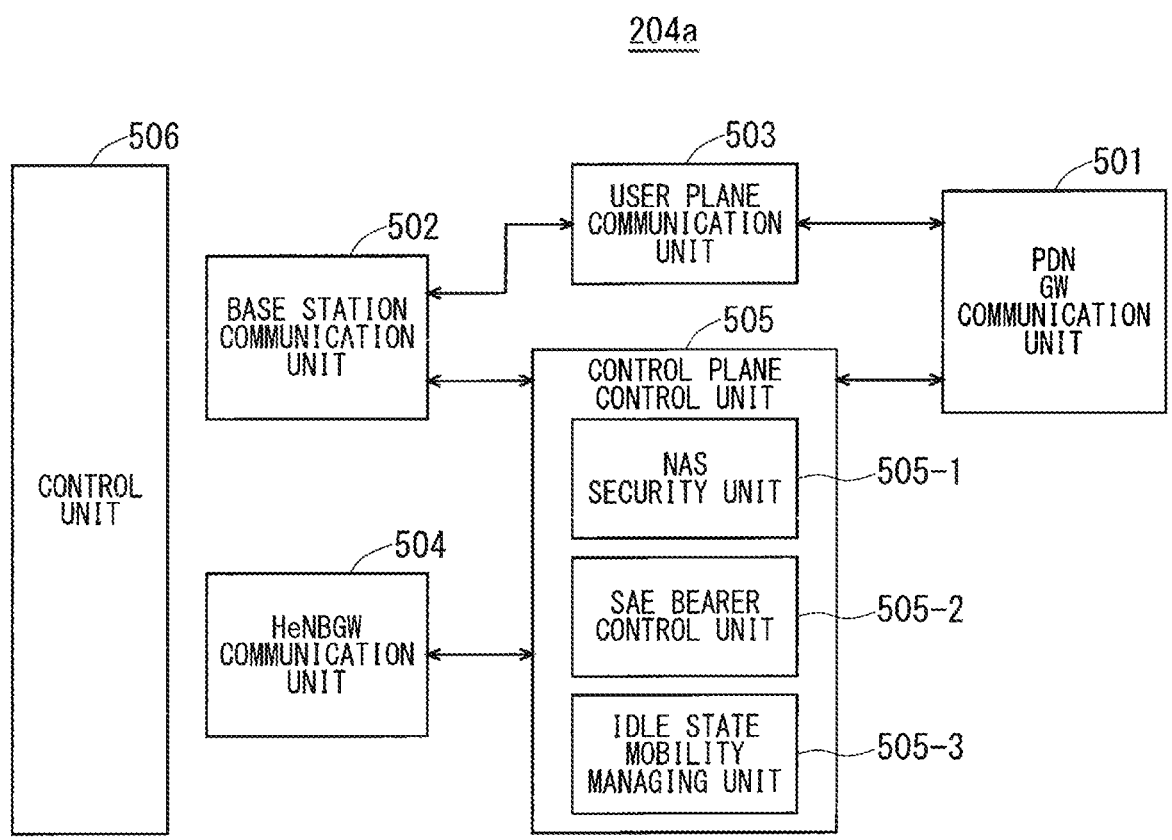
FIG. 5 is a block diagram showing the configuration of an MME according to the present invention.

FIG. 5 is a block diagram showing the configuration of the MME according to the present invention. FIG. 5 shows the configuration of an MME 204a included in the MME unit 204 shown in FIG. 2 described above. A PDN GW communication unit 501 performs data transmission and reception between the MME 204a and the PDN GW. A base station communication unit 502 performs data transmission and reception between the MME 204a and the base station 203 by means of the S1 interface. In the case where the data received from the PDN GW is user data, the user data is passed from the PDN GW communication unit 501 to the base station communication unit 502 via a user plane communication unit 503 and is then transmitted to one or a plurality of base stations 203. In the case where the data received from the base station 203 is user data, the user data is passed from the base station communication unit 502 to the PDN GW communication unit 501 via the user plane communication unit 503 and is then transmitted to the PDN GW.

In the case where the data received from the PDN GW is control data, the control data is passed from the PDN GW communication unit 501 to a control plane control unit 505. In the case where the data received from the base station 203 is control data, the control data is passed from the base station communication unit 502 to the control plane control unit 505.

A HeNBGW communication unit 504 is provided in the case where the HeNBGW 205 is provided, which performs data transmission and reception between the MME 204a and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane. The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state, which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the Home-eNBs 206 to be connected to the MME 204a, CSG IDs, and a whitelist.

Figure 6:
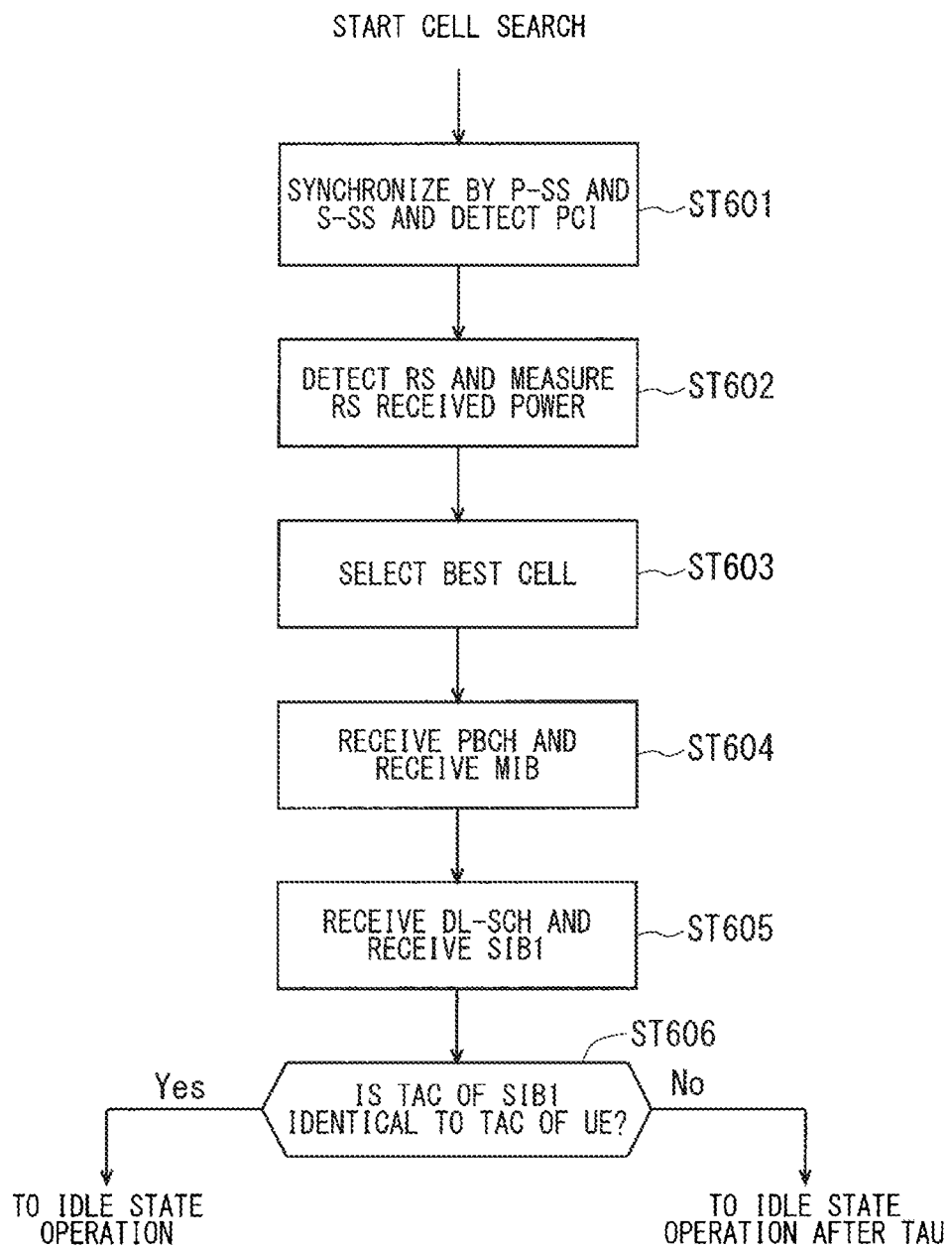
FIG. 6 is a flowchart showing an outline from a cell search to an idle state operation performed by a communication terminal (UE) in the LTE communication system.

An example of a cell search method in a mobile communication system will be described next. FIG. 6 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME and the like to change a tracking area through the cell for performing tracking area update (TAU).

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

Figure 7:
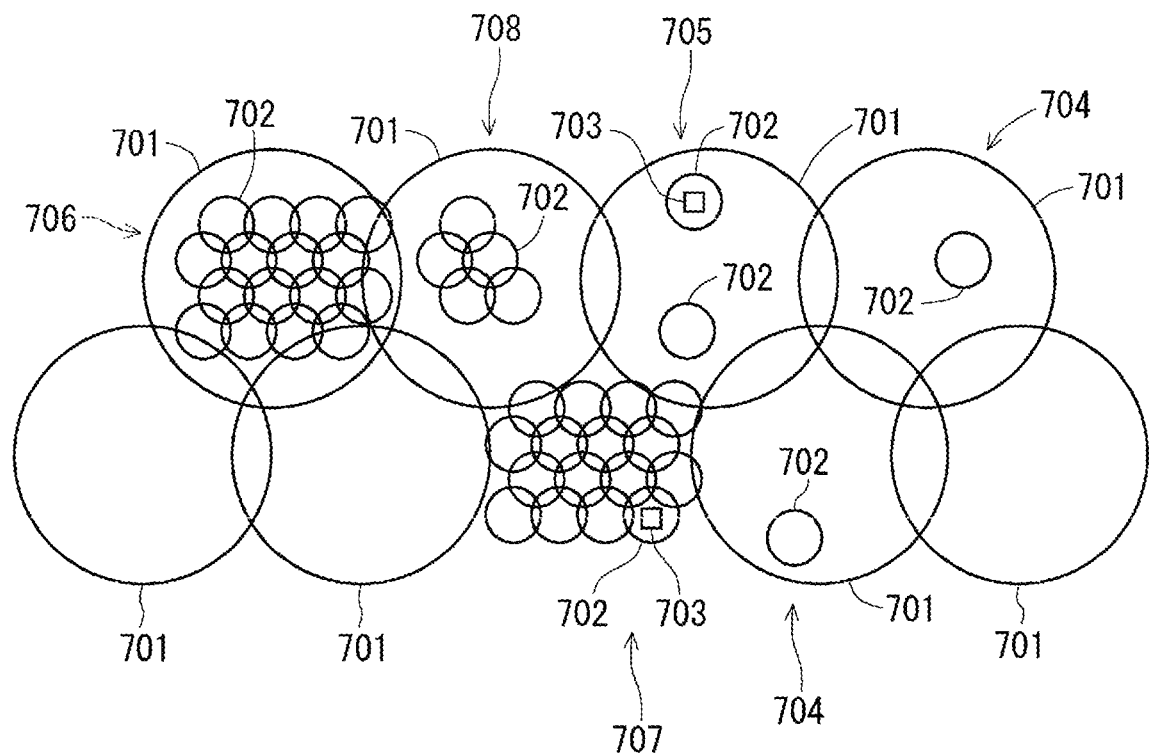
FIG. 7 shows the concept of a cell configuration when macro eNBs and small eNBs coexist.

FIG. 7 shows the concept of the cell configuration in which macro eNBs and small eNBs coexist. The macro cell configured by a macro eNB has a relatively-wide-range coverage 701. A small cell configured by a small eNB has a coverage 702 whose range is narrower than that of the coverage 701 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "704" or "705", the coverage 702 of the small cell configured by a small eNB may be included in the coverage 701 of the macro cell configured by a macro eNB.

As indicated by the reference "705", the coverages 702 of a plurality of, for example, two small cells may be included in the coverage 701 of one macro cell. A user equipment (UE) 703 is included in, for example, the coverage 702 of the small cell and performs communication via the small cell.

In the cell configuration shown in FIG. 7, as indicated by a reference "706", the coverage 701 of the macro cell configured by a macro eNB may overlap the coverages 702 of the small cells configured by small eNBs in a complicated manner.

As indicated by a reference "707", the coverage 701 of the macro cell configured by a macro eNB may not overlap the coverages 702 of the small cells configured by small eNBs.

Further, as indicated by a reference "708", the coverages 702 of a large number of small cells configured by a large number of small eNBs may be configured in the coverage 701 of one macro cell configured by one macro eNB.

To reduce latency, 5G propose a self-contained subframe that consists of downlink and uplink in one subframe and returns a response to the downlink in the same subframe. The following three pieces of information are being studied as information to be transmitted in the uplink: Ack/Nack for downlink data in the same subframe: uplink data for an uplink scheduling grant in the same subframe; and a measurement result for a downlink RS in the same subframe (see Non-Patent Document 9).

The shift from the downlink to the uplink requires considering: the time to demodulate and decode a downlink signal in each UE; the processing time until generating an uplink signal to be coded from the decoded downlink signal in the UE; and the time to code and modulate the uplink signal in the UE, in addition to the switching time between transmission and reception and propagation latency between the eNB and the UE (see Non-Patent Document 10).

Thus, each of the eNB and the UE has a gap duration (hereinafter also referred to as a "gap") during a shift from the downlink to the uplink. The eNB does not transmit a downlink signal to the UE during the gap duration. The UE needs to demodulate and decode a downlink signal, generate an uplink signal to be coded, and code and modulate an uplink signal during the gap duration.

Although the processing will be eased with a gap duration consistent among all the UEs in a cell, the gap duration has to be set to suit the UE whose processing time is the longest. Thus, the gap duration is needlessly lengthy for the UE whose processing time is shorter.

In a Special Subframe under the LTE, the gap duration can be shortened by additionally setting an Uplink Pilot Time Slot (UpPTS) to each UE.

However, an object to be transmitted in an uplink transmission section additionally set is limited to a sounding reference signal or a Physical Random Access Channel (PRACH) (see Non-Patent Documents 10, 11, and 12).

Thus, the method for setting the Special Subframe is not applicable to the self-contained subframe in which the uplink data, an uplink Ack/Nack, and a downlink reference signal measurement result are transmitted. Further, a Downlink Pilot Time Slot (DwPTS) cannot be additionally set to the Special Subframe.

In the self-contained subframe, the processing time necessary for the UE varies depending on the size of a downlink signal and a modulating method of the downlink signal. Although fixing the gap duration will ease the processing, the gap duration has to be set in consideration of the size and the modulating method of the downlink signal requiring the longest processing time.

Thus, the set gap duration is needlessly lengthy in a Transmission Time Interval (TTI) or a subframe to be transmitted with the size and the modulating method of the downlink signal whose processing time is shorter.

Although, for example, flexibly changing the gap duration is conceivable to resolve such wastes, any method for flexibly changing the gap duration has not yet been disclosed.

The first embodiment will disclose a method for solving such problems.

The eNB sets a gap in a self-contained subframe for each UE. The eNB also maps a downlink signal/channel to a symbol before the gap, and maps an uplink signal/channel to a signal after the gap.

In setting of a gap, the eNB may designate the position and the length of the gap for the UE simultaneously or separately. The eNB may designate the position of the gap at the starting position or the ending position for the UE.

The length of the gap may be given per minimum time in the 5G radio access system, per symbol, or at its ratio to a subframe length. The length of the gap may be given per another unit.

Instead of setting the gap, an uplink signal/channel length and a downlink signal/channel length may also be set. The lengths of the uplink and the downlink may be set simultaneously or separately. Each of the lengths of the uplink and the downlink may be set per minimum time in the 5G radio access system, per symbol, at its ratio to the subframe length, or per another unit.

The eNB may set the uplink signal/channel length and the downlink signal/channel length to the UE.

The settings of the gap, the uplink signal/channel length, and the downlink signal/channel length may be selected from several options. Here, the eNB may designate, to the UE, a list of the options and identifiers of the settings to be selected. The list of options may be defined in a standard. The eNB may collectively or separately give the UE the list of options and the identifiers of the settings to be selected.

The following (1) to (5) will be disclosed as examples of the uplink signal/channel to be mapped to a symbol after a gap:
  (1) Ack/Nack for the downlink data in the same subframe;
  (2) the uplink data for an uplink grant in the same subframe;
  (3) a measurement result of a downlink reference signal in the same subframe;
  (4) an uplink reference signal, for example, a sounding reference signal or an uplink demodulation reference signal; and
  (5) combinations of (1) to (4) above.

The following (1) to (5) will be disclosed as examples of the downlink signal/channel to be mapped to a symbol before the gap:

(1) an L1/L2 control signal/channel that may include one or both of downlink scheduling information and an uplink grant;
(2) the downlink data;
(3) a downlink reference signal;
(4) another downlink signal/channel; and
(5) combinations of (1) to (4) above.

Examples of the other downlink signal/channel to be mapped to the symbol before the gap include a paging signal and a paging channel. The paging channel may be a channel to which a PCCH is mapped. The scheduling information of the channel to which the PCCH is mapped may be mapped.

Examples of the other uplink signal/channel to be mapped to the symbol after the gap include a response signal or a response channel to paging. The response channel to the paging may be a PRACH.

Consequently, the UE can receive the paging and transmit a response to the paging in the same subframe, and reduce the latency in an incoming call process.

Figure 8:
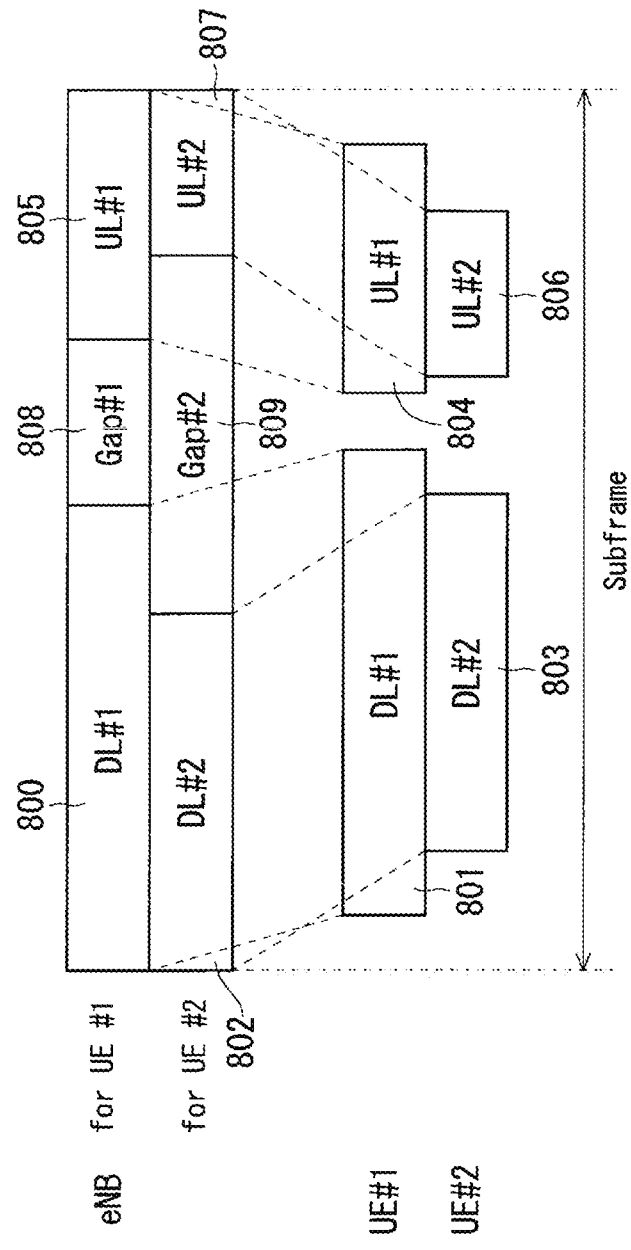
FIG. 8 illustrates a gap provided to each UE.

FIG. 8 illustrates a gap provided to each UE. The eNB transmits a first downlink signal 800 (DL #1) to a UE #1. The UE #1 receives it as a first downlink signal 801 (DL #1) with propagation latency. Similarly, the eNB transmits a second downlink signal 802 (DL #2) to a UE #2. The UE #2 receives it as a second downlink signal 803 (DL #2). The UE #1 transmits a first uplink signal 804 (UL #1) to the eNB. The eNB receives it as a first uplink signal 805 (UL #1). Similarly, the UE #2 transmits a second uplink signal 806 (UL #2) to the eNB. The eNB receives it as a second uplink signal 807 (UL #2). A first gap 808 (Gap #1) is provided between the first downlink signal 800 (DL #1) and the first uplink signal 805 (UL #1). A second gap 809 (Gap #2) is provided between the second downlink signal 802 (DL #2) and the second uplink signal 807 (UL #2).

In FIG. 8, data for the UE #1 obtained by combining the first downlink signal 800 (DL #1), the first gap 808 (Gap #1), and the first uplink signal 805 (UL #1) is multiplexed with data for the UE #2 obtained by combining the second downlink signal 802 (DL #2), the second gap 809 (Gap #2), and the second uplink signal 807 (UL #2) by one of or a combination of frequency-division multiplexing, code-division multiplexing, and space-division multiplexing.

In FIG. 8, enabling the eNB to set the positions and the lengths of the first gap 808 (Gap #1) and the second gap 809 (Gap #2) to each UE allows settings of the lengths of the first downlink signal 800 (DL #1), the second downlink signal 802 (DL #2), the first uplink signal 805 (UL #1), and the second uplink signal 807 (UL #2) to the UE. Although FIG. 8 illustrates an example assuming that the number of the UEs connected to the eNB is 2, the number of the UEs may be 1, or 3 or more.

When the eNB sets a gap to the UE, it may use the propagation latency and the UE processing time, specifically, the time to demodulate and decode a signal, the processing time until generating an uplink signal to be coded from a decoded downlink signal, the time to code and modulate the uplink signal, and the switching time between transmission and reception in the UE.

The eNB may measure the propagation latency up to the UE. The eNB may measure the propagation latency up to the UE through reception of an uplink signal from the UE. For example, Timing Advance (TA) may be used.

The UE may measure variations in timing of a signal received from the eNB relative to the propagation latency once measured, and notify the eNB of the variations.

The eNB may correct the propagation latency based on the variations. This method can reduce the load of measuring the propagation latency in the eNB.

The UE may measure variations in the timing and notify the eNB of the variations consecutively or non-consecutively. Alternatively, the UE may perform only one of the processes.

The UE may notify the eNB of the UE processing time. The UE may notify the eNB of the UE capability or newly another detail. When the UE capability is used, the UE processing time may be derived from a UE category included in the UE capability, or a parameter corresponding to the UE processing time may be added to the UE capability. The method for deriving the UE processing time from the UE category may be defined in a standard, or a table showing association between the UE category and the UE processing time may be separately set. Further, the eNB may set a fixed value to the UE processing time in advance.

Either the eNB or the UE may derive the UE processing time. The UE may notify the eNB of the derived UE processing time.

The eNB may inquire of the UE about the UE processing time. For example, a UE capability enquiry from the eNB to the UE may be used as the inquiry about the UE processing time. The eNB may obtain the UE processing time from the UE using this. The UE capability enquiry may be made using RRC-dedicated signaling.

The eNB determines a gap setting value. The propagation latency and the UE processing time may be used in determining the gap setting value. The eNB notifies the UE of the determined gap setting value. The eNB and the UE reflect the gap setting value.

A default value may be provided to set a gap to each UE. Examples of a situation requiring the default value include a time when the UE is connected to the eNB. When being connected to the eNB, the UE needs to receive the broadcast information and a paging signal and also to transmit a physical random access channel. Here, the UE may receive a downlink signal and transmit an uplink signal, using the default value.

The default value may be set as a value common to the eNBs. The eNBs may set the default value to the UE.

The default value may be set statically in, for example, a standard. Semi-static setting using RRC common signaling may be combined for use with the static setting. The eNB may broadcast the semi-static setting using the RRC common signaling to the UE. For example, the broadcast information may be used as a broadcasting method from the eNB. For example, SIB1 or SIB2 may be used as the broadcast information.

The combined use of the static setting and the semi-static setting enables the default value common to the eNBs to be flexibly changed, depending on a communication state of the UE that is being connected to the eNB, for example, a state of increase in the uplink communication or the downlink communication, etc.

The position and the length of a gap may be directly designated from the eNB to the UE or designated from a list of options, as the default value. The list of options may be given in, for example, a standard. Alternatively, the list of options may be given using RRC signaling. The eNB may set the list of options to the UE.

When the semi-static setting is used, the default value may be a relative value with respect to a setting value statically given. Here, the relative value may be directly designated from the eNB to the UE or designated from a list of options. The list of options may be given in, for example, a standard.

The eNB may notify the UE of the default value as a relative value with respect to a setting value statically given, irrespective of whether the semi-static setting is used. The relative value may be directly designated from the eNB to the UE or designated from the list of options. The list of options may be given in, for example, a standard. The eNB may semi-statically set the list of options to the UE.

In setting a gap to each UE, the eNB may designate, to the UE, the position and the length of the gap using an absolute value or a relative value. The relative value may be designated as, for example, a difference from the default value or a difference from the previous setting value.

The following (1) to (3) will be disclosed as specific examples of a method for setting a gap to each UE:

(1) a semi-static setting;
(2) a dynamic setting; and
(3) a combination of (1) and (2) above.

For example, the RRC-dedicated signaling may be used for the semi-static setting in the (1). For example, the RRC Connection Reconfiguration may be used as the RRC-dedicated signaling. Alternatively, a message 4 in a random access process may be used.

The eNB may directly provide the UE with a setting value of the semi-static setting in the (1), or select the semi-static setting from several options. For example, an option may be given in advance, and the eNB may semi-statically set an identifier of the setting to be selected to the UE. The option to be given in advance may be determined in a standard. Common signaling may be used in the giving. The broadcast information is used as an example of the common signaling. For example, SIB1 is used as the broadcast information. The option may be semi-statically given using the RRC-dedicated signaling.

The list of options given in setting the default value may be used when the gap setting to each UE is selected from several options. The identifier of the setting to be selected may be notified only when the identifier is changed.

For example, MAC signaling (a MAC control element) is used in the dynamic setting in the (2). L1/L2 signaling is used as an alternative example. Consequently, the gap setting can be changed for a short period because the gap setting can be changed for each TTI or for each subframe. The setting details in the (2) may be similar to those in the (1).

In the (2), retransmission control is performed using the MAC signaling, thus enabling reliable notification. The use of the L1/L2 signaling also enables the eNB to notify the UE of the gap setting even there is no downlink user data.

The gap setting in the (2) may be transmitted using the MAC signaling together with TA or separately, when the gap setting is changed according to, for example, change in the propagation latency.

The (3) may be semi-statically and dynamically set using different setting details as one combination. For example, the option may be semi-statically given and an identifier of the setting to be selected may be dynamically given. The same setting details may be semi-statically and dynamically set. For example, the identifier of the setting to be selected may be semi-statically and dynamically set. Specifically, an operation becomes possible such that the eNB can dynamically set the identifier of the setting to be selected when it normally has to semi-statically designate the identifier of the setting to be selected and suddenly transmit and receive a large volume of data.

In the (1) to (3) above, the timing to reflect the gap setting may be notified together. For example, a subframe number may be used as the timing. A duration from receipt of the gap setting to its reflection may be predefined. For example, the number of subframes may be used as the duration. Consequently, the transmission and reception loss caused by change in the gap setting can be avoided even when change in the gap setting cannot be immediately reflected.

In the settings of the (2) to (3) above using the L1/L2 signaling, gap setting data may be disposed in the first symbol of a self-contained subframe. Consequently, the UE can reserve a time from receipt of the gap setting to switching between transmission and reception as long as possible.

Even in the settings of the (2) to (3) above without using the L1/L2 signaling, the gap setting data may be disposed in the first symbol of the self-contained subframe.

Figure 9:
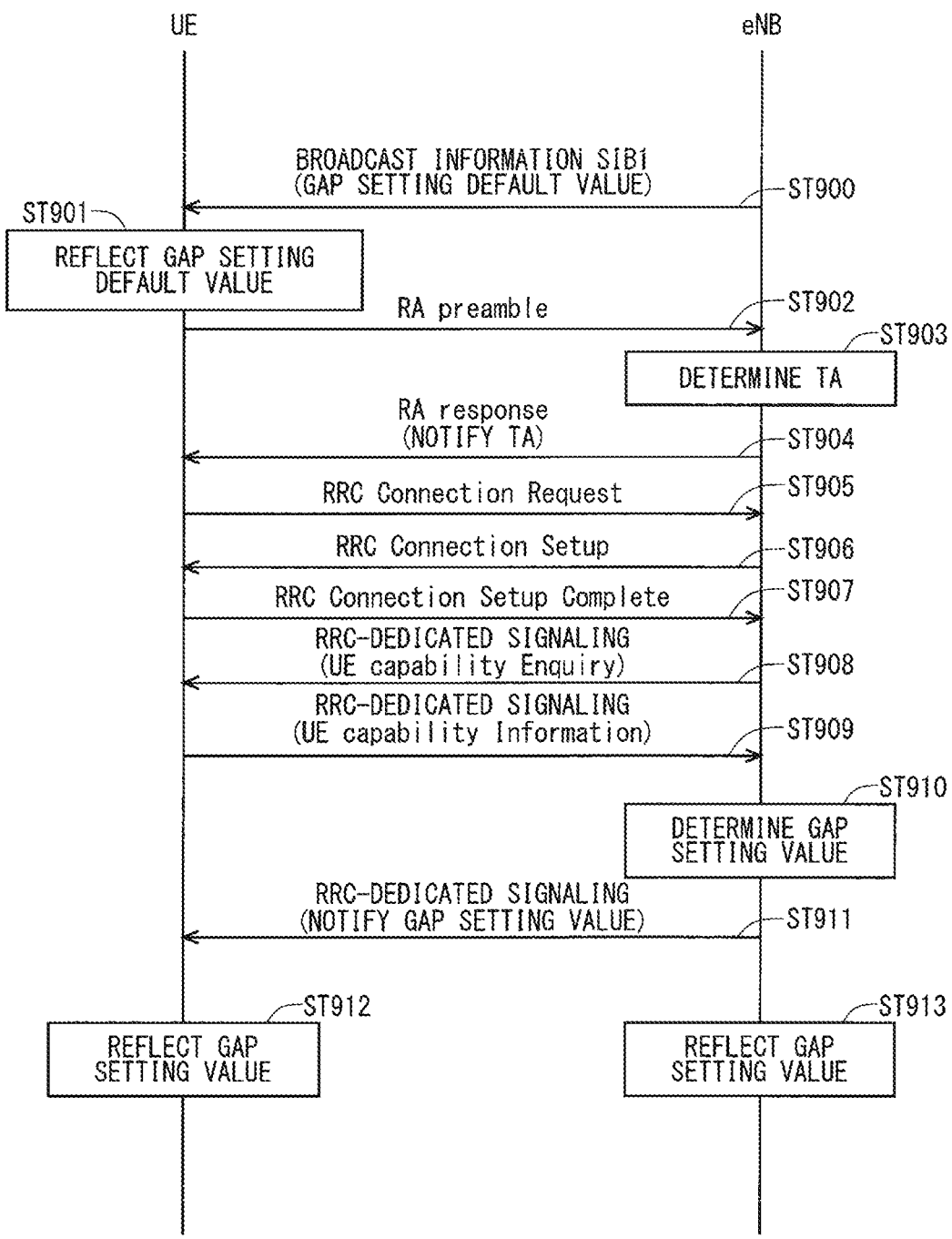
FIG. 9 illustrates an example sequence on setting a gap in a self-contained subframe.

FIG. 9 illustrates an example sequence on setting a gap in a self-contained subframe. FIG. 9 illustrates an example where the eNB, in an initial connection of the UE, determines a gap setting using the TA and the UE capability and semi-statically sets a gap to the UE.

In Step ST900, the eNB broadcasts a default value of the gap setting to the UE. The broadcast information may be used for the broadcasting. For example, SIB1 may be used as the broadcast information.

In Step ST901, the UE reflects the default value of the gap setting.

Steps ST902 to ST907 denote random access processes and RRC Connection Processes. In addition, Timing Advance is measured and notified.

In Step ST902, the UE notifies the eNB of an RA preamble. For example, a PRACH is used in notifying the RA preamble.

In Step ST903, the eNB determines the Timing Advance (TA). For example, the TA may be determined using the received RA preamble.

In Step ST904, the eNB transmits the TA to the UE. The TA may be transmitted together with the uplink grant information for UE transmission. The TA may be transmitted using an RA response.

The UE adjusts its own UL transmission timing based on the TA received in Step ST904. In Step ST905, the UE transmits an RRC Connection Request to the eNB. The radio resources designated by the uplink grant information may be used to transmit the RRC Connection Request.

The eNB transmits an RRC Connection Setup to the UE in Step ST906. The RRC Connection Setup may be transmitted together with a Contention Resolution in a series of RA sequences in Steps ST902 to ST905.

In Step ST907, the UE notifies the eNB of RRC Connection Setup Complete. Consequently, the RRC connection between the eNB and the UE is completed.

In Step ST908, the eNB transmits a UE capability enquiry to the UE. The UE capability enquiry may be transmitted using the RRC-dedicated signaling. The UE transmits the UE capability information to the eNB in Step ST909. The UE capability information may be transmitted using the RRC-dedicated signaling.

In Step ST910, the eNB determines a gap setting value for the UE. The gap setting value may be determined using the TA and the UE capability.

In Step ST911, the eNB transmits the determined gap setting value to the UE. The gap setting value may be transmitted using the RRC-dedicated signaling.

In Step ST912, the UE reflects the gap setting value received from the eNB. In Step ST913, the eNB reflects the gap setting value transmitted to the UE. Consequently, the UE and the eNB communicate using the new gap setting value.

The eNB may schedule a downlink signal and an uplink signal in the same subframe as the subframe with the transmission timing, or in different subframes. The eNB may collectively schedule the signals for a plurality of subframes as an example of the scheduling in the different subframes.

When the downlink signal is scheduled in the same subframe, scheduling information of the downlink signal may be mapped to a downlink control channel. The radio resource to be used as the downlink control channel may be predefined in a standard, or broadcast from the eNB to the UE.

The following (1) to (5) will be disclosed as specific examples of the downlink scheduling information.
(1) A downlink length: The downlink length is given, for example, by the number of symbols or per minimum time in the 5G radio access system. When the downlink length is given by several options, identifiers of the selected details may be given.
(2) A signal/channel type, for example, PDSCH, RS, etc.
(3) Mapping information for the symbol, for example, information necessary for demodulation by the UE: Examples of the information necessary for demodulation by the UE include the length and the position of each of a control channel and a data channel, etc.
(4) Normal downlink scheduling information, for example, a bandwidth to be allocated to downlink transmission, etc: The information may be included in Downlink Control Information (DCI).
(5) Combinations of (1) to (4) above.

When the uplink signal is scheduled in the same subframe, scheduling information of the uplink signal may be mapped to the downlink control channel. The radio resources to be used as the downlink control channel may be predefined in a standard, or broadcast from the eNB to the UE.

The following (1) to (5) will be disclosed as specific examples of the uplink scheduling information.
(1) An uplink length: The uplink length is given, for example, by the number of symbols and per minimum time in the 5G radio access system. When the uplink length is given by several options, identifiers of the selected details may be given.
(2) A signal/channel type, for example, Ack/Nack, CSI, PUSCH, SRS, etc.
(3) Mapping information for the symbol, for example, information necessary for modulation by the UE: Examples of the information necessary for modulation by the UE include the length and the position of each of a control channel and a data channel, etc.
(4) Normal uplink scheduling information, for example, a bandwidth to be allocated to uplink transmission, etc: The information may be included in Uplink Control Information (UCI).
(5) Combinations of (1) to (4) above.

In addition to the downlink scheduling information and the uplink scheduling information, the eNB may transmit, to the UE, an identifier of a subframe to be scheduled. The identifier of a subframe may be, for example, a subframe number. The eNB may transmit a downlink signal and receive an uplink signal in the subframe indicated by the identifier, using the downlink scheduling information and the uplink scheduling information.

The UE may receive a downlink signal and transmit an uplink signal in the subframe indicated by the identifier, using the downlink scheduling information and the uplink scheduling information. The UE may hold the downlink scheduling information and the uplink scheduling information up to the subframe to be scheduled.

Transmission of the identifier from the eNB to the UE enables the scheduling in different subframes when a self-contained subframe is transmitted and received.

In addition to the downlink scheduling information and the uplink scheduling information, the eNB may transmit, to the UE, information indicating latency from the scheduling to transmission of the downlink signal and to reception of the uplink signal. The information may be the one representing the latency per subframe, per symbol, per minimum time in the 5G radio access system, or per another unit. The information may also be an identifier representing one of the options of the latency that is selected from the list.

After a lapse of the latency indicated by the information from transmission of the downlink scheduling information and the uplink scheduling information, the eNB may transmit the downlink signal and receive the uplink signal using the downlink scheduling information and the uplink scheduling information.

After a lapse of the latency indicated by the information from receipt of the downlink scheduling information and the uplink scheduling information, the UE may receive the downlink signal and transmit the uplink signal using the downlink scheduling information and the uplink scheduling information. The UE may hold the downlink scheduling information and the uplink scheduling information until the lapse of the latency indicated by the information.

Transmission of the information from the eNB to the UE enables the scheduling in different subframes when a self-contained subframe is transmitted and received, similarly as when the eNB transmits an identifier of a subframe to be scheduled to the UE.

The information may be statically given in a standard. Alternatively, the information may be semi-statically given using the RRC signaling. Consequently, increase in communication volume caused by transmission of the information can be reduced.

Alternatively, the information may be dynamically given using the MAC signaling or the L1/L2 signaling. Thus, the latency can be flexibly changed.

The eNB may collectively transmit the scheduling information for a plurality of subframes to the UE. The pieces of scheduling information for the respective subframes in the scheduling information may be different from one another. The scheduling information may be transmitted using the RRC-dedicated signaling, the MAC signaling, or the L1/L2 signaling. The RRC Connection Reconfiguration may be used as an example of the RRC-dedicated signaling.

The eNB may transmit downlink signals and receive uplink signals for a plurality of subframes, using the scheduling information for the plurality of subframes.

The UE may also receive the downlink signals and transmit the uplink signals for the plurality of subframes, using the scheduling information for the plurality of subframes.

The eNB may transmit information indicating a scheduling duration in addition to the scheduling information. Examples of the information indicating the scheduling duration may include the number of subframes, the number of symbols, and an integer multiple of the minimum time unit in the 5G radio access system. The scheduling duration may be determined in a standard, or transmitted from the eNB to the UE using the RRC-dedicated signaling. The RRC Connection Reconfiguration may be used as an example of the RRC-dedicated signaling. The scheduling duration may be transmitted using the MAC signaling or the L1/L2 signaling.

When the UE cannot receive the scheduling information, it need not receive the downlink data or transmit the uplink data in a subframe to be scheduled. Once receiving another scheduling information, the UE may resume receiving the downlink data and transmitting the uplink data in a subframe subject to the other scheduling information. Alternatively, the UE may repeatedly use the scheduling information previously received.

Each of the scheduling information for the plurality of subframes and the scheduling duration may be combined with information indicating an identifier of a subframe to be scheduled or information indicating latency from the scheduling to transmission of the downlink signal and to reception of the uplink signal. The information indicating the identifier or the latency may indicate the start of the plurality of subframes to be scheduled.

A default value may be provided for each of the scheduling duration and the information indicating the latency from the scheduling to transmission of the downlink signal and to reception of the uplink signal. The default value may be defined in a standard or set using the common signaling. The broadcast information may be used as an example of the common signaling. SIB1 and SIB2 may be used as the broadcast information, or another SIB may be used. The eNB may notify the UE of the setting of the default value.

When a different gap is set to each of the UEs, a process of avoiding an overlap between the downlink and the uplink among the UEs may be provided. The process is preferably performed in adding a UE.

The eNB may perform the process for the UE, or the UE may perform it. The UE may notify the eNB of a result of the process. The UE may also notify the other UEs of the result of the process.

The following (1) to (4) will be disclosed as specific examples of the process of avoiding an overlap between the downlink and the uplink among the UEs:

(1) prioritizing a UE connected earlier;
(2) prioritizing a UE with a higher priority;
(3) arbitration based on a gap settable range; and
(4) combinations of (1) to (3) above.

In the process of (2), each of the UEs is assigned information indicating a priority. The information may be given in a standard. When the information is given in the standard, it may be determined, for example, by a service to be used by the UE. The eNB may determine the information and transmit it to the UE. A high-level network device may determine the information and transmit it to the UE via the eNB. The information may be held in advance as a parameter in the UE.

When the UE with a higher priority is added, a UE with a lower priority changes the gap setting. The priority assigned to each of the UEs may be determined by the high-level network device, the eNB, or its own UE. The value indicating the priority may be variable. The entity that changes the priority may be the high-level network device, the eNB, or its own UE. The value indicating the priority during connection may differ from that in a non-connection state. For example, when a UE is assigned a priority higher during connection than that in a non-connection state, the frequency of changing the gap setting of the UE and unnecessary signaling can be reduced.

Examples of a criterion for determining the priority in the example of (2) may include the service to be used by the UE. The priority to be assigned to each service may be determined in a standard. The service to be used by the UE may be, for example, mobile broadband communication, packet communication requiring a higher reliability, an emergency notification, etc.

The UE may notify the eNB of the priority in the (2) using the RRC-dedicated signaling. For example, the RRC Connection Reconfiguration may be used as the RRC-dedicated signaling. Alternatively, the message 4 in a random access process may be used. Examples of the notification timing from the UE to the eNB may include when the UE is connected to the eNB, when a service is changed in the UE, and when an emergency notification is transmitted.

In the process of (3), the eNB may derive the gap settable range of the UE, and transmit it to the UE. Each of the UEs may include a gap settable range as a parameter in the UE, and notify the eNB of the gap settable range when being connected to the eNB. For example, the RRC-dedicated signaling may be used to notify the eNB of the gap settable range. The UE may notify the eNB of the gap settable range using the RRC-dedicated signaling, together with or separately from the UE capability.

When a contention between the uplink and the downlink occurs among the UEs in the process of (3), the eNB may have processes of arbitrating the gap setting of each of the UEs based on the gap settable range and notifying the UEs of change in the gap settings.

The eNB may determine the gap setting of each of the UEs, using the demodulation and decoding capabilities of the UE. The following (1) to (3) will be disclosed as specific examples of a method for determining the gap setting of each of the UEs using the demodulation and decoding capabilities:

(1) notifying the eNB of the demodulation and decoding capabilities of the UE in advance;
(2) determining the gap setting according to a past setting and an error rate; and
(3) a combination of (1) and (2) above.

In the process of (1), the eNB may be notified of, for example, the demodulation and decoding capabilities of the UE as the UE capability. Alternatively, another parameter may be used. The timing of notifying the demodulation and decoding capabilities of the UE in the (1) may be, for example, an initial access time from the UE to the eNB.

The UE or the high-level network device may notify the eNB of the demodulation and decoding capabilities. The high-level network device may request the demodulation and decoding capabilities of the UE from the eNB. The eNB may notify the high-level network device of the demodulation and decoding capabilities of the UE. The high-level network device may notify the eNB of the demodulation and decoding capabilities, for example, when the UE performs a handover from a different eNB to the eNB.

In the process of (1), the parameter notified from the UE to the eNB may be notified to the high-level network device, and notified from the high-level network device to all the eNBs being served thereby. Consequently, even when the UE in an idle state moves and is reconnected to the different eNB, the smooth connection is possible because of the inherited gap setting.

The high-level network device may hold the parameter in the process of (1). The high-level network device may delete the parameter. The deletion timing may be, for example, after a lapse of a predetermined time since disconnection of the connection between the UE and an eNB served by the high-level network device. The parameter may be deleted immediately upon the disconnection. The eNB may notify the high-level network device of disconnection of the connection with the UE. The connection may be disconnected by the handover.

The predetermined time may be defined in a standard or uniquely determined by the high-level network device. Alternatively, the parameter may have a validity period. The eNB may notify the high-level network device of the parameter at predetermined intervals. The notification may be made using an interface between the high-level network device and the eNB. The high-level network device may delete the parameter when the validity period expires. The high-level network device may reset the validity period using the notification of the parameter from the eNB. The validity period may be defined in a standard or uniquely determined by the high-level network device.

The eNB may hold the parameter in the process of (1). The eNB may delete the parameter. The deletion timing may be, for example, after a lapse of a predetermined time since disconnection of the connection between the UE and the eNB. The parameter may be deleted immediately upon the disconnection. The connection may be disconnected by the handover.

The predetermined time may be defined in a standard, uniquely determined by the eNB, or notified from the high-level network device to the eNB. The notification may be made using an interface between the high-level network device and the eNB. Alternatively, the parameter may have a validity period. The UE may notify the eNB of the parameter at predetermined intervals. The eNB may delete the parameter when the validity period expires. The eNB may reset the validity period using the notification of the parameter from the UE. The validity period may be defined in a standard, notified from the high-level network device to the eNB, or uniquely determined by the eNB.

In the process of (1), the parameter notified from the UE to the eNB may be notified from the eNB directly to neighboring eNBs as an alternative example. Consequently, the signaling load on the high-level network device can be reduced.

When, for example, an uplink reception error rate is higher than a predetermined threshold, the process of (2) may be a process of extending the gap length of the UE. Similarly, the process of (2) may be a process of shortening the gap length of the UE when the uplink reception error rate continues to be lower than the predetermined threshold for a predetermined duration or longer. The threshold and the predetermined duration may be given fixedly as a standard or semi-statically given from the high-level network device to the eNB.

The reception error rate in the process of (2) may be a downlink reception error rate instead of the uplink reception error rate. Here, the downlink reception error rate is preferably determined using Ack/Nack from the UE. The uplink reception error rate and the downlink reception error rate may be combined for use.

The uplink reception error rate may be an error rate of uplink user data that the eNB itself receives from the UE.

The UE may transition from RRC_CONNECTED to another state as a condition for canceling the gap setting. The gap setting may have a validity period. Upon expiration of the validity period, the gap setting may be canceled. The validity period of the gap setting may be given in a standard, or given semi-statically using the RRC common signaling or the RRC-dedicated signaling. A setting value may be valid until the next gap setting without setting the validity period of the gap setting. The eNB may notify the UE of the validity period.

The gap setting value may be held after canceling the gap setting. The gap setting value may be held until the next gap setting. Alternatively, the gap setting value may be held only for a predetermined duration, and may not be held after the duration. The predetermined duration may be given in a standard, or given semi-statically using the RRC common signaling or the RRC-dedicated signaling. The gap setting value may not be held. When the value is not held, it may be restored to a default value statically predetermined or semi-statically changed. Consequently, the gap setting value can be used at the next gap setting.

The gap setting value is held not only after canceling the gap setting. The eNB, the UE, the high-level network device, or two or more of the eNB, the UE, and the high-level network device may hold the gap setting value.

The eNB may instruct the UE to cancel the gap setting. Alternatively, the UE may voluntarily cancel the setting. When the eNB instructs the UE to cancel the gap setting, the eNB may hold the setting of the UE, for example, the validity period of the gap setting, etc.

The UE may voluntarily cancel the setting, for example, when releasing the connection with the eNB or when being connected to a different eNB. The voluntary canceling of the setting by the UE eliminates the need for notification of the cancellation of the gap setting from the eNB, and can reduce the amount of signaling.

The UE may start a process of setting the gap. Here, the UE may request the eNB to set the gap, for example, increase or decrease the gap length. After receiving a request to set the gap, the eNB may return, to the UE, a notification indicating acceptance or rejection of the request.

The eNB may transmit, to the UE, the notification indicating acceptance or rejection of the request to set the gap before receiving the request from the UE or simultaneously upon receipt of the request from the UE. For example, an advanced notification of the rejection of the request to set the gap from the eNB to the UE enables the UE to save the signaling corresponding to the request.

The following (1) to (4) will be disclosed as specific examples of a signal for requesting a change in the gap setting from the UE to the eNB:

(1) the RRC-dedicated signaling;
(2) the MAC signaling;
(3) an uplink L1/L2 control signal; and
(4) combinations of (1) to (3) above.

The eNB may set each of the position and the length of the gap or both of them together in the gap setting whose setting process is started by the UE. The required length may be set by the number of symbols or per minimum time in the 5G radio access system as a setting value. The length may be set per another unit.

An increment or decrement value from the current length may be set as an alternative example of the setting value. A flag indicating the increment or decrement may be provided, and the setting value may be incremented or decremented by a predetermined length according to the flag. The UE may notify the eNB of the setting value.

The required length may be selected from several options. Here, the eNB gives the UE an option in advance, and semi-statically sets an identifier of the setting to be selected. The option to be given in advance may be determined in a standard. The common signaling may be used in the giving. For example, the broadcast information is used as the common signaling. For example, System Information Block Type1 (SIB1) is used as the broadcast information. The option may be semi-statically given using the RRC-dedicated signaling.

The following (1) to (5) will be disclosed as specific examples of a condition for requesting the increment or decrement in each duration in the gap setting in which the UE starts the setting process:
(1) downlink communication quality, for example, Reference Signal Received Power (RSRP), Reference Signal Received Quality (RSRQ), a downlink reception error rate, etc;
(2) a downlink transmission rate;
(3) uplink communication quality, for example, an uplink reception error rate, an uplink grant designated by the eNB, etc may be used;
(4) an uplink transmission rate; and
(5) combinations of (1) to (4) above.

The specific examples of (1) to (5) may have respective thresholds, and being larger than or equal to each of the thresholds or being smaller than or equal to the threshold may be used as a condition for determining the increment or decrement request. The thresholds may be predetermined in a standard, or given using the RRC common signaling or using the RRC-dedicated signaling. For example, the broadcast information may be used as the RRC common signaling. For example, System Information Block Type1 (SIB1) may be used as the broadcast information. The conditions of being larger than or equal to the threshold or being smaller than or equal to the threshold in the (1) to (5) may be combined for use. The conditions may be one or both of the downlink Qos and the uplink QoS, or combinations of the downlink QoS and the uplink QoS with the thresholds of the (1) to (5).

The high-level network device may mainly set the gap to the UE. The high-level network device may set the gap to the UE through the eNB.

The following (1) to (6) will be disclosed as specific examples of a condition for the high-level network device to mainly set a gap to the UE:
(1) setting of a gap to a UE connected to a neighboring eNB of the eNB, other than the UE;
(2) the propagation latency of the UE;
(3) a processing rate of the UE;
(4) a transmission/reception switching rate of the UE;
(5) a default gap setting of the neighboring eNB of the eNB; and
(6) combinations of (1) to (5) above.

The high-level network device may transmit a request for information on the (1) to the neighboring eNB of the eNB. The neighboring eNB of the eNB may transmit the information on the (1) to the high-level network device.

The high-level network device may transmit a request for information on the (2) to the eNB. The eNB may transmit the information on the (2) to the high-level network device.

The high-level network device may transmit a request for information on the (3) to the eNB. The eNB may transmit the information on the (3) to the high-level network device.

The high-level network device may transmit a request for information on the (4) to the eNB. The eNB may transmit the information on the (4) to the high-level network device.

The high-level network device may transmit a request for information on the (5) to the neighboring eNB of the eNB. The neighboring eNB of the eNB may transmit the information on the (5) to the high-level network device.

The inter-cell interference can be reduced because setting the gap mainly by the high-level network device allows for the gap setting with consideration given to situations of the other eNBs.)

According to the first embodiment, the gap duration of a self-contained subframe can be flexibly set to each UE. The lengths of the uplink and the downlink can be flexibly set to each UE according to the circumstances. Thus, the downlink transmission rate and the uplink transmission rate of each UE can be increased.

Although the self-contained subframe is used in the first embodiment, a predetermined time interval may be used. 3GPP proposes a time interval X (see Non-Patent Document 21). The methods disclosed according to the present invention may be applied to a self-contained time interval X that consists of the downlink and the uplink in one time interval X and returns a response to the downlink in the same time interval X.

First Modification of First Embodiment

The first modification will describe a case where Frequency Division Duplex (FDD) is used as the duplex system. A gap is set in the Time Division Duplex (TDD) according to the first embodiment, whereas a gap is set in the FDD according to the first modification.

In the FDD, a downlink signal and an uplink signal use different frequencies. In communication using a self-contained subframe, frequency resources for transmitting the uplink data are not used during transmission of the downlink data, thus making the transmission inefficient.

Similarly in the FDD, the gap duration common within a cell is useless for the UE whose processing time is shorter.

In the FDD, a plurality of gap settings are allowed for a self-contained subframe structure of each UE. According to the first modification, the eNB maps a downlink signal/channel of each of the self-contained subframe structures of the UE to a symbol before a gap, and maps an uplink signal/channel of the self-contained subframe structure to a signal after the gap. The eNB according to the first modification does not transmit the downlink signal in the self-contained subframe structure during a gap duration. The position and the length of the gap may be separately or collectively set in this modification, similarly as the first embodiment.

A plurality of uplink signals may be multiplexed according to the first modification. The multiplexing may be time-multiplexing. For example, uplink user data and an uplink control signal may be transmitted in the same subframe. The uplink control signal may be, for example, an Ack/Nack signal or a CQI/CSI signal. In the multiplexing, the uplink control signal and another uplink control signal may be transmitted in the same subframe. For example, the CQI/CSI signal may be multiplexed with the Ack/Nack signal.

Similarly, a plurality of downlink signals may be multiplexed according to the first modification. The multiplexing may be time-multiplexing. For example, a downlink control signal and downlink user data may be transmitted in the same subframe. The downlink control signal may be, for example, a notification of an uplink grant. In the multiplexing, the downlink control signal and another downlink control signal may be transmitted in the same subframe. For example, the notification of the uplink grant may be multiplexed with a CQI request.

Similarly, a plurality of self-contained subframe structures may be multiplexed according to the first modification. The multiplexing may be time-multiplexing. For example, a subframe including a downlink control signal and uplink user data may be multiplexed with a subframe including a downlink control signal, downlink user data, and an uplink control signal. The multiplexing may be, for example, multiplexing a subframe including a notification of an uplink grant and uplink user data with a subframe including allocation of downlink resources, downlink user data, and Ack/Nack.

According to the first modification, a subframe with a subframe structure for a non-self-contained subframe may be multiplexed with a self-contained subframe. For example, a self-contained subframe including a downlink control signal, downlink user data, and an uplink control signal may be multiplexed with a subframe including uplink user data to be transmitted as a subframe next to a subframe including an uplink grant. In the example above, the self-contained subframe may be multiplexed with the subframe including the uplink grant.

A gap setting in each subframe may be notified from the eNB to the UE per subframe, or a gap setting together with that for the next subframe may be collectively notified in the first subframe. Here, the first subframe is, for example, a subframe in which an uplink grant is notified. That for the next subframe means the gap setting including that for the uplink user data. The gap setting may be notified using the L1/L2 signaling as necessary. Alternatively, the MAC signaling may be used. Alternatively, the gap setting in the multiplexing may be notified in advance using the RRC signaling.

Figure 10:
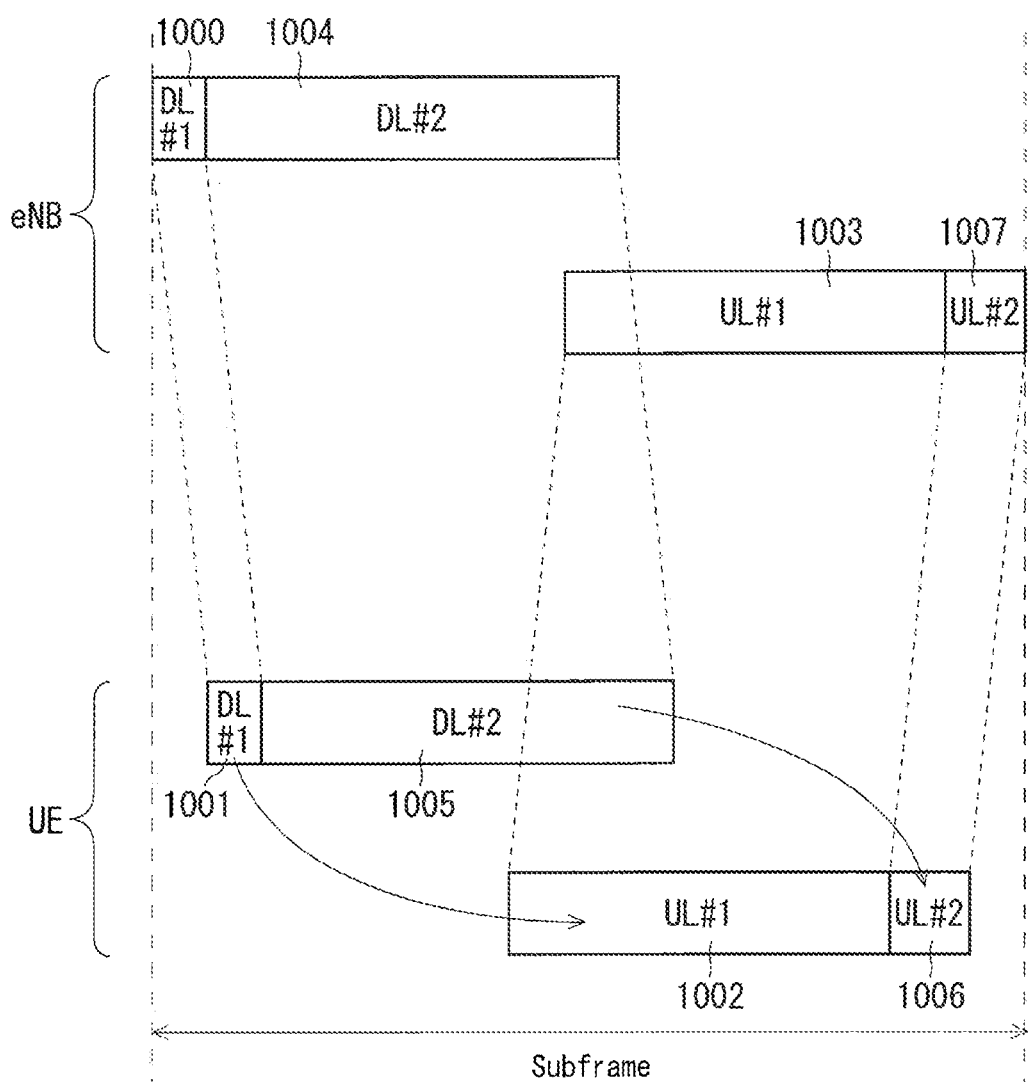
FIG. 10 illustrates an example subframe structure when two gap settings are made for one UE.

FIG. 10 illustrates an example subframe structure when two gap settings are made for one UE. In the example illustrated in FIG. 10, a first self-contained subframe structure is multiplexed with a second self-contained subframe structure.

In the first self-contained subframe structure, the UE receives a first downlink signal 1000 (DL #1) transmitted from the eNB as a first downlink signal 1001 (DL #1). The UE transmits a first uplink signal 1002 (UL #1) based on the first downlink signal 1001 (DL #1). The eNB receives the first uplink signal (UL #1) transmitted from the UE as a first uplink signal 1003 (UL #1).

In the second self-contained subframe structure, the UE receives a second downlink signal 1004 (DL #2) transmitted from the eNB as a second downlink signal 1005 (DL #2). The UE transmits a second uplink signal 1006 (UL #2) based on the second downlink signal 1005 (DL #2). The eNB receives the second uplink signal (UL #2) transmitted from the UE as a second uplink signal 1007 (UL #2).

The gap in the first self-contained subframe structure is a duration between the first downlink signal 1000 and the first uplink signal 1003. The gap in the second self-contained subframe structure is a duration between the second downlink signal 1004 and the second uplink signal 1007.

In FIG. 10, the first downlink signal 1000 may be, for example, a notification of an uplink grant. The first uplink signal 1002 may be uplink user data. The second downlink signal 1004 may be downlink user data. The second uplink signal 1006 may be Ack/Nack. The second downlink signal 1004 may be a signal obtained by multiplexing a notification of allocating downlink resources with the downlink user data.

In FIG. 10, the first downlink signal 1000 may be, for example, a signal including a CSI request and a downlink reference signal. The first uplink signal 1002 may be CSI. The second downlink signal 1004 may be downlink user data. The second uplink signal 1006 may be Ack/Nack.

Similarly as the first embodiment, a gap duration is set to each UE, at least one of an uplink signal and an uplink channel is mapped to a symbol after a gap, and at least one of the uplink signal and the uplink channel is mapped to a signal before the gap. The gap duration may be set to each of the self-contained subframe structures. Specific setting details and the setting procedure are the same as those according to the first embodiment. Consequently, the gap setting in the FDD can be made.

Although the first modification describes time-multiplexing a plurality of self-contained subframe structures, the frequency-multiplexing may be performed. Alternatively, the code-multiplexing may be performed. Alternatively, the spatial multiplexing may be performed. Alternatively, combinations of two or more of the time-multiplexing, the frequency-multiplexing, the code-multiplexing, and the spatial multiplexing may be performed.

Since the first modification enables a plurality of self-contained subframe structures to be multiplexed for transmission, the use efficiency of the uplink signal and the downlink signal and also the downlink transmission rate and the uplink transmission rate can be increased more than those according to the first embodiment.

Second Modification of First Embodiment

The second modification will describe a case where a self-contained subframe is not used. The case where the self-contained subframe is not used differs from a case where a self-contained subframe is used in having only to consider the time to switch between transmission and reception and a distance between the eNB and the UE upon shifting from the downlink to the uplink. When the same gap setting as that of the self-contained subframe is used, the eNB and the UE will have an idle time, thus making their communication inefficient.

According to the second modification, the gap setting is changed depending on whether a subframe is self-contained. When the subframe is not a self-contained subframe, for example, the gap may be shortened without changing the start timing of the gap. Alternatively, a downlink transmission duration may be prolonged by delaying the start timing of the gap to shorten the gap.

The gap setting of the self-contained subframe and the gap setting of a non-self-contained subframe may be given separately, or one of them may be given as a difference with the other.

An example method for changing a gap setting depending on whether a subframe is self-contained may be providing an identifier indicating whether the subframe is self-contained and switching the gap setting according to a value of the identifier. Alternatively, a parameter representing the number of subframes necessary from reception of a downlink signal to transmission of an uplink response may be provided instead of the identifier, and the gap setting may be changed according to a value of the parameter. For example, when the parameter indicates 0, the subframe may be determined as a self-contained subframe.

The eNB may notify the UE of the identifier indicating whether the subframe is self-contained, the gap setting of the self-contained subframe, and the gap setting of the non-self-contained subframe simultaneously or separately. The eNB and the UE may switch the gap setting using only the identifier. For example, the eNB may notify the UE in advance of the gap setting of the self-contained subframe and the gap setting of the non-self-contained subframe. The gap settings of the eNB and the UE may be switched by notifying the identifier indicating whether the subframe is self-contained from the eNB to the UE.

In the switching, the eNB and the UE may use the gap setting of the self-contained subframe and the gap setting of the non-self-contained subframe that have been notified in advance. Consequently, the eNB and the UE can switch the gap settings using only the identifier, and reduce the amount of signaling.

The eNB may determine a value of the identifier or the parameter. The eNB may notify the UE of the value. The UE may determine whether a self-contained subframe is to be used, using the value. In other words, the UE may perform a process for transmitting a response to a downlink signal to the eNB within the subframe, using the value. For example, the UE may assign a higher priority to decoding the downlink user data and coding an Ack/Nack signal than to the other processes within the UE, for example, a process on the device management of the UE.

The UE may notify the eNB of a result of the determination as to whether the self-contained subframe is used. The result may be notified only when a self-contained subframe is used or only when the self-contained subframe is not used. The eNB may determine whether the self-contained subframe is used using the result of determination. Consequently, the following advantages can be obtained. For example, when the UE cannot use the self-contained subframe with the gap setting designated by the eNB, that is, when the uplink transmission in response to the downlink reception in the designated gap setting is too late, a notification of not using the self-contained subframe from the UE to the eNB can prevent variance in the presence or absence of the use of the self-contained subframe and in the gap setting between the eNB and the UE, and failure in transmission from the eNB to the UE or from the UE to the eNB.

The eNB may notify the UE of the gap setting when the self-contained subframe is not used, in addition to the gap setting of the self-contained subframe. The method for setting a gap to each UE when the self-contained subframe is not used may be the same as that for setting a gap to each UE according to the first embodiment. Alternatively, the gap setting when the self-contained subframe is not used may be determined statically in a standard.

The default value of the gap setting may be set to a different value, depending on whether the subframe is self-contained. The way to give the default setting is the same as that according to the first embodiment.

The identifier may have a default value. The default value may be determined in a standard, or given using the RRC common signaling. For example, the broadcast information SIB1 may be used as the RRC common signaling. These hold true for the parameter representing the necessary number of subframes.

When the eNB and the UE establish a connection, the default value of the identifier may be used to indicate whether the self-contained subframe is mainly used. For example, until the eNB and the UE establish a connection, the self-contained subframe may not be used. When the self-contained subframe is used for user data communication after establishing the connection, the default value of the identifier may indicate negation, that is, a none-self-contained subframe.

According to the second modification, the UE may automatically determine whether the self-contained subframe is used. The determination may be made based on the gap setting given from the eNB to the UE. In the determination, the UE may determine to use the self-contained subframe when, for example, a threshold of a gap length is provided and the eNB notifies the UE of a gap length longer than or equal to the threshold.

The eNB may determine the threshold based on the switching time between transmission and reception of the UE, and notify the UE of the threshold. Alternatively, the UE may determine the threshold based on its switching time between transmission and reception, and notify the eNB of the threshold. The eNB may notify the UE of whether to accept or reject the threshold notified by the UE.

The following (1) to (3) will be disclosed as specific examples of a method for changing the gap setting depending on whether the subframe is self-contained:

(1) semi-statically;
(2) dynamically; and
(3) a combination of (1) and (2) above.

For example, the RRC-dedicated signaling may be used for the semi-static setting in the (1). For example, the RRC Connection Reconfiguration and the message 4 in a random access process are used as the RRC-dedicated signaling.

For example, the MAC signaling may be used for the dynamic setting in the (2). The L1/L2 signaling may be used as an alternative example.

The setting indicating whether the subframe is self-contained may be made in the (3) semi-statically or dynamically. The setting is useful when, for example, data is transmitted in a non-self-contained subframe under circumstances where a large volume of data needs to be suddenly transmitted and the transmission in a self-contained subframe is too late.

The methods (1) to (3) above may be performed from the eNB to the UE or from the UE to the eNB. The eNB may notify the UE to accept or reject the notification from the UE.

The setting timing may coincide with, for example, the UE setting using the RRC-dedicated signaling.

Figure 11:
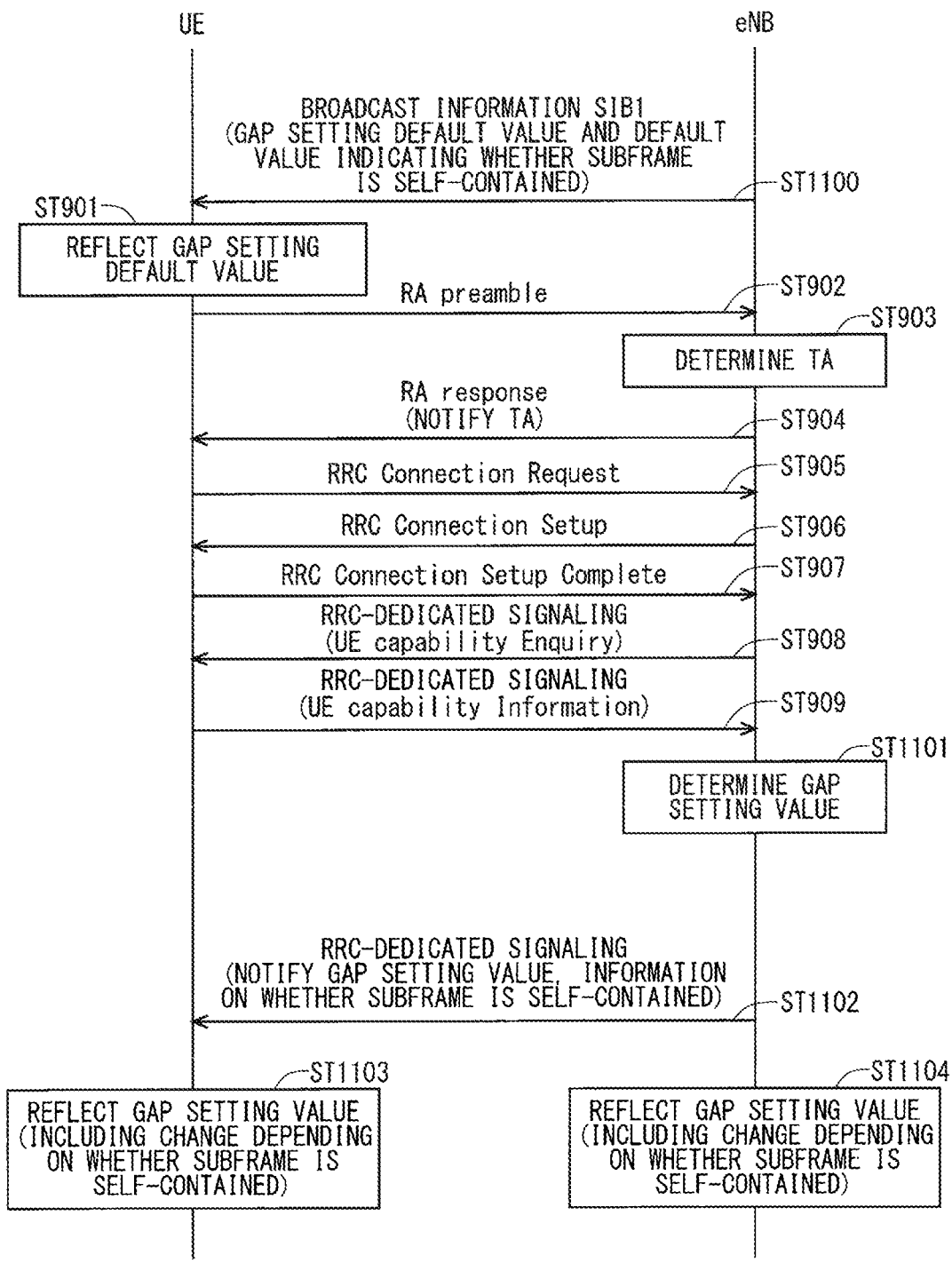
FIG. 11 illustrates an example sequence on a method for changing the gap setting depending on whether a subframe is self-contained.

FIG. 11 illustrates an example sequence on a method for changing the gap setting depending on whether a subframe is self-contained. Since the sequence illustrated in FIG. 11 includes the same steps as those of the sequence illustrated in FIG. 9, the same step numbers will be assigned to the same Steps and the common description thereof will be omitted.

Step ST1100 of FIG. 11 replaces Step ST900 of FIG. 9. In Step ST1100, the eNB notifies the UE of the broadcast information SIB1 including a gap setting default value and a default value indicating whether a subframe is self-contained. The UE obtains the gap setting default value and the default value indicating whether a subframe is self-contained that are included in the broadcast information SIB1 transmitted from the eNB. The UE may obtain the gap setting default values for both of the self-contained subframe and the non-self-contained subframe.

Step ST1101 of FIG. 11 replaces Step ST910 of FIG. 9. In Step ST1101, the eNB determines a gap setting value for the self-contained subframe and a gap setting value for the non-self-contained subframe.

In Step ST1101 of FIG. 11, the UE sets whether a subframe to be normally used is self-contained, based on the default value indicating whether the subframe is self-contained. Unless otherwise particularly designated by the eNB in the following, the UE determines whether a subframe to be used is self-contained, based on the default value.

Step ST1102 of FIG. 11 replaces Step ST911 of FIG. 9. In Step ST1102, the eNB notifies the UE of whether the subframe is self-contained together with the gap setting value. Both of a setting value for the self-contained subframe and a setting value for the non-self-contained subframe, or one of the setting values, specifically, only the one designated by whether the subframe is self-contained may be notified as the gap setting value in Step ST1102. In Step ST1102, the gap setting value may be notified separately using a plurality of RRC-dedicated signalings.

Step ST1103 of FIG. 11 replaces Step ST912 of FIG. 9. In Step ST1103, the UE sets a gap depending on whether the subframe is self-contained and according to the gap setting value notified from the eNB. The UE also switches whether the subframe is self-contained. The gap setting is changed if the gap setting value notified from the eNB is changed, even without any change in whether the subframe is self-contained.

Step ST1104 of FIG. 11 replaces Step ST913 of FIG. 9. In Step ST1104, the eNB sets a gap depending on whether the subframe is self-contained and according to the gap setting value notified to the UE. The eNB also switches whether the subframe is self-contained. The gap setting is changed if the gap setting value notified to the UE is changed, even without any change in whether the subframe is self-contained.

The second modification can reduce useless communication and increase the transmission efficiency between the uplink and the downlink, because the gap setting can be flexibly changed between when the subframe is self-contained and when the subframe is not self-contained.

Third Modification of First Embodiment

The third modification will describe use of various types of the self-contained subframe. As described in Non-Patent Document 9, three types of the self-contained subframe are proposed. The required downlink data size and uplink data size differ, depending on the type. For example, the downlink data becomes larger than the uplink data in a self-contained subframe in which the downlink data and the Ack/Nack in response to the downlink data are transmitted. Conversely, the uplink data becomes larger than the downlink data in a self-contained subframe in which an uplink scheduling grant and uplink data are transmitted. Thus, when the gap settings are the same irrespective of the types of their self-contained subframes, the downlink size and the uplink size are insufficient or wasteful depending on the type of the self-contained subframe.

According to the third modification, gap settings are provided for the respective types of the self-contained subframes, a type of the self-contained subframe is notified, and the gap setting is changed according to the notified type of the self-contained subframe as necessary.

According to the third modification, the eNB may notify the UE of the gap settings of the respective types of the self-contained subframes and identifiers indicating the types of the self-contained subframes separately or simultaneously. The eNB and the UE may switch the gap setting using only the identifiers. For example, the eNB may notify the UE in advance of the gap settings of the respective types of the self-contained subframes.

The gap settings of the eNB and the UE may be switched by notifying the identifier indicating the type of the self-contained subframe from the eNB to the UE. In the switching, the eNB and the UE may use the gap settings of the respective types of the self-contained subframes that have been notified in advance. Consequently, the eNB and the UE can switch the gap settings using only the identifier, and reduce the amount of signaling.

The gap setting according to the third modification may have a default value, similarly as the first embodiment. The default value may be determined in a standard, or given using the RRC common signaling. For example, the broadcast information SIB1 or SIB2 may be used as the RRC common signaling. Unlike the first embodiment, the default value may be given for each type of the self-contained subframes.

In the gap settings according to the third modification, information for showing association with the types of the self-contained subframes may be notified as well. The eNB may notify the UE in advance of the gap settings and the information for showing association with the types of the self-contained subframes. The eNB may transmit an identifier indicating the type of the self-contained subframe to the UE. The UE may determine the gap setting and set the gap. In the determination, the identifier, the gap setting, and the information for showing association with the types of the self-contained subframes may be used.

The following (1) to (4) will be disclosed as specific examples of a method for giving the gap setting to each type of the self-contained subframes.

(1) A static setting: The setting may be set in, for example, a standard.
(2) A semi-static setting: The setting may be made using, for example, the RRC common signaling or the RRC-dedicated signaling.
(3) A dynamic setting: The setting may be made using, for example, the MAC signaling or the L1/L2 signaling.
(4) Combinations of (1) to (3) above.

When the RRC common signaling is used for the semi-static setting in the (2), for example, the broadcast information SIB1 or SIB2 may be used. The other SIBs may be used.

When, for example, the static setting is made as a default value and the default value is changed in the (3), the setting may be changed in the semi-static method.

The methods (1) to (4) may be performed from the eNB to the UE or from the UE to the eNB. The eNB may notify the UE to accept or reject the notification from the UE.

The notification of the type of the self-contained subframe according to the third modification may be made per subframe as necessary or as a use pattern collectively using a plurality of subframes.

The eNB and the UE may use, as the use pattern, information indicating subframes in association with identifiers indicating types of self-contained subframes to be used.

The consecutive subframe numbers may be used as the information indicating the subframes. An example of the use pattern will be described below. In a subframe number n, the type of the self-contained subframe including the downlink user data and the uplink Ack/Nack is used. In a subframe number n+1, the type of the self-contained subframe including the downlink user data and the uplink Ack/Nack is used. In a subframe number n+2, the type of the self-contained subframe including an uplink grant and the uplink user data is used. In a subframe number n+3, the type of the self-contained subframe including the CQI request and the CQI notification is used.

Alternatively, the number of subframes and the first subframe number may be used as the information indicating the subframes. In the aforementioned example, the number of subframes is 4, and the first subframe number is n.

Alternatively, the eNB and the UE may communicate with the pattern repeated. The eNB may notify the UE of a period of the repetition. The order of the subframes may be used in association with the types of the subframes as the pattern. For example, the following may be used. Suppose the period of the repetition to be 2. In the first subframe, the type of the subframe including the downlink user data and Ack/Nack is used. In the second subframe, the type of the subframe including the uplink grant and the uplink user data is used.

In the examples above, the subframe including the downlink user data and the Ack/Nack and the subframe including the uplink grant and the uplink user data are alternately repeated. In the repetition, information indicating the timing of the first subframe may be provided. The subframe number or a remainder from the period of the subframe number may be provided as the information. The eNB may notify the UE of a validity time limit of the repetition. The validity time limit may be given as, for example, the number of repetitions to be continued. Alternatively, the subframe number or the number of subframes up to expiration of the validity time limit may be provided as the validity time limit.

Alternatively, the eNB may provide the UE with a period for each subframe type as the use pattern. The timing of the subframe using the type may be provided together with the period. The timing may be given by, for example, a remainder from the period of the subframe number. The period may be given by the number of subframes. The period may be given per another unit.

A priority may be assigned to each type of the use pattern. The priority may be assigned using the period. For example, a higher priority may be assigned to a type of a subframe with a longer period. This enables determination of which subframe type the eNB and the UE use when a contention among a plurality of types occurs.

A default subframe type may be assigned to a subframe to which no type is assigned in the use pattern. For example, the default subframe type may be a subframe including the downlink user data and Ack/Nack, and a subframe including the uplink grant and the uplink user data may be assigned to a subframe having a remainder of 1 when its subframe number is divided by 2. When a subframe including the CQI request and the CQI notification is assigned to a subframe having a remainder of 2 when its subframe number is divided by 4, a subframe having a remainder of 0 when its subframe number is divided by 4 may be assigned to the subframe including the downlink user data and Ack/Nack that is the default subframe type.

The following (1) to (4) will be disclosed as specific examples of a method for notifying a type of the self-contained subframe according to the third modification.
(1) A static notification: A use pattern of the type of the self-contained subframe may be determined in, for example, a standard.
(2) A semi-static setting: A use pattern of the type of the self-contained subframe may be notified using, for example, the RRC common signaling or the RRC-dedicated signaling.
(3) A dynamic setting: For example, the MAC signaling or the L1/L2 signaling may be used.
(4) Combinations of (1) to (3) above.

When the RRC common signaling is used in the semi-static setting of (2), a use pattern of a type of a subframe common within a cell may be notified. When the RRC-dedicated signaling is used, a use pattern of a type of a subframe per UE may be notified.

In the (4), for example, after the use pattern of the self-contained subframe is semi-statically set using the RRC-dedicated signaling, the type of the self-contained subframe may be dynamically set using the L1/L2 signaling. When a large volume of data needs to be suddenly transmitted, this setting can flexibly change the use pattern set semi-statically, and flexibly accommodate the sudden transmission of data. When it is necessary to use the same pattern as that of the previous subframe due to occurrence of retransmission, dynamically setting the type of the self-contained subframe to be used in the retransmission enables the retransmission in the next subframe without any need for waiting for the retransmission until the same pattern as that of the previous subframe appears in a use pattern defined in the use pattern. Thus, latency caused by the retransmission can be reduced.

When the gap setting is not changed even with change in the type of the self-contained subframe in the (1) to (4) above, a process for omitting a notification of the type of the self-contained subframe may be provided. This process can reduce the amount of signaling to the UE when the gap setting is not changed by the self-contained subframe. The eNB may notify the UE of the (1) to (4) above.

For example, the number of subframes to be set, the start subframe number of the use pattern, and a sequence of subframe-type identifiers may be used as the setting details of the use pattern of the type of the self-contained subframe. Alternatively, for example, the subframe numbers may be directly associated with the subframe-type identifiers.

The use pattern of the type of the self-contained subframe may or may not have a validity time limit. When the validity time limit is not provided, a periodic transmission may be performed according to the use pattern. When the validity time limit is provided, it may be provided once (one period), or a valid number of times or a validity time may be designated separately.

The valid number of times or the validity time may be designated by being predefined in a standard or given using the RRC common signaling or the RRC-dedicated signaling. Alternatively, the MAC signaling may be used.

The eNB may determine the valid number of times or the validity time. The eNB may notify the UE of the valid number of times or the validity time. Alternatively, the high-level network device may determine the valid number of times or the validity time. The high-level network device may notify the eNB of the valid number of times or the validity time.

The use pattern of the self-contained subframe may have a default value. The default value may be determined in a standard, or given using the RRC common signaling. For example, the broadcast information SIB1 or SIB2 may be used as the RRC common signaling.

The eNB may determine the default value. The eNB may notify the UE of the default value. Alternatively, the high-level network device may determine the default value. The high-level network device may notify the eNB of the default value.

The entity that sets the gap to each type of the self-contained subframes may be the high-level network device, the eNB, or its own UE according to the third modification. When the UE sets the length of the gap, it may notify the eNB of the setting details, and the eNB may return a response of acceptance or rejection to the UE.

FIG. 12 illustrates an example sequence on a method for changing the gap setting according to a type of the self-contained subframe. Since the sequence illustrated in FIG. 12 includes the same steps as those of the sequence illustrated in FIG. 9, the same step numbers will be assigned to the same Steps and the common description thereof will be omitted.

Step ST1200 of FIG. 12 replaces Step ST900 of FIG. 9. In Step ST1200, the eNB notifies the UE of the broadcast information SIB1 including the gap setting default value and a self-contained-subframe use pattern default value. The UE obtains the gap setting default value and the self-contained-subframe use pattern default value that are included in the broadcast information SIB1 transmitted from the eNB. The gap setting default value may be obtained from a value of each type of the self-contained subframes.

Step ST1201 of FIG. 12 replaces Step ST908 of FIG. 9. In Step ST1201, the eNB makes a UE capability enquiry to the UE using the RRC-dedicated signaling. This enquiry enables the eNB to obtain the UE capability. Here, the UE capability for each type of the self-contained subframes may be inquired.

Step ST1202 of FIG. 12 replaces Step ST909 of FIG. 9. In Step ST1202, the UE notifies the eNB of UE capability information using the RRC-dedicated signaling as a response to the UE capability enquiry. When inquired of the UE capability for each type of the self-contained subframes in Step ST1201, the UE notifies the UE capability for each type of the self-contained subframes.

Step ST1203 of FIG. 12 replaces Step ST910 of FIG. 9. In Step ST1203, the eNB determines a gap setting value for each type of the self-contained subframes.

Step ST1204 of FIG. 12 replaces Step ST911 of FIG. 9. In Step ST1204, the eNB notifies the UE of a use pattern of the self-contained subframe together with the gap setting value for each type of the self-contained subframes. In Step ST1204, the eNB notifies the UE of the gap setting value for each type of the self-contained subframes and the use pattern of the self-contained subframe in RRC Connection Setup.

Step ST1205 of FIG. 12 replaces Step ST912 of FIG. 9. In Step ST1205, the UE sets a gap for each type of the self-contained subframes. The UE also switches the type of the self-contained subframe. The gap setting is changed if the gap setting value notified from the eNB is changed, even without any change in whether the subframe is self-contained.

Step ST1206 of FIG. 12 replaces Step ST913 of FIG. 9. In Step ST1206, the eNB sets a gap for each type of the self-contained subframes. The eNB also switches the type of the self-contained subframe. The gap setting is changed if the gap setting value notified to the UE is changed, even without any change in whether the subframe is self-contained.

The third modification can reduce useless communication and increase the transmission efficiency between the uplink and the downlink, because the gap setting can be flexibly changed according to the type of the self-contained subframe.

Fourth Modification of First Embodiment

The fourth modification will describe a radio communication system that supports a plurality of services.

5G assumes its application to various services such as mobile broadband communication, automated driving, and mission-critical communication. 5G also assumes that one UE supports a plurality of services. This holds true for, for example, when unicast communication or Multimedia Broadcast/Multicast Service (MBMS) is performed.

The subframe period, the number of symbols per subframe, and whether the self-contained subframe is used differ, depending on the service of 5G. Thus, when one UE supports a plurality of services, the gap setting set to one service is not applicable to the other services.

According to the fourth modification, the eNB sets a plurality of gaps to one UE.

According to the fourth modification, a gap is set to each service to be used by the UE. The position and the length of the gap may be used as the setting details in the fourth modification, similarly as the first embodiment. The position and the length of the gap may be given as its ratio to a subframe length because services with different subframe lengths are used in the fourth modification. The eNB may set a gap to each group of services to be used by the UE.

The eNB may set a gap to each HARQ process in the fourth modification. Alternatively, a gap may be set to each group of HARQ processes. Even when, for example, one MAC layer is shared among a plurality of services, classifying HARQ processes to be used in each service enables the gap setting per service.

The eNB may notify the UE of an identifier indicating each of the HARQ processes using the L1/L2 signaling. For example, the downlink control information may be used. The gap may be set to each of the HARQ processes in the fourth modification. Regarding the groups of the HARQ processes, the eNB may notify the UE of an association between the groups of the HARQ processes and the HARQ processes. The notification may be made using the RRC signaling, the MAC signaling, or the L1/L2 signaling.

The following (1) to (3) will be disclosed as specific examples of a method for giving the identifiers of the services and the gap setting. The details of these specific examples are the same as those according to the second modification of the first embodiment.

(1) A semi-static setting: The setting may be made using, for example, the RRC common signaling or the RRC-dedicated signaling.

(2) A dynamic setting: For example, the MAC signaling or the L1/L2 signaling may be used.

(3) A combination of (1) and (2) above.

According to the fourth modification, the eNB may set, to the UE, identifiers of services or groups of the services, and the gap setting for each of the services or for each of the groups of the services simultaneously or separately. The eNB and the UE may switch the gap setting using only the identifiers. For example, the eNB may notify the UE in advance of the gap setting for each of the services or for each of the groups of the services. The gap settings of the eNB and the UE may be switched by notifying, from the eNB to the UE, the identifiers of the services or the groups of the services.

Similarly, the eNB may set, to the UE, identifiers of HARQ processes or groups of the processes, and the gap setting for each of the services or for each of the groups of the services simultaneously or separately according to the fourth modification. The eNB and the UE may switch the gap settings using only the identifiers.

Figure 13:
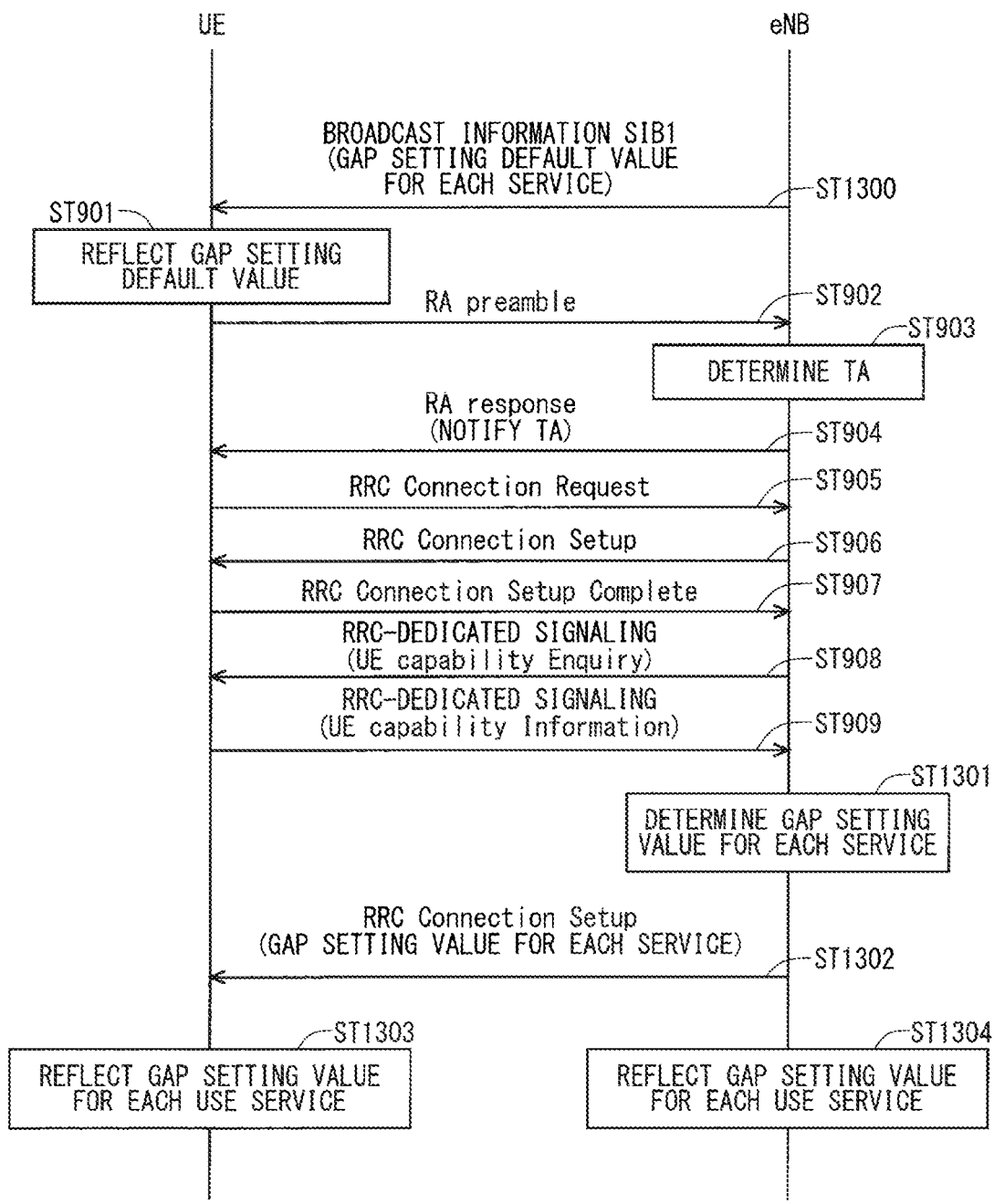
FIG. 13 illustrates an example sequence on a method for changing the gap setting according to a use service of the UE.

FIG. 13 illustrates an example sequence on a method for changing the gap setting according to a use service of the UE. Since the sequence illustrated in FIG. 13 includes the same steps as those of the sequence illustrated in FIG. 9, the same step numbers will be assigned to the same Steps and the common description thereof will be omitted.

Step ST1300 of FIG. 13 replaces Step ST900 of FIG. 9. In Step ST1300, the eNB notifies the UE of the broadcast information SIB1 including the gap setting default value. The UE obtains the gap setting default value included in the broadcast information SIB1 transmitted from the eNB. A default value for each service may be notified as the gap setting default value.

Step ST1301 of FIG. 13 replaces Step ST910 of FIG. 9. In Step ST1301, the eNB determines a gap setting value for each service.

Step ST1302 of FIG. 13 replaces Step ST911 of FIG. 9. In Step ST1302, the eNB notifies the UE of the gap setting value for each service. In Step ST1302, the eNB notifies the UE of the gap setting value for each service in the RRC Connection Setup.

Step ST1303 of FIG. 13 replaces Step ST912 of FIG. 9. In Step ST1303, the UE reflects the gap setting for each use service, according to the gap setting value notified from the eNB.

Step ST1304 of FIG. 13 replaces Step ST913 of FIG. 9. In Step ST1304, the eNB reflects the gap setting for each use service, according to the gap setting value notified to the UE.

According to the fourth modification, the spectral efficiency in each of the services can be increased because a different gap setting to the service allows for the appropriate setting for the service.

Second Embodiment

During communication using different types of the self-contained subframes in the same eNB with transmission and reception in the TDD being dynamically changed, the downlink transmission coincides with the uplink reception, thus causing a problem with interference of the downlink transmission to the uplink reception (see Non-Patent Document 14).

The second embodiment will disclose a method for solving such a problem.

A frequency free space provided between UEs reduces the interference of the downlink transmission to the uplink reception. The eNB may determine the free space. The eNB may notify the UEs of the free space.

Here, it is preferred to suppress a spectrum of a transmitted wave other than that at a sub-carrier bandwidth using a method, for example, the Filtered-OFDM (see Non-Patent Document 15).

The eNB or the UE may suppress the spectrum. Alternatively, both the eNB and the UE may suppress the spectrum.

The following (1) and (2) will be disclosed as specific examples of a time unit in which the free space is provided:
(1) per subframe; and
(2) per symbol.

The free space may be provided per TTI in the specific examples of (1) and (2).

The eNB may change the setting of the free space per TTI in the (1) and (2). For example, the eNB may provide a free space in a symbol at the center of a subframe in a certain TTI, and provide a free space in the last symbol of a subframe in the next TTI. When 1 TTI consists of a plurality of subframes, for example, the eNB may set a free space in the first subframe in a certain TTI, and set a free space in the last subframe in the next TTI. For example, the eNB may shift, per TTI, from the setting of (1) to the setting of (2) or from the setting of (2) to the setting of (1).

The bandwidth of a free space may be determined in a standard, or based on the characteristics of the eNB or the UE. The characteristics may be, for example, a frequency filter capability.

For example, the UE may transmit the characteristics of the UE to the eNB. Thus, the UE may notify the eNB of information for determining the bandwidth of the free space, instead of the bandwidth of the free space. The notification means may be, for example, the RRC-dedicated signaling. The information may be transmitted as, for example, the UE capability or another parameter using the RRC-dedicated signaling.

The following (1) to (3) will be disclosed as examples of the arrangement of the free space and the use frequency resources:

(1) the use frequency resources are narrowed without shifting them to reserve a free space;
(2) the use frequency resources are shifted without narrowing them to reserve a free space; and
(3) the use frequency resources are shifted and narrowed to reserve a free space.

In the (1) to (3) above, for example, the use frequencies allocated from the eNB to two UEs of a UE #1 and a UE #2 are assumed to be f1L to f1H (f1L<f1H) and f2L to f2H (f2L<f2H), respectively. The frequency of the UE #1 is assumed to be lower than that of the UE #2. The free space is assumed to be a space between fVL and fVH (fVL<fVH). The bandwidths of the UE #1 and the UE #2 are assumed to be $\Delta f1$ and $\Delta f2$, respectively. In other words, $\Delta f1=f1H-f1L$ and $\Delta f2=f2H-f2L$ hold.

In the (1), f1L and f2H are not changed even with the free space. The bandwidths with the free space are smaller than or equal to $\Delta f1$ and $\Delta f2$. In other words, the frequency of the UE #1 with the free space ranges from f1L to min (f1H, fVL), and the frequency of the UE #2 with the free space ranges from max (f2L, f2H) to fVH. Here, min (A, B) indicates a smaller value out of A and B, whereas max (A, B) indicates a larger value out of A and B. fVL and fVH may be any values.

In the (2), $\Delta f1$ and $\Delta f2$ are not changed. In other words, the use frequencies of the UE #1 and the UE #2 with the free space are fVL-$\Delta f1$~fVL and fVH~fVH+$\Delta f2$, respectively. With the free space, the highest and the lowest frequencies of each of the use frequencies of the UE #1 and the UE #2 are changed. fVL and fVH may be any values.

In the (3), f1L, f2H, $\Delta f1$, and $\Delta f2$ are changed. In other words, with the free space, the frequency band of the UE #1 is f1L-(f1H-fVL)+$\alpha$~fVL, and the bandwidth of the UE #1 is $\Delta f1-\alpha$. The frequency band of the UE #2 is fVH~f2H+(fVH-f2L)-$\beta$, and the uplink bandwidth of the UE #2 is $\Delta f2-\beta$. Here, $\alpha$ and $\beta$ are decrements of the frequency bands of the UE #1 and the UE #2, respectively.

The following (1) to (3) will be disclosed as information necessary for the eNB to determine one of the (1) to (3) above as the arrangement of the free space and the use frequency resources.

(1) The frequency resources used by the other UEs.
(2) The load of the eNB: The following five examples of (2-1) to (2-5) will be disclosed as specific examples of the load of the eNB;
(2-1) information on a buffer volume of the uplink user data for a UE to which a free space is to be set;
(2-2) information on a buffer volume of the downlink user data for the UE to which the free space is to be set;
(2-3) information on a buffer volume of the uplink user data for the other UEs;
(2-4) information on a buffer volume of the downlink user data for the other UEs; and
(2-5) combinations of (2-1) to (2-4) above.
(3) Combinations of (1) and (2) above.

The UE to which the free space is to be set and the other UEs may notify the eNB of the (2-1) and (2-3) above. The MAC signaling may be used for the notification.

Regarding the (2-2) above, for example, when the frequency resources of the other UEs are in proximity to those of the UE to which the free space is to be set and the uplink or downlink user data of the UE to which the free space is to be set has a large buffer volume, the use frequency resources of the UE to which the free space is to be set may be shifted without narrowing them to reserve the free space. In other words, when the amount of the uplink user data to be transmitted is larger and the uplink or downlink user data of the other UEs has a smaller buffer volume, the use frequency resources of the UE to which the free space is to be set may be shifted without narrowing them to reserve the free space.

Here, the frequency resources of the other UEs may be changed. Alternatively, for example, when the frequency resources of the other UEs are in proximity to those of the UE to which the free space is to be set, the uplink or downlink user data of the other UEs has a large buffer volume, and the uplink or downlink user data of the UE to which the free space is to be set has a smaller buffer volume, the use frequency resources of the UE to which the free space is to be set may be narrowed without shifting them to reserve the free space.

According to the second embodiment, the eNB may change the frequency resources of the other UEs. The eNB may perform scheduling to change the frequency resources of the other UEs.

Figure 14:
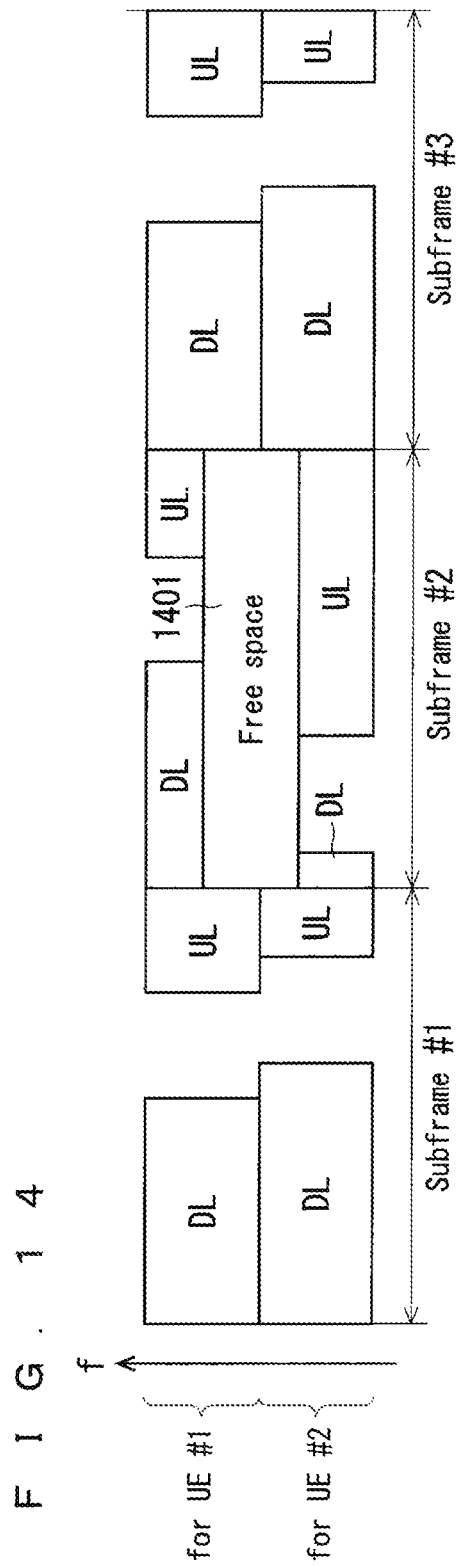
FIG. 14 illustrates an example relationship between a free space and use frequency resources when the free space is set per subframe.
Figure 15:
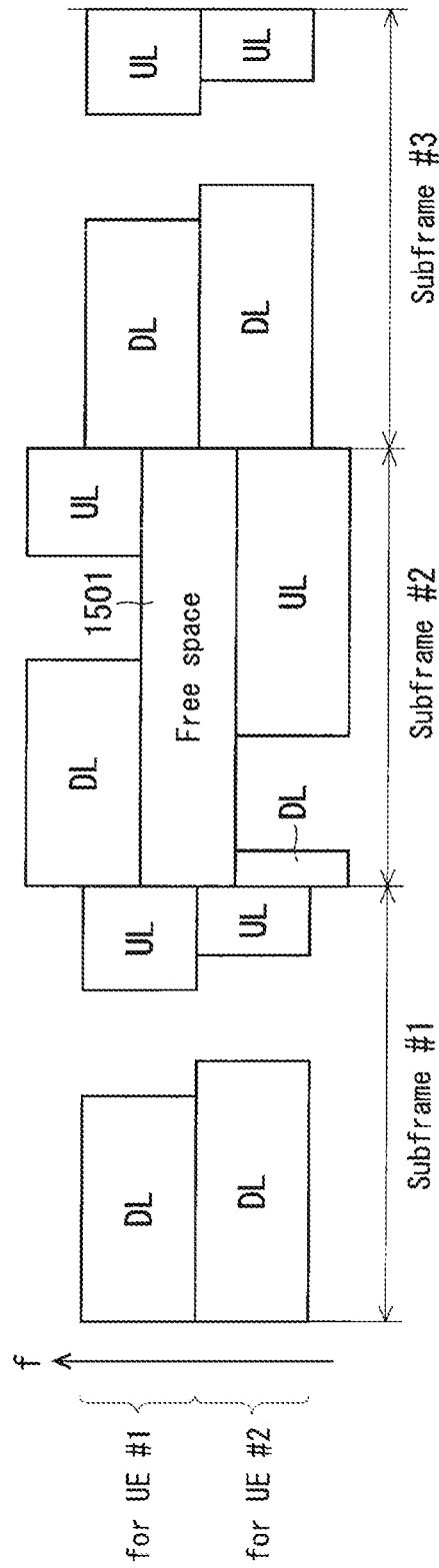
FIG. 15 illustrates another example relationship between the free space and the use frequency resources when the free space is set per subframe.
Figure 16:
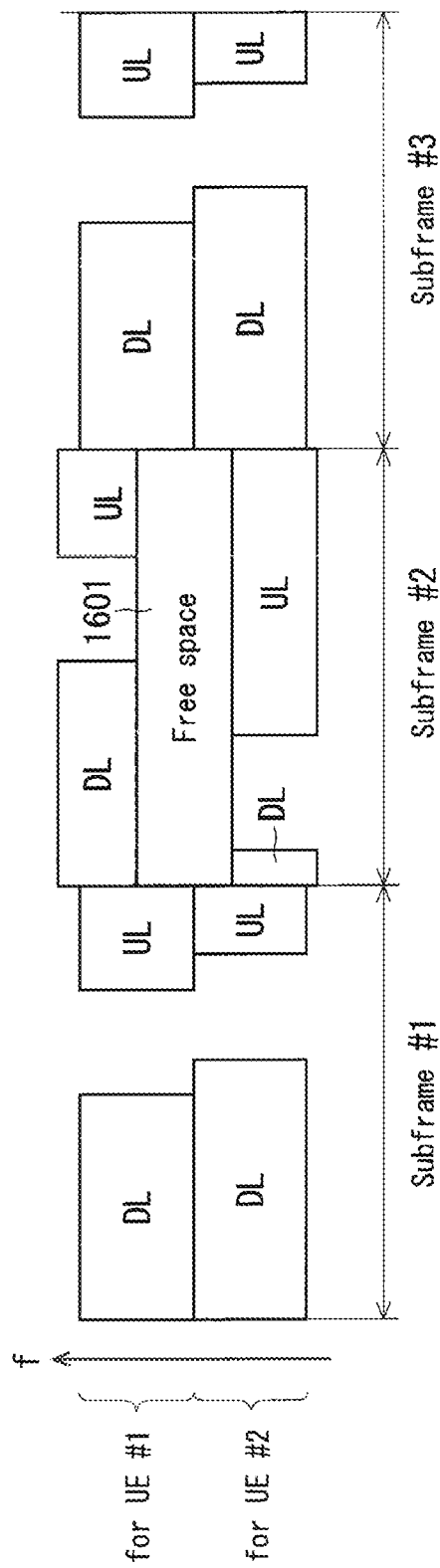
FIG. 16 illustrates yet another example relationship between the free space and the use frequency resources when the free space is set per subframe.

FIG. 14 illustrates an example relationship between the free space and the use frequency resources when the free space is set per subframe. FIG. 15 illustrates another example relationship between the free space and the use frequency resources when the free space is set per subframe. FIG. 16 illustrates yet another example relationship between the free space and the use frequency resources when the free space is set per subframe. In FIGS. 14 to 16, the vertical axis represents a frequency f. FIGS. 14 to 16 each illustrate that the downlink transmission for the UE #1 and the uplink reception for the UE #2 are simultaneously performed in a subframe #2.

FIG. 14 illustrates narrowing the use frequency resources without shifting them to reserve a free space 1401. FIG. 15 illustrates shifting the use frequency resources without narrowing them to reserve a free space 1501. FIG. 16 illustrates shifting and narrowing the use frequency resources to reserve a free space 1601.

In FIG. 14, the eNB narrows the use frequency resources without shifting them to reserves the free space as disclosed in the (1). This can prevent the interference between the uplink and the downlink of the UEs in which the free space is to be reserved without changing the frequency resources of the other UE when the frequency resources to be used by the UE in which the free space is to be reserved are adjacent to those by the other UE. In other words, the interference between the uplink and the downlink of the UEs in which the free space is to be reserved can be prevented without influencing a communication rate between the other UE and the eNB.

In FIG. 15, the eNB shifts the use frequency resources without narrowing them to reserves the free space as disclosed in the (2). This can prevent the interference between the uplink and the downlink of the UEs in which the free space is to be reserved without changing the frequency resources of the UE in which the free space is to be reserved when the frequency resources to be used by the UE in which the free space is to be reserved are adjacent to those by the other UE. In other words, the interference between the uplink and the downlink of the UEs in which the free space is to be reserved can be prevented without influencing a communication rate between the UE in which the free space is to be reserved and the eNB.

In FIG. 16, the eNB shifts and narrows the use frequency resources to reserve the free space as disclosed in the (3). This can prevent the interference between the uplink and the downlink of the UEs in which the free space is to be reserved without changing the frequency resources of the other UE, that is, without influencing a communication rate between the other UE and the eNB when the frequency resources to be used by the UE in which the free space is to be reserved are distant from those by the other UE to a certain extent. Alternatively, separating the influence over the frequency resources to be used by the UE in which the free space is to be reserved and by the other UE when the frequency resources to be used by the UE in which the free space is to be reserved are adjacent to those by of the other UE enables the UE and also the other UE to communicate with the eNB with a predetermined communication rate being maintained.

Figure 17:
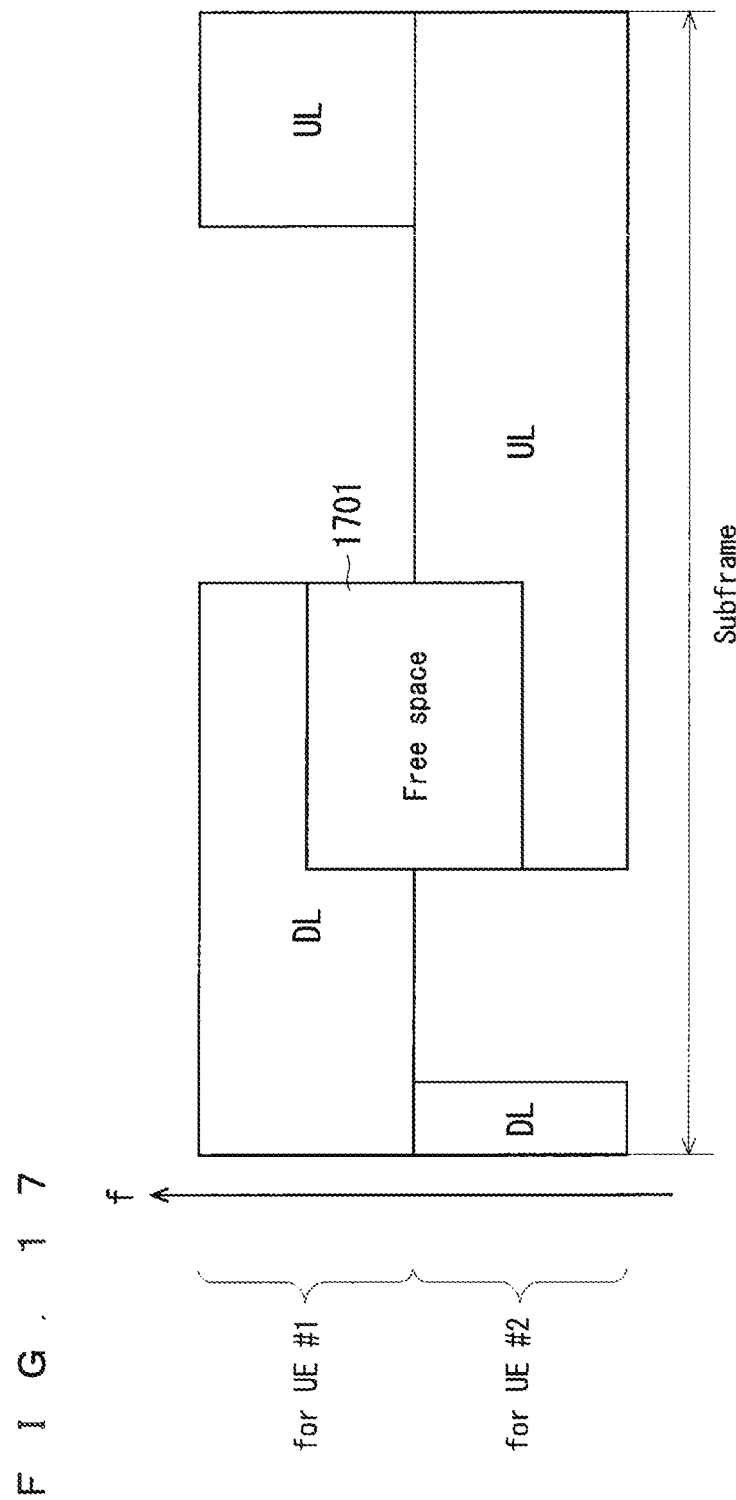
FIG. 17 illustrates an example relationship between the free space and the use frequency resources when the free space is set per symbol.
Figure 18:
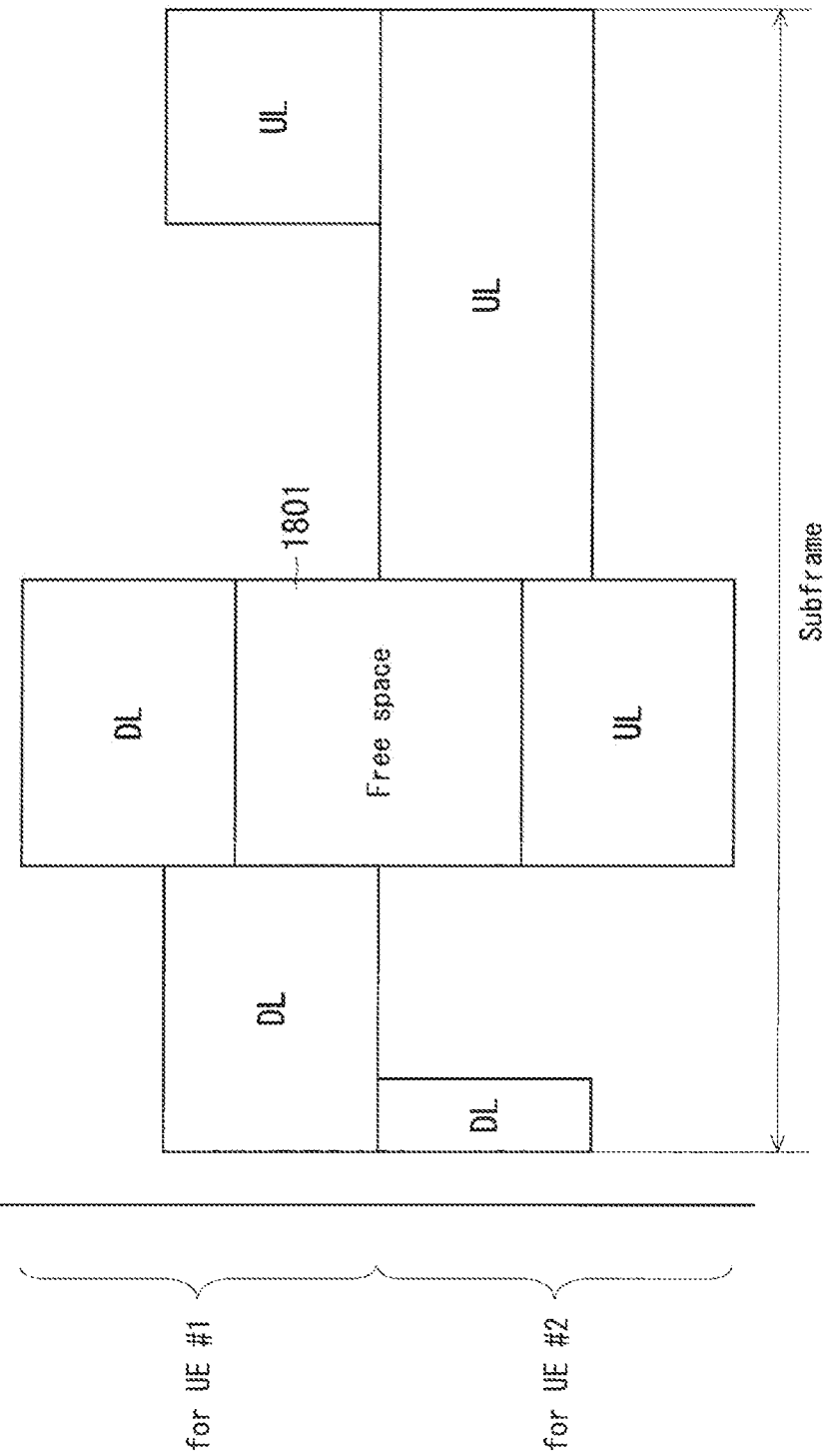
FIG. 18 illustrates another example relationship between the free space and the use frequency resources when the free space is set per symbol.
Figure 19:
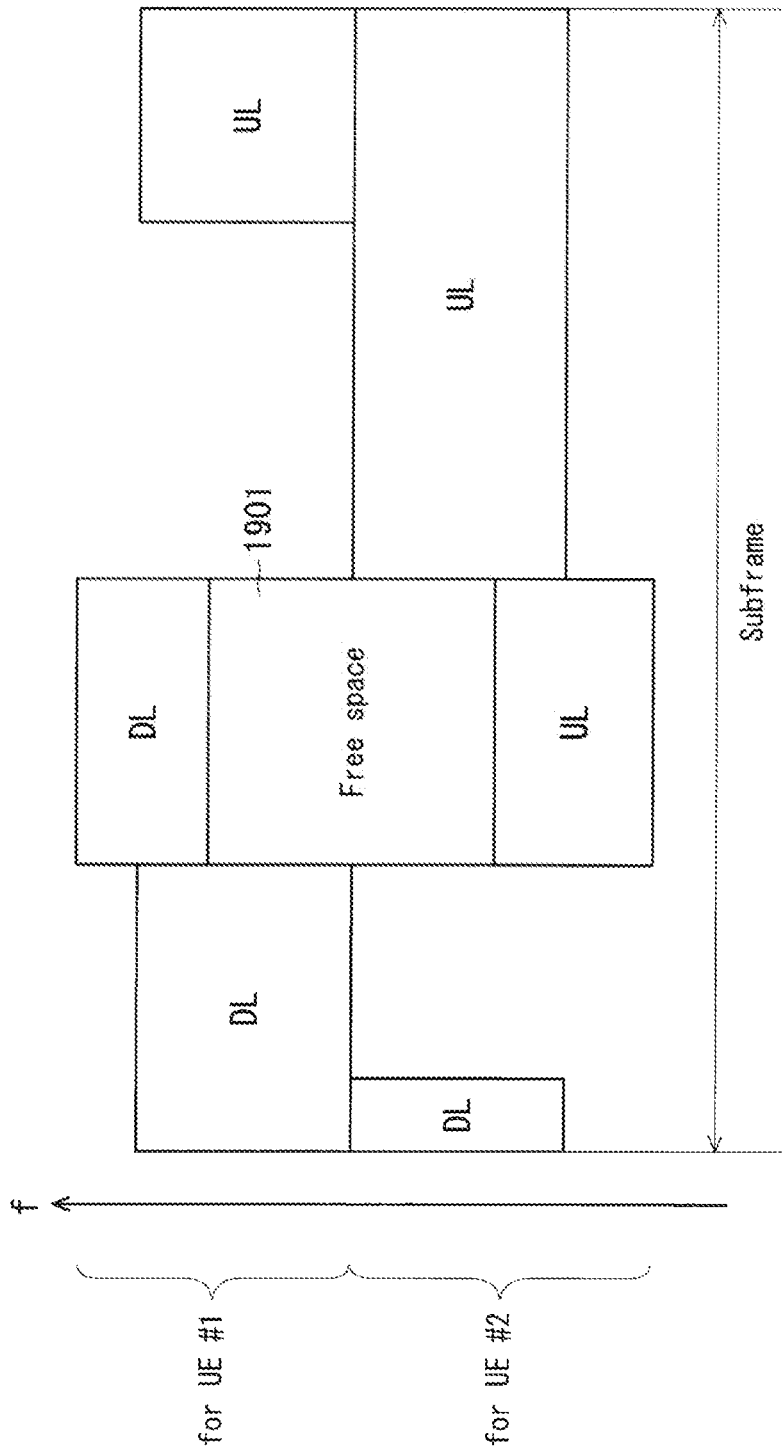
FIG. 19 illustrates yet another example relationship between the free space and the use frequency resources when the free space is set per symbol.

FIG. 17 illustrates an example relationship between the free space and the use frequency resources when the free space is set per symbol. FIG. 18 illustrates another example relationship between the free space and the use frequency resources when the free space is set per symbol. FIG. 19 illustrates yet another example relationship between the free space and the use frequency resources when the free space is set per symbol. In FIGS. 17 to 19, the vertical axis represents a frequency f. FIG. 17 illustrates narrowing the use frequency resources without shifting them to reserve a free space 1701. FIG. 18 illustrates shifting the use frequency resources without narrowing them to reserve a free space 1801. FIG. 19 illustrates shifting and narrowing the use frequency resources to reserve a free space 1901.

The cases illustrated in FIGS. 17 to 19 obtain the same advantages as those illustrated in FIGS. 14 to 16, respectively. The cases illustrated in FIGS. 17 to 19 can reduce the influence of having the free space over a communication rate more than that illustrated in FIGS. 14 to 16 because the free space is set per symbol.

The eNB may set resources to be used for the free space. The setting details of the resources for the free space may be, for example, any combinations of a start time, an end time, a duration, the lowest frequency, the highest frequency, and a bandwidth. The eNB may allocate, to each UE, the use resources except for the resources to be used for the free space.

The free space may be set, for example, as dummy resources as a method for setting the free space. The setting details of the dummy resources may be, for example, any combinations of a start time, an end time, a duration, the lowest frequency, the highest frequency, and a bandwidth of the dummy resources. When the dummy resources are set, the use resources except for the dummy resources may be allocated to each UE.

Regarding the dummy resources, the eNB may schedule the free space as, for example, resources to be allocated to a dummy UE that performs neither transmission nor reception with the eNB. The scheduling for the dummy UE may precede the scheduling for a UE that performs transmission and reception with the eNB. Consequently, the scheduling for the UE that performs transmission and reception with the eNB can be performed by avoiding the free space.

The downlink communication side may set aside the frequency resources to be used. The setting details of the use resources to be set aside may be explicitly set by combining any of, for example, a start time, an end time, a duration, the lowest frequency, the highest frequency, and a bandwidth.

Setting aside the frequency resources means that the eNB reserves a free space by changing the use frequency resources in the scheduling. The eNB may narrow the use frequency resources without shifting them, shift the use frequency resources without narrowing them, or shift and narrow the use frequency resources to reserve the free space. The same holds true for the following description according to the fourth modification.

In other words, setting aside the frequency resources at the downlink communication side means that the eNB changes the use resources of a UE on the downlink communication side to allocate the use resources to the UE. The use resources may be changed per symbol or per subframe.

The uplink communication side may set aside the frequency resources to be used. The setting details of the use resources to be set aside may be explicitly set by combining any of, for example, a start time, an end time, a duration, the lowest frequency, the highest frequency, and a bandwidth.

In other words, setting aside the frequency resources at the uplink communication side means that the eNB changes the use resources of a UE on an uplink communication side to allocate the use resources to the UE. The use resources may be changed per symbol or per subframe.

Both the downlink communication side and the uplink communication side may set aside the frequency resources to be used. The setting details of the use resources to be set aside may be explicitly set by combining any of, for example, a start time, an end time, a duration, the lowest frequency, the highest frequency, and a bandwidth for each of the downlink communication and the uplink communication.

In other words, setting aside the frequency resources at both of the downlink communication side and the uplink communication side means that the eNB changes the use resources of both of the UEs whose frequencies are adjacent to each other to allocate the use resources to the UEs. The use resources may be changed per symbol or per subframe.

Values of time and frequency may be directly designated as the explicit setting details. Alternatively, a difference from the current use frequency, for example, from the lowest frequency, the highest frequency, or a bandwidth may be set as the explicit setting details.

The frequency resources to be used may be implicitly set aside. Here, the eNB may notify the UE of information on the resources in which the downlink coincides with the uplink. Then, both of the eNB and the UE derive the resources to be set aside and set aside the use resources. The information on the resources in which the downlink coincides with the uplink may be, for example, use frequencies of the downlink and the uplink, or transmission times of the downlink and the uplink. The deriving method may be determined in, for example, a standard. The eNB may notify the UE of which one of the following methods is performed in the deriving to reserve the free space: a method for narrowing the use frequency resources without shifting them: a method for shifting the use frequency resources without narrowing them: or a method for shifting and narrowing the frequency resources.

The setting of the free space may be selected from several options as according to the first embodiment. Here, a list of the options and an identifier of the setting to be selected may be designated. The list of options may be defined in a standard. Alternatively, the eNB may determine a possible pattern for reserving the free space based on a connection state of the UE. The list of options and the identifier of the setting to be selected may be given collectively or separately.

The frequency resources may be set aside using the scheduling by the eNB according to the second embodiment.

The eNB may change the frequency to be allocated to each UE per symbol in the scheduling. The frequency resources are allocated to each slot in the conventional scheduling under the LTE. Thus, the frequency resources cannot be changed between symbols. According to the second embodiment, the frequency resources can be flexibly set using the scheduling enabling allocation of a frequency resource to each symbol.

When the options are used, some patterns for reserving the free space may be integrated without being limited to the symbols in which the actual contention between the uplink and the downlink occurs. This prevents increase in the number of the patterns when the number of UEs increases, and enables the eNB to reduce computation necessary for determining the free space of the UE. Both of the eNB and the UE can reduce the memory usage necessary for holding the patterns for reserving the free space.

When symbol lengths, subframe lengths, or TTI lengths are different between the UEs in setting the free space, the free space may be set to fit the shorter one of the symbol lengths, the subframe lengths, or the TTI lengths. Alternatively, the free space may be set to fit the longer one thereof. Whether the free space is set to fit the shorter one or the longer one thereof may be determined in a standard. Alternatively, it may be determined in another method.

The eNB may determine which one of the downlink communication side and the uplink communication side sets aside the frequency resources to be used. Alternatively, the UE may make the determination and notify it to the eNB.

The following (1) to (4) will be disclosed as examples as to which one of the downlink communication side and the uplink communication side sets aside the frequency resources to be used:
(1) a first winning process;
(2) a process based on a priority;
(3) a process using the number of UEs used in the uplink and the downlink; and
(4) combinations of (1) to (3) above.

In the first winning process in the example of (1), for example, a UE connected to the eNB earlier may be prioritized. When change in the gap setting in a subframe causes a contention between the uplink and the downlink, a UE whose gap setting is not changed may be prioritized as an alternative example.

In the process based on a priority in the example of (2), for example, a UE with a higher priority may not set aside resources, and a UE with a lower priority may set aside the resources. As an alternative example, the amount of resources to be set aside by the UE with a higher priority and that by the UE with a lower priority may be determined based on the respective priorities of the UEs.

The priority assigned to each of the UEs in the example of (2) may be determined by the high-level network device, the eNB, or its own UE, similarly as according to the first embodiment. The value of the priority may be variable. The entity that changes the priority may be the high-level network device, the eNB, or its own UE.

Examples of a criterion for determining the priority in the example of (2) may include the service to be used by the UE, similarly as according to the first embodiment. The priority to be assigned to each service may be determined in a standard. The service to be used by the UE may be, for example, mobile broadband communication, packet communication requiring a higher reliability, an emergency notification, etc.

The UE may notify the eNB of the priority in the example of (2) using the RRC-dedicated signaling, similarly as according to the first embodiment. Examples of the notification timing from the UE to the eNB may include when the UE is connected to the eNB, when a service is changed in the UE, and when an emergency notification is transmitted.

The process using the number of UEs used in the uplink and the downlink in the example of (3) may be, for example, comparing the number of uplink UEs with the number of downlink UEs when a contention occurs between the uplink UEs and the downlink UEs, and instructing the fewer number of the uplink UEs and the downlink UEs to set aside the resources. This process can reduce the amount of signaling to set aside the resources.

In the example of (4), the examples of (2) and (3) may be combined. The following example processes may be performed: adding priorities of UEs with contention in each of the uplink and the downlink; comparing a sum of the priorities in the uplink with that in the downlink; and setting aside the resources by the UE with a fewer number of the addition result of the priorities.

The following (1) to (3) will be disclosed as a method for setting the free space according to the second embodiment:
(1) semi-statically, for example, using the RRC-dedicated signaling;
(2) dynamically, for example, using the MAC signaling, the L1/L2 signaling, etc.; and
(3) a combination of (1) and (2) above.

In the methods of (1) to (3) above, the subframe number for starting the setting of the free space may also be notified. A duration from receipt of the setting of the free space to its reflection, for example, the number of subframes may be predefined. Consequently, the transmission and reception loss caused by setting the free space can be avoided even when reflection of the setting of the free space is too late for the subframe.

In the setting using the L1/L2 signaling with the methods of (2) and (3), the setting data of the free space may be disposed in the first symbol of a subframe. Consequently, when setting the free space, for example, per symbol, the UE can reserve a time from reception of the setting of the free space until reflection of the received setting as long as possible in the subframe in which the setting data of the free space has been received. Thus, the received setting can be reflected in the subframe in which the setting data has been received.

In the method of (3), for example, options of the free space may be semi-statically notified using the RRC signaling, and an identifier of the setting to be selected may be dynamically notified using the MAC signaling or the L1/L2 signaling.

Setting and canceling of the free space according to the second embodiment may be triggered upon, for example, connection to the UE or cancellation of connection to the other UEs. It may also be triggered upon, for example, an occurrence or a resolution of a contention between the uplink and the downlink due to change in the type of the self-contained subframe, change in the gap setting, etc.

When the free space is set according to the second embodiment, the setting may be continued until the UE becomes idle. Alternatively, a validity period may be provided in the setting of the free space. The length of the validity period may be defined in, for example, a standard. The validity period may be notified together with or separately from the setting of the free space.

Information on system bandwidths of the eNB and the UE may be used in the second embodiment. The gap setting of a connected UE may also be used. The information on the system bandwidth of the UE may be obtained from the UE using the RRC-dedicated signaling. The free space may be determined with the information.

According to the second embodiment, the setting of the free space in the UE and an identifier indicating whether to set aside resources may be notified to the eNB. The identifier may be included in a parameter of the UE capability, or notified to the UE using the RRC-dedicated signaling separately from the UE capability. This enables, for example, a UE with a narrow system bandwidth to prevent interruption of communication and degradation in the communication quality which are caused by setting aside the resources, and to maintain a stable communication.

The second embodiment enables avoidance of inter-cell interference in a self-contained subframe, and a stable communication even when the UE flexibly changes the setting of the TDD.

Third Embodiment

During communication using different types of the self-contained subframes with transmission and reception in the TDD being dynamically changed, transmission from one eNB may coincide with reception by another eNB. Here, a transmitted wave from the one eNB becomes a source of interference to the other eNB. Further, UEs served by different eNBs have the same problem (see Non-Patent Document 16).

The third embodiment will disclose a method for solving such problems.

A frequency free space is provided between downlink communication and uplink communication. A frequency free space is provided between UEs with a mutual interference according to the second embodiment, whereas a free space is provided between the downlink communication and the uplink communication regardless of the UEs according to the third embodiment. This point differs from that of the second embodiment. The third embodiment differs from the FDD in dynamically providing the frequency free space. The eNB may set the free space, and notify it to a UE.

The eNB obtains information on surrounding eNBs. The information may be information on a surrounding eNB that performs downlink transmission at a frequency closer to an uplink frequency of the eNB. Alternatively, the information may be information on a surrounding eNB that performs uplink reception at a frequency closer to a downlink frequency of the eNB.

The eNB may obtain the information through a cell search. Alternatively, the eNB may obtain the information using an interface between eNBs. Alternatively, an interface between the high-level network device and the eNB may be used. When the interface between the high-level network device and the eNB is used, the eNB may obtain the information via the high-level network device. The eNB may inquire of the surrounding eNB about the information. The surrounding eNB may notify the eNB of the information. The eNB may inquire of the high-level network device about the information. The high-level network device may inquire of the surrounding eNB about the information. The surrounding eNB may notify the high-level network device of the information. The high-level network device may notify the eNB of the information.

The following (1) to (4) will be disclosed as specific examples of the information:
(1) an identifier of its own eNB;
(2) information on a frequency to be used by its own eNB;
(3) downlink-signal transmission timing of its own eNB; and
(4) combinations of (1) to (3) above.

In the (2), the information on a frequency to be used may include information on a center frequency. The information on a frequency to be used may include information on a frequency band. The information on a frequency to be used may include information indicating a frequency range to be used. The information indicating a frequency range may include information on the highest frequency to be used or information on the lowest frequency.

In the (3), the downlink-signal transmission timing may be gap setting. The gap setting may be the one described in the first embodiment. Alternatively, the downlink-signal transmission timing may be, for example, a pattern used for the UEs served by its own eNB among the downlink-signal transmission timings used by its own eNB, or a pattern with the longest downlink signal among the self-contained subframe structures to be used by its own eNB. Alternatively, the downlink-signal transmission timing may be a default downlink transmission timing used by its own eNB. The default downlink transmission timing may be obtained from the default gap setting according to the first embodiment.

Alternatively, the downlink-signal transmission timing in the (3) may include a use pattern of a type of the self-contained subframe. The downlink-signal transmission timing may include a gap setting associated with the type of the self-contained subframe. The use pattern of the type of the self-contained subframe may be the one described in the third modification of the first embodiment. The gap setting associated with the type of the self-contained subframe may be the one described in the third modification of the first embodiment.

Alternatively, the downlink-signal transmission timing in the (3) may include a default value of the use pattern of the self-contained subframe. The downlink-signal transmission timing may include a gap setting default value for each use pattern. The default value of the use pattern of the self-contained subframe may be the one described in the third modification of the first embodiment. The gap setting default value for each use pattern may be the one described in the third modification of the first embodiment.

In the inquiry from the eNB to the surrounding eNB or the high-level network device, the eNB may notify the surrounding eNB or the high-level network device of a frequency range. The frequency range may include an uplink frequency to be used by the eNB. Alternatively, the frequency range may include a downlink frequency. When the eNB inquires about the downlink communication of the surrounding eNB, the frequency range is preferably a range including the uplink frequency to be used by the eNB. When the eNB inquires about the uplink communication of the surrounding eNB, the frequency range is preferably a range including a downlink frequency to be used by the eNB.

The frequency range may be defined in a standard or determined by the eNB. The eNB may determine the frequency range based on its own filtering performance.

Information on the surrounding eNB notified from its own eNB to the high-level network device or the eNB may be limited to information on the frequency range notified from the eNB to the high-level network device or the surrounding eNB. Consequently, the surrounding eNB need not transmit unnecessary information to obtain a frequency free space, and can reduce the amount of signaling.

The eNB may schedule a free space between the downlink communication and the uplink communication. The eNB may schedule a downlink frequency bandwidth. The eNB may schedule an uplink frequency bandwidth. The scheduling similar to that in the second embodiment may be used for the scheduling.

The eNB may notify the surrounding eNB of a result of the scheduling. The surrounding eNB may have a free space between the downlink communication and the uplink communication. The result of the scheduling may be used to provide the free space.

The surrounding eNB may request the rescheduling of the eNB. The surrounding eNB may request the rescheduling when, for example, the same free space as that of the eNB cannot be allocated to the surrounding eNB. Alternatively, the rescheduling may be requested when an uplink frequency is not allocated to the surrounding eNB. Alternatively, the rescheduling may be requested when a downlink frequency is not allocated to the surrounding eNB. The surrounding eNB may notify the eNB of an allocatable uplink frequency. Alternatively, the surrounding eNB may notify the eNB of an allocatable downlink frequency. The eNB may perform the rescheduling. The eNB may notify the surrounding eNB of a result of the rescheduling.

Alternatively, the surrounding eNB may schedule a free space different from that of the eNB. The different free space may be, for example, a free space narrower than that of the eNB. Consequently, allowing for a slight overlap between the uplink and the downlink even when the surrounding eNB cannot reserve the same free space as that of the eNB can reduce the amount of signaling required for the rescheduling between the eNB and the surrounding eNB.

The duration during which the frequency free space is provided may be per symbol, per subframe, or per radio frame. Frequencies higher than the free space may be used for the downlink or for the uplink.

Similarly as the second embodiment, it is also preferred in the third embodiment to suppress the spectrum of the transmitted wave other than that at the sub-carrier bandwidth using the method, for example, the Filtered-OFDM (see Non-Patent Document 15).

The eNB or the UE may suppress the spectrum. Alternatively, both the eNB and the UE may suppress the spectrum.

The high-level network device may determine whether to set the frequency free space. The high-level network device may request information necessary for determining whether to set the frequency free space of the eNBs being served thereby. The eNBs may transmit, to the high-level network device, the information necessary for determining whether to set the frequency free space. The high-level network device may transmit, to the eNBs being served thereby, information on the frequency free space.

The following (1) to (4) will be disclosed as specific examples of the information necessary for determining whether to set the frequency free space:

(1) gap settings of the served UEs;
(2) information indicating priorities of the served UEs;
(3) the number of the served UEs; and
(4) combinations of (1) to (3) above.

In each of the (1) to (4), pieces of information of a plurality of the served UEs may be integrated. For example, the highest priority among those of the served UEs may be used in the (2).

One of the neighboring eNBs may determine whether to set the frequency free space. The eNB may request information necessary for determining whether to set the frequency free space of the neighboring eNBs. The neighboring eNBs may transmit, to the eNB, the information necessary for determining whether to set the frequency free space. The eNB may transmit, to the neighboring eNBs, information on the frequency free space.

The information on the frequency free space may be, for example, a bandwidth of the free space, the start timing of the free space, a duration of the free space, and an identifier indicating one of a higher frequency and a lower frequency at which the downlink/uplink is disposed in the free space.

Figure 20:
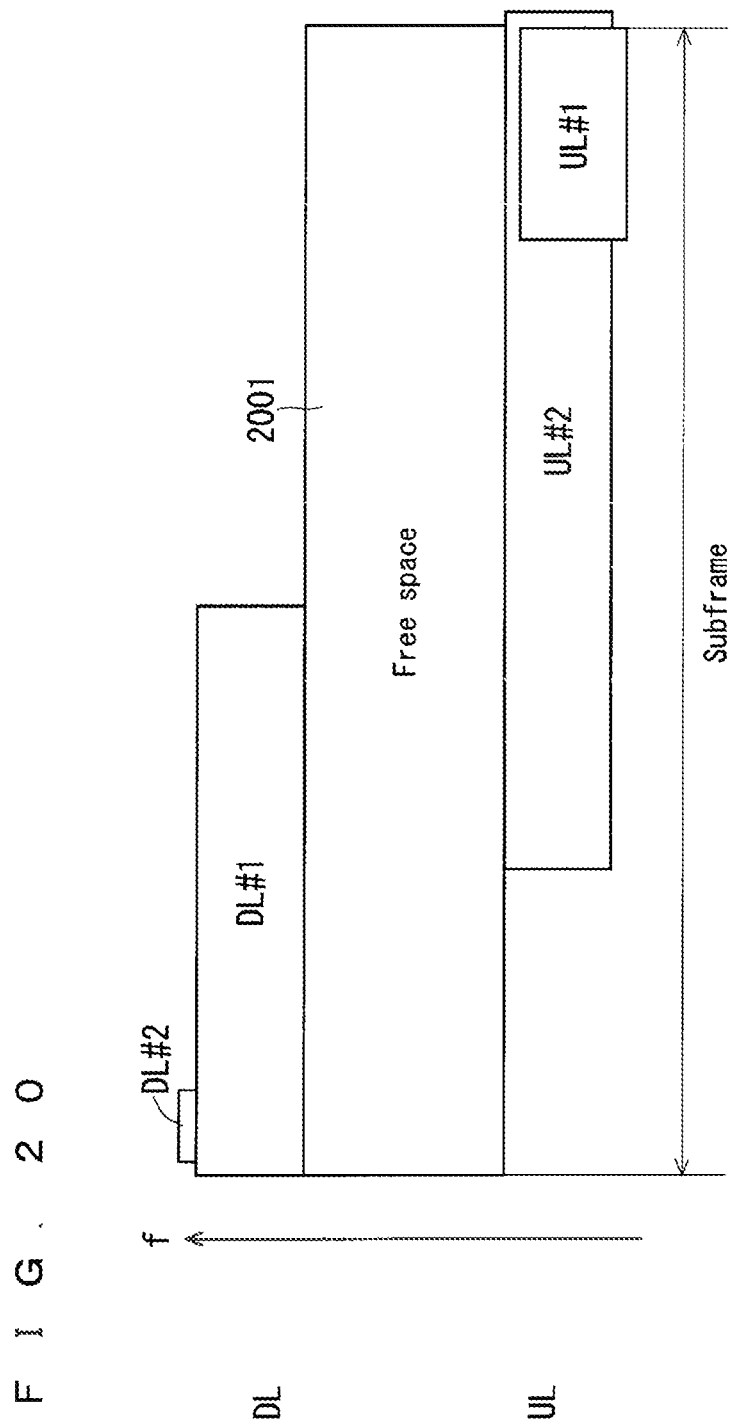
FIG. 20 illustrates an example of providing the free space between an uplink frequency and a downlink frequency.

FIG. 20 illustrates an example of providing a free space between an uplink frequency and a downlink frequency. In FIG. 20, the vertical axis represents a frequency f. A DL #1 and an UL #1 are a first downlink signal and a first uplink signal of an eNB #1, respectively. A DL #2 and an UL #2 are a second downlink signal and a second uplink signal of an eNB #2, respectively. In FIG. 20, a free space 2001 is provided between the uplink frequency and the downlink frequency.

The interference between the downlink communication and the uplink communication between different eNBs can be reduced according to the third embodiment.

First Modification of Third Embodiment

According to the first modification, a time period is divided between the eNBs to perform transmission and reception as another means to prevent the interference between the eNBs.

Time periods during which user data may be transmitted are allocated to the eNBs. Each of the eNBs transmits the user data to the UE during the allocated time period. The eNBs and the UEs being served thereby do not transmit the user data during non-allocated time periods.

A time period is preferably allocated to one eNB per TTI. A plurality of TTIs may be allocated consecutively. The time periods may be equally or unequally allocated to the respective eNBs. The length of the TTI may be, for example, an integer multiple of the subframe length.

The high-level network device may arbitrate a time period during which the eNBs being served thereby communicate the user data. The high-level network device may request information necessary for the arbitration of the eNBs being served thereby. The eNBs may transmit the information necessary for the arbitration to the high-level network device. The high-level network device may notify the eNBs being served thereby of the time period during which the user data is communicated.

The following (1) to (5) will be disclosed as specific examples of the information necessary for the arbitration:
 (1) gap settings of the served UEs;
 (2) information indicating priorities of the served UEs;
 (3) the number of the served UEs;
 (4) identifiers of the eNBs; and
 (5) combinations of (1) to (4) above.

In each of the (1) to (5), pieces of information of a plurality of the served UEs may be integrated. For example, the highest priority among those of the served UEs may be used in the (2).

One of the neighboring eNBs may arbitrate the time period during which the user data is communicated. The eNB that arbitrates the time period may be, for example, a macro cell. The neighboring eNBs may be, for example, small cells.

The eNB that arbitrates the time period may request information necessary for the arbitration of the neighboring eNBs. The neighboring eNBs may transmit the information necessary for the arbitration to the eNB that arbitrates the time period. The eNB that arbitrates the time period may transmit, to the neighboring eNBs, the time period during which the user data is communicated. The information necessary for the arbitration may be the same as the (1) to (5) above.

Each of the neighboring eNBs may arbitrate the time period during which the user data is communicated. Each of the eNBs may transmit the information necessary for the arbitration to the neighboring eNBs. Each of the eNBs may notify the neighboring eNBs of information on a time period during which its own eNB communicates the user data. The information necessary for the arbitration may be the same as the (1) to (5) above. The information on the time period during which its own eNB communicates the user data may be transmitted in addition to the (1) to (5) above. Consequently, the load on the high-level network device can be reduced.

The eNB may transmit, to the UEs being served thereby, the information on the time period during which the user data is communicated. The information may be transmitted by broadcasting it from the eNB to the UEs being served thereby. The broadcast information may be used in the broadcasting. The broadcast information may be SIB1 or SIB2. The eNB may transmit the information to the UEs using the RRC signaling. The RRC signaling may be, for example, the RRC-dedicated signaling. For example, the RRC Connection Reconfiguration, or a message 2 or the message 4 in a random access process may be used as the RRC-dedicated signaling.

The information on the time period during which the user data is communicated may be, for example, a combination of the TTI number and a period. When the TTI number is combined with a period, the user data may be communicated in a TTI number corresponding to a sum of a TTI number and an integer multiple of the period. The TTI number may be a subframe number.

In transmitting the information on the time period during which the user data is communicated, the UE may stop transmission and reception during a time period except for the time period during which the user data is communicated. This can save power of the UE.

Alternatively, the eNB may transmit, to the UEs being served thereby, information on the time period during which transmission and reception are stopped. The information may be transmitted by broadcasting it from the eNB to the UEs being served thereby. The broadcast information may be used in the broadcasting. The broadcast information may be SIB1 or SIB2. The eNB may transmit the information to the UEs using the RRC signaling. The RRC signaling may be, for example, the RRC-dedicated signaling. For example, the RRC Connection Reconfiguration, or the message 2 or the message 4 in a random access process may be used as the RRC-dedicated signaling.

Information on a time period during which communication of the user data is stopped may be, for example, a combination of the TTI number and the period. When the TTI number is combined with a period, the communication of the user data may be stopped in a TTI number corresponding to a sum of a TTI number and an integer multiple of the period. The TTI number may be a subframe number.

The power of the UE can be saved because the UE can stop transmission and reception during a notified period using a notification from the eNB to the UE of information on a time period during which transmission and reception are stopped.

The arbitration may be performed using the information in the (1) to (5) above. For example, a TTI may be allocated based on an identifier of each eNB. For example, when two cells are arbitrated, even and odd TTI numbers may be allocated to the respective eNBs using identifier of the eNBs.

The eNB need not perform scheduling for the UE during a time period during which transmission and reception are not assigned to the UE according to the method described in the first modification.

The eNB and the UE need not count a time period during which the transmission and reception are not assigned to the UE according to the method described in the first modification for a period used in, for example, the scheduling or for the number of transmissions and receptions, etc. Alternatively, the eNB and the UE may count the time period.

When the time period is not counted, only the number of subframes actually transmitted by the UE among, for example, the number of transmission subframes allocated to the UE in the semi-persistent scheduling (SPS) may be counted. In the SPS, for example, when the eNB allocates consecutive four-time uplink transmissions to the UE and assigns transmission and reception to even subframe numbers in the method described in the first modification, the duration of the uplink transmission from the UE may be 8 subframes.

For example, when a DRX period is 10 subframes and the eNB assigns transmission and reception with the UE to even subframe numbers in the method described in the first modification, the DRX period in the UE may be 10 or 20 subframes. The eNB preferably allocates a UE start-up time so that transmission and reception are assigned to the UE for at least 1 subframe of the UE start-up time in the DRX period. Alternatively, the eNB preferably allocates at least 1 subframe of the UE start-up time as a possible transmission and reception time in the method described in the first modification.

Alternatively, the number of processes to be used in the HARQ may or may not be changed in the HARQ using the transmission and reception assignment according to the first modification When 1 out of 2 subframes that can be transmitted and received is allocated to the UE according to the first modification, the number of processes to be used in the HARQ may be halved or remain unchanged.

Figure 21:
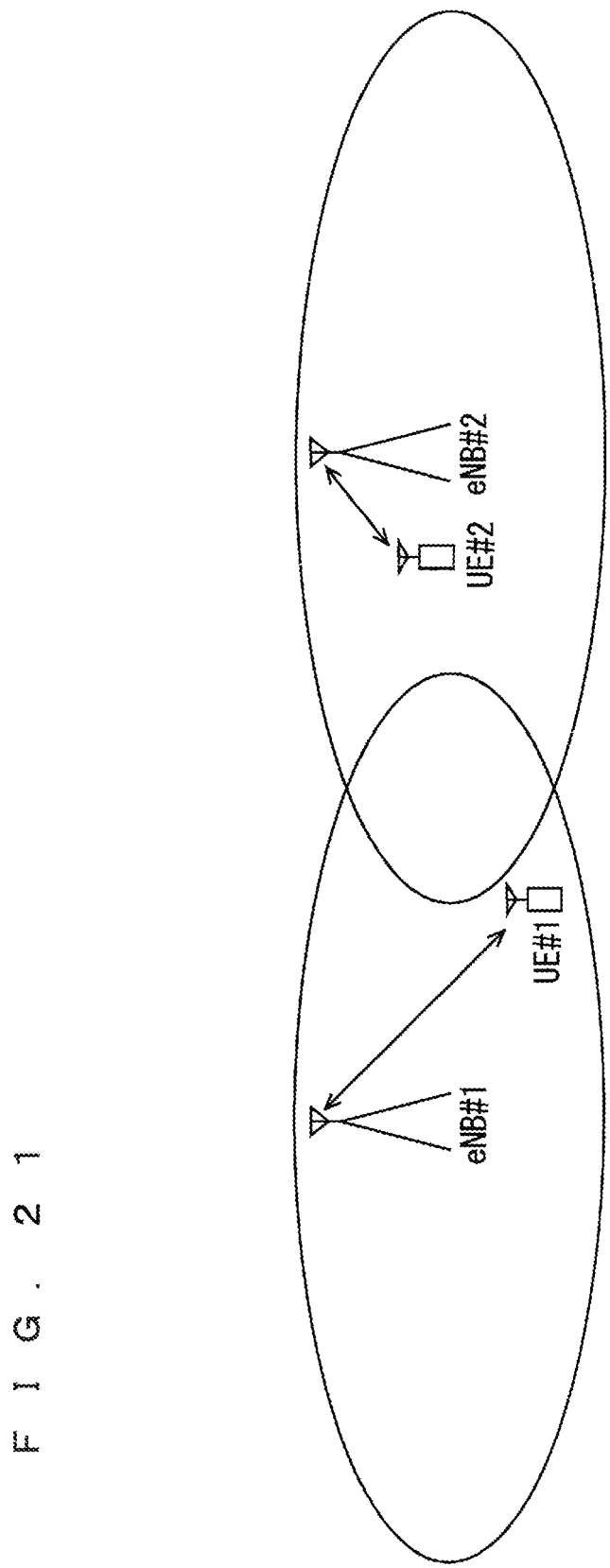
FIG. 21 illustrates an example structure of a communication system according to the first modification of the third embodiment.

FIG. 21 illustrates an example structure of a communication system according to the first modification of the third embodiment. FIG. 22 illustrates an example time-division allocation of communication sections between the eNBs in the communication system illustrated in FIG. 21. A TTI in which the user data is communicated and a TTI in which the user data is not communicated are alternately allocated to the eNB #1 and the eNB #2.

According to the first modification, a time period during which transmission is permitted may be allocated to signals other than the user data. Examples of the signals other than the user data may include a downlink control signal, an uplink control signal, a paging signal, a downlink reference signal, an uplink reference signal, a synchronization signal, a PBCH, and a PRACH. Whether to perform a time-division transmission may be set to each of the channels other than the user data.

The first modification enables reduction in the interference between the eNBs without changing the frequency resources. The interference between the eNBs can also be reduced without changing structures of downlink and uplink symbols in the self-contained subframe.

Fourth Embodiment

Under the LTE, a radio frame (PF), a subframe (PO), and a DRX period (T) indicate the discontinuous reception (DRX) timing in an idle state, that is, the timing with which a paging is to be transmitted. The paging is to be transmitted in the radio frame (PF) and the subframe (PO). The DRX period (T) is notified from the MME to the eNB through the S1, and broadcast from a cell using the SIB2. The PF and the PO are determined by a UE identifier (UE-ID) and by a parameter (nB) to be broadcast from the cell using the SIB2. Thus, the transmission timing of paging depends on the UE-ID (see Non-Patent Document 17).

5G proposes that a base station (a 5G base station is also referred to as an eNB in the Description) should communicate via beamforming for forming narrow beams using a plurality of antennas to broaden a radio coverage, i.e., a coverage. Forming the narrow beams can broaden the radio coverage. 5G proposes a method for covering a wide coverage by sweeping one or more beams at different timings to perform beam sweeping when the number of beams formed by the eNB at a time is less and a coverage necessary for a cell cannot be covered (see Non-Patent Document 18).

Figure 23:
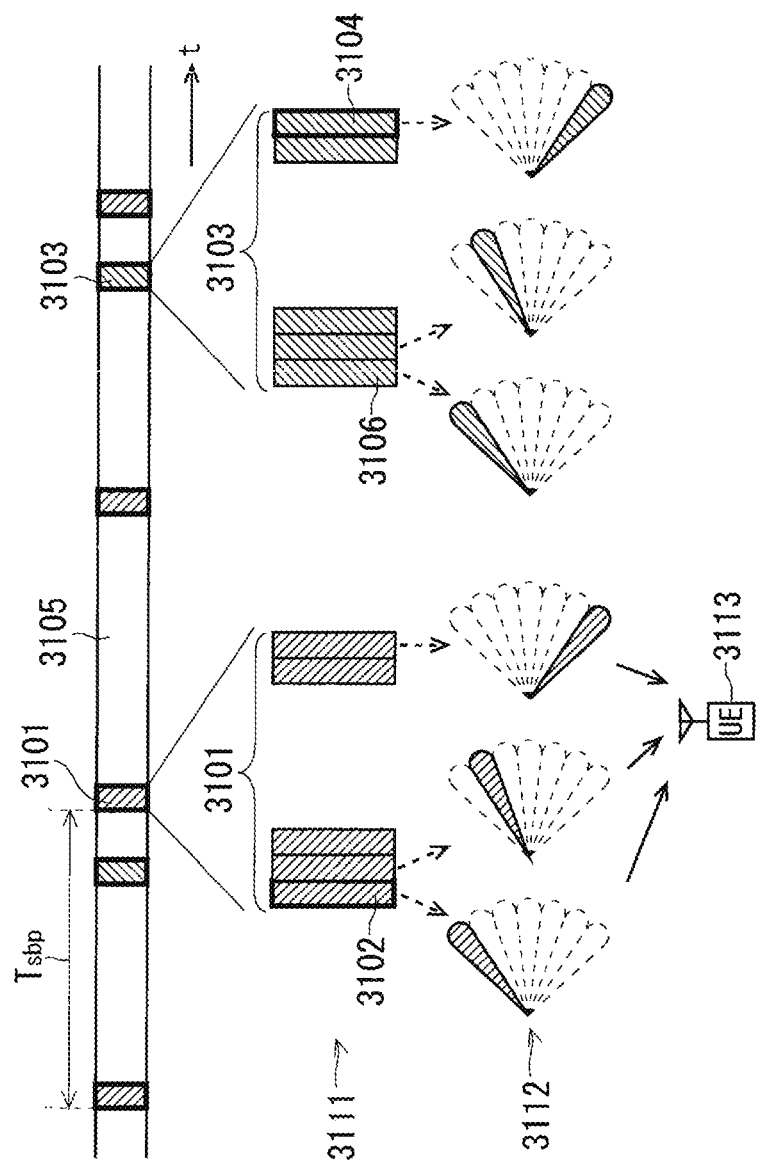
FIG. 23 illustrates the beam sweeping.

FIG. 23 illustrates the beam sweeping. A downlink beam sweeping block (DL sweeping block) 3101 and an uplink beam sweeping block (UL sweeping block) 3103 are provided to perform the beam sweeping. A DL/UL data subframe 3105 in which downlink data and uplink data are transmitted is interposed between the downlink beam sweeping block 3101 and the uplink beam sweeping block 3103. As denoted by a reference 3111, the block 3101 includes a plurality of resources 3102, and the block 3103 includes a plurality of resources 3104 and 3106. Each of the resources is transmitted via a beam denoted by a reference 3112.

The downlink beam sweeping block 3101 is repeatedly transmitted with a predetermined downlink sweeping block period $T_{sbp}$. In the downlink beam sweeping block 3101, beams are formed and transmitted for a predetermined narrow coverage during a first predetermined duration, and beams are formed and transmitted for the next predetermined narrow coverage during the next predetermined duration. With repetition of this, all coverages of a cell are covered. The resources denoted by the reference 3102 are used for transmitting, for example, a synchronization signal, a PBCH, and a beam reference signal.

In the uplink beam sweeping block 3103, beams are formed and received for a predetermined narrow coverage during a first predetermined duration, and beams are formed and received for the next predetermined narrow coverage during the next predetermined duration. With repetition of this, all coverages of a cell are covered. The resources denoted by the reference 3104 are used for transmitting, for example, a RACH.

A series of sweeping beams during covering of all the coverages of the cell will be referred to as a beam sweeping block. In the following description, a transmission/reception duration of each beam in the beam sweeping block may be referred to as a "beam unit".

The beam sweeping block is periodically executed. In the downlink beam sweeping block 3101, a common control signal and a channel are transmitted via each of the beams. Examples of the common control signal and the channel include a synchronization signal (SS), a PBCH, a reference signal (RS), etc. that are common control signals necessary for initial access. In the uplink beam sweeping block 3103, a RACH resource, etc. are allocated by the respective beams.

A UE 3113 performs reception during the entire duration of the downlink beam sweeping block 3101. Consequently, wherever being located in the coverage of the cell, the UE 3113 can receive beams transmitted to its position. Thus, the UE 3113 can receive, for example, the common control signal necessary for initial access. The UE 3113 performs transmission in the uplink beam sweeping block 3103. Consequently, the eNB can receive the uplink transmission from the UE 3113.

Information to be transmitted in the downlink beam sweeping block 3101 has not been explicitly described yet except for the common control signal and the channel. The information to be transmitted in the downlink beam sweeping block 3101 includes information on at least one of the downlink beam sweeping block 3101 and the uplink beam sweeping block 3103. The following (1) to (8) will be disclosed as specific examples of the information.

(1) The Number of Beam Units:

The number of beam units may differ between the downlink and the uplink. If the numbers are identical, one of them may be omitted. Alternatively, the information may be information indicating that one of the numbers is identical to the other number.

(2) A Duration of a Beam Sweeping Block:

The duration may differ between the downlink and the uplink. If the durations are identical, one of them may be omitted. Alternatively, the information may be information indicating that one of the durations is identical to the other duration.

(3) A Beam Sweeping Block Period:

The period may differ between the downlink and the uplink. If the periods are identical, one of them may be omitted. Alternatively, the information may be information indicating that one of the periods is identical to the other period.

(4) The Start Timing of a Beam Sweeping Block: The Start Timing May be an Offset Value.

The start timing may differ between the downlink and the uplink. If the start timings are identical, one of them may be omitted. Alternatively, the information may be information indicating that one of the start timings is identical to the other start timing.

(5) Time Intervals of a Downlink Beam Sweeping Block and an Uplink Beam Sweeping Block (6) A Beam Unit Duration:

The beam unit duration may differ between the downlink (transmission) and the uplink (reception). If the beam unit durations are identical, one of them may be omitted. Alternatively, the information may be information indicating that one of the durations is identical to the other duration.

(7) The Transmission Timing of Each of the Beam Units and the Reception Timing of Each of the Beam Units: The Timing May be an Offset Value.

(8) Combinations of (1) to (7) Above.

A parameter representing a time may be, for example, a radio frame number, a subframe number, a slot number, and a symbol number. Information to be transmitted in the downlink beam sweeping block 3101 may be included in the broadcast information to be transmitted via each of the beams in the downlink. Upon detection of the beam through a synchronization signal of the beam at the position of its own UE in the downlink beam sweeping block, the UE can receive the information to be transmitted via the beam. Consequently, the UE can recognize the timing of the downlink beam sweeping block, and receive the subsequent downlink beam sweeping blocks. The UE continues to search for a beam sweeping block, which eliminates the need for consecutive reception. The UE can perform the discontinuous reception. The UE can also recognize the timing of the uplink beam sweeping block, and perform transmission in the subsequent uplink beam sweeping blocks.

The timings of the downlink beam sweeping block may be consistent among cells. Alternatively, the timings of the downlink beam sweeping block may be set to overlap partly or entirely among the cells. A node having a function of Operation and Maintenance (O & M) may set the timings. A CN may set the timings. Alternatively, the timings may be statically determined in, for example, a standard. Consequently, the UE can also receive downlink beam sweeping blocks of a plurality of neighboring cells with timing to receive a downlink beam sweeping block of one cell.

The timings of the uplink beam sweeping block may be consistent among the cells. Alternatively, the timings of the uplink beam sweeping block may be set to overlap partly or entirely among the cells. A node having the function of O & M may set the timings. A CN may set the timings. Alternatively, the timings may be statically determined in, for example, a standard. Consequently, a cell can receive transmission from the UE in uplink beam sweeping blocks of the other cells. These are effective for an inter-cell coordination process.

The timings of the downlink beam sweeping block may be set so as not to overlap among the cells as an alternative method. Under circumstances where inter-cell downlink interference occurs, the setting is effective to avoid the interference.

The timings of the uplink beam sweeping block may be set so as not to overlap among the cells. Under circumstances where inter-cell uplink interference occurs, the setting is effective to avoid the interference.

The method for overlapping the timings partly or entirely among the cells may be combined with the setting method for avoiding the overlapping. In an example setting, the timings may overlap partly or entirely among the cells in the downlink, whereas the timings may vary among the cells in the uplink. This is effective when the interference situations differ between the uplink and the downlink.

When the timings of the beam sweeping block are set so as not to overlap among the cells, the timings may be set consecutive in the cells. Alternatively, timing intervals among the cells may be set as short as possible. The UE can consecutively receive the downlink beam sweeping blocks of a plurality of cells. The cell can receive consecutive transmissions from the UE in the uplink beam sweeping blocks of the other cells. The shorter the timing intervals among the cells are, the shorter the consecutive reception duration of the UE or the cells becomes, thus enabling reduction in the power consumption.

The cell does not recognize in which beam area the UE in a RRC_IDLE state exists, that is, whether the UE exists in a coverage covered by beams. Thus, application of the beam sweeping to transmission of the paging is being considered (see Non-Patent Document 18). However, the transmission timing of each of the beams in the beam sweeping differs as previously described. Meanwhile, the paging timing is determined by a UE-ID.

Thus, even when a cell intends to transmit the paging with application of the beam sweeping, the paging timing for the UE may not coincide with the beam sweeping timing. Thus, the cell has a problem with incapability to transmit the paging. When the paging timing is different from the beam sweeping timing, the UE also has a problem with incapability to receive the paging even through a reception operation with a predetermined paging timing.

The cell does not recognize in which beam area the UE in a RRC_IDLE state is even when intending to transmit the paging in a data subframe. The cell does not know which beam should be transmitted with the paging timing. Thus, beams may not be transmitted even when the UE performs reception with a predetermined paging timing. Thus, the UE cannot receive the paging.

The fourth embodiment will disclose a method for solving such problems.

The paging is transmitted with timing of sweeping downlink beams. The paging may not be transmitted with all the timings. The paging may be transmitted with part of the timings. The paging is transmitted in a downlink beam sweeping block. The paging is transmitted via all beams in the downlink beam sweeping block. The eNB holds the paging from a high-level node until the downlink beam sweeping timing with which the paging can be transmitted.

Since the paging is transmitted in the beam sweeping block, the DRX period may synchronize with a beam sweeping block period. Alternatively, the DRX period may be n times the beam sweeping block period, where n is an integer. Consequently, the paging timing can be flexibly set. For example, selecting the largest n that is shorter than a paging period set by the CN enables the paging timing to occur at least once in the paging period set by the CN, and enables the paging to be transmitted from the CN.

Whether to synchronize the DRX period with the beam sweeping block period or multiply the DRX period by a factor of n may be statically determined as a system or in a standard. Consequently, the eNB and the UE can recognize the DRX period.

Information indicating the DRX period may be provided. For example, n may be set as the information. The information indicating the DRX period may be set to each cell. The cell may include, in the broadcast information, the information indicating the DRX period to broadcast the information. The cell may transmit the information indicating the DRX period in the downlink beam sweeping block. Alternatively, the information may be separately set to the UE that is temporarily in an RRC connected state. The cell may include, in the RRC-dedicated signaling, the information indicating the DRX period to notify the information. Consequently, the UE can recognize the DRX period.

Information indicating from which beam sweeping block the paging can be transmitted may be provided. When n>1, the paging can be transmitted not necessarily in all the beam sweeping blocks. With the information indicating from which beam sweeping block the paging can be transmitted, a beam sweeping block in which the paging can be transmitted can be identified.

The information indicating from which beam sweeping block the paging can be transmitted may be set to each cell. The cell may include, in the broadcast information, information indicating whether the paging can be transmitted to broadcast the information. The cell may transmit, in the downlink beam sweeping block, the information indicating whether the paging can be transmitted. Alternatively, the information may be separately set to the UE that is temporarily in an RRC connected state. The cell may include, in the RRC-dedicated signaling, the information indicating whether the paging can be transmitted to notify the information.

Consequently, the UE can recognize from which beam sweeping block the paging can be transmitted.

The UE may detect the presence or absence of the paging through reception with timing of a beam unit of the beam sweeping block which is generated with the DRX period and transmitted in an area where its own UE is located.

Alternatively, the UE may detect the presence or absence of the paging through reception for a duration of the beam sweeping block generated with the DRX period. This is effective in a case where the UE moves or a case where the radio propagation environment greatly fluctuates.

Whether the UE is still or moving may be determined. The former method may be performed when the UE is still, whereas the latter method may be performed when the UE is moving. Alternatively, whether the reception quality of a beam is superior may be determined. The former method may be performed when the reception quality is superior, whereas the latter method may be performed when the reception quality is not superior. Alternatively, whether the reception quality of the beam is superior and stable may be determined. The former method may be performed when the reception quality is superior and stable. Otherwise, the latter method may be performed.

Consequently, the UE can detect and receive the paging transmitted in synchronization with the beam sweeping timing. The UE can receive the paging even with application of the beam sweeping. Communication is possible with application of the beam sweeping, even when the number of beams that can be formed at a time is less and all the coverages cannot be covered.

Figure 24:
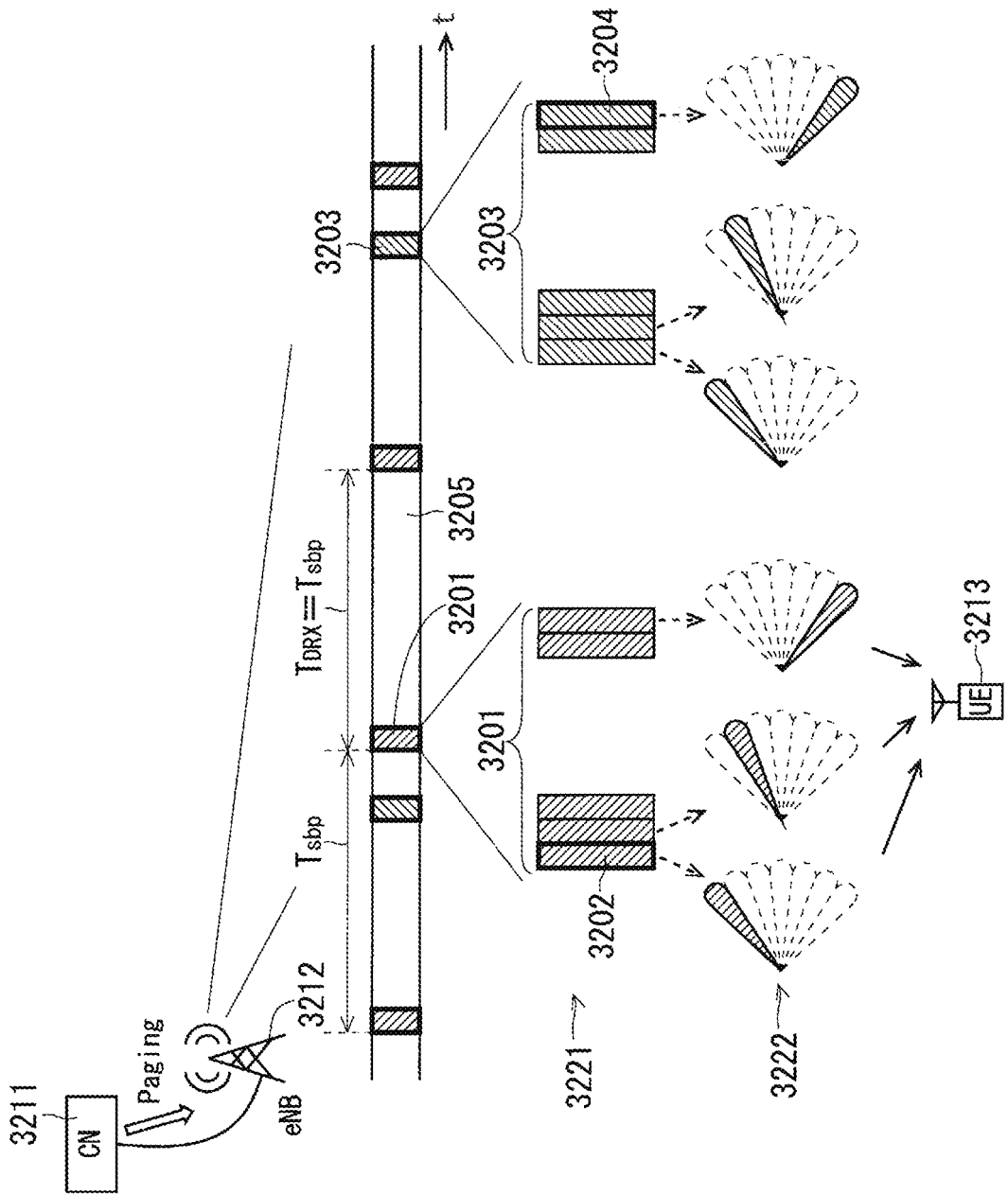
FIG. 24 illustrates a transmitting method for synchronizing a transmission timing of paging with a beam sweeping timing.

FIG. 24 illustrates a transmitting method for synchronizing the transmission timing of paging with the beam sweeping timing. A downlink beam sweeping block 3201 and an uplink beam sweeping block 3203 are provided. The paging is transmitted in the downlink beam sweeping block 3201. A DL/UL data subframe 3205 in which downlink data and uplink data are transmitted is interposed between the downlink beam sweeping block 3201 and the uplink beam sweeping block 3203. As denoted by a reference 3221, the block 3201 includes a plurality of resources 3202, and the block 3203 includes a plurality of resources 3204. Each of the resources is transmitted via a beam denoted by a reference 3222.

The cell transmits the downlink beam sweeping block 3201 with the downlink beam sweeping block period $T_{sbp}$. The cell receives the uplink beam sweeping block 3203 with an uplink beam sweeping block period.

In the downlink beam sweeping block 3201, the respective beams each with a narrow coverage are sequentially transmitted during a beam unit duration, so that all the beams cover a cell coverage. Similarly in the uplink beam sweeping block 3203, sequential reception using the respective beams each with the narrow coverage is performed during the beam unit duration, so that all the beams cover the cell coverage.

Although a method for delaying the timing per beam as a pattern to form beams in sweeping the beams is previously disclosed, it is possible to form a plurality of beams at the same timing and delay the timing for each of the plurality of beams. The plurality of beams may be not beams for forming an adjacent coverage but beams for forming a coverage with spatial intervals. When the plurality of beams are formed at the same timing, side lobes of the beams cause inter-beam interference. Thus, forming the beams at the same timing to form the coverage with spatial intervals can reduce the inter-beam interference.

A synchronization signal (SS), a PBCH, and a reference signal (RS) are transmitted via each of the beams in the downlink beam sweeping block 3201. In the uplink beam sweeping block, the RACH resource, etc. is allocated by the respective beams.

An eNB 3212 has a function of setting the DRX period (TDRX) to be n times the period of the downlink beam sweeping block 3201. FIG. 24 illustrates a case where n=1. The eNB 3212 holds the paging received from a core network (CN) 3211 until the timing of the downlink beam sweeping block 3201 in which the paging is possible.

Consequently, the eNB (cell) 3212 can transmit the paging received from the CN 3211 in the downlink beam sweeping block 3201 in which the paging is possible.

The UE 3213 receives the downlink beam sweeping block 3201 transmitted with the DRX period. The UE 3213 may receive it during a beam-sweeping duration. Consequently, the UE 3213 can receive the paging transmitted from the eNB (cell) 3212.

FIG. 25 illustrates an example sequence on paging processes according to the fourth embodiment.

In Step ST3301, the cell transmits a downlink beam sweeping block to the UE. The cell may transmit beam sweeping block information via all beams in the downlink beam sweeping block. The cell may transmit DRX period information, for example, n. When n is omitted, 1 may be indicated. Here, the DRX period is equal to the beam sweeping block period.

In Step ST3302, upon receipt of the downlink beam sweeping block and a receivable synchronization signal, the UE detects a beam that can be received by its own UE.

In Step ST3303, upon receipt of the beam that can be received by its own UE, the UE obtains the beam sweeping block information and the DRX period information.

In Step ST3304, the UE derives the paging timing from the obtained beam sweeping block information and the DRX period information. In other words, the UE derives the timing of the beam sweeping block in which the paging is possible.

In Step ST3305, the UE performs the discontinuous reception (DRX) with the derived paging timing. The UE detects the presence or absence of the paging, through reception during a beam sweeping block duration that is the paging timing and also a beam sweeping block with the DRX period. In the absence of the paging, the UE stops a receiving operation after the beam sweeping block duration ends. The UE starts reception in a beam sweeping block after the DRX period, and continues reception during the beam sweeping block duration to detect the presence or absence of the paging. These are repeated.

In Step ST3306, the CN notifies the paging to the cell. In Step ST3307, the cell holds the received paging until the timing of the next beam sweeping block in which the paging is possible.

In Step ST3308, the cell transmits the held paging with the timing of the next beam sweeping block in which the paging is possible. The paging is transmitted in all blocks of the beam sweeping block.

Upon detection of the presence or absence of the paging through reception of the beam sweeping block with the DRX period, the UE receives a beam that can be received by its own UE in the beam sweeping block in which the paging is transmitted to detect the transmitted paging in Step ST3309.

Consequently, the UE can receive the paging from the cell that is sweeping beams.

Although in Step ST 3308, the cell transmits the paging with the timing of the next downlink beam sweeping block in which the paging is possible after receiving the paging from the CN, the downlink beam sweeping block may not be the next one in which the paging is possible. The paging may be transmitted with the timing of a downlink beam sweeping block in which paging is possible after a lapse of a predetermined duration. The eNB holds the paging received from the CN until the transmission timing of the downlink beam sweeping block in which the paging is possible after a lapse of the predetermined duration. The predetermined duration may be set in consideration of a processing duration of the eNB from receipt of the paging to transmission of the paging. This eliminates the need for the processing for a short duration and can reduce malfunctions in the eNB.

The UE that has received the paging with the downlink beam sweeping timing need not receive a beam unit in the downlink beam sweeping block in which the paging has been received. This can reduce the power consumption of the UE.

The cell has to transmit pagings of all of the UEs for which the pagings have been generated, via the beams in the beam sweeping block. UE-IDs of all of the UEs for which the pagings have been generated may be included in one piece of paging information as a method for transmitting the pagings of all of the UEs. Assuming that a channel bearing the paging information is a PCCH, one PCCH bears the UE-IDs of all of the UEs for which the pagings have been generated, and is transmitted via each of the beams.

Scheduling information of the PCCH may be statically predetermined in, for example, a standard. Examples of the scheduling information include resource allocation for a symbol and a sub-carrier to which the PCCH is mapped, a modulating method, a coding method, etc. Consequently, the UE can receive the PCCH and recognize the presence or absence of the paging addressed to its own UE.

FIG. 26 illustrates example resources to which the PCCHs transmitted via each beam are mapped. FIG. 26 illustrates transmission of four beams of beams #1 to #4 in a beam sweeping block. Each beam unit that is a transmission period Top of the beam consists of 7 symbols. SSs, a PBCH, and PCCHs are mapped to each of the beam units. The SSs and the PBCH are time-multiplexed with the PCCHs. FIG. 26 also illustrates that the scheduling information of the PCCHs is statically predetermined in, for example, a standard. The PCCH is mapped to each of the fifth to the seventh symbols of the resources transmitted via the respective beams. The UE can recognize the presence or absence of the paging addressed to its own UE by receiving the PCCHs through reception of the fifth to the seventh symbols of the beams in the paging sweeping block. The beams are to be transmitted in the area where its own UE is located.

The scheduling information of the PCCHs may be transmitted via the same beam as that for transmitting the PCCHs as an alternative method. The scheduling information of the PCCHs may be masked by a Paging-Radio Network Temporary Identifier (P-RNTI) that is an identifier unique to the paging. The UE detects the presence or absence of the scheduling information of the PCCHs using the P-RNTI. In the presence of the scheduling information, receiving the PCCHs according to the scheduling information enables the recognition of the presence or absence of the paging addressed to its own UE. In the absence of the scheduling information, the absence of the PCCHs is determined. The determination saves reception of the PCCHs. The reception process can be stopped earlier until the reception timing of the next paging.

A plurality of the scheduling information of the PCCHs may be provided as an alternative method. For example, UEs may be grouped, and the scheduling information may be masked by a P-RNTI that is an identifier unique to each of the groups. Each of the UEs detects the presence or absence of the scheduling information of the PCCHs using the P-RNTI of its own group. In the presence of the scheduling information, receiving the PCCHs according to the scheduling information enables the recognition of the presence or absence of the paging addressed to its own UE. In the absence of the scheduling information, the absence of the PCCHs is determined. The determination saves reception of the PCCHs. The reception process can be stopped earlier until the reception timing of the next paging.

The UEs may be grouped using, for example, the UE-IDs. Each of the UEs easily recognizes to which group its own UE belongs. Examples of a method for deriving an identifier unique to a group from the group include a deriving method using a function, a method for listing the identifier in a table, etc. The method may be predetermined in, for example, a standard.

The grouping may be performed per communication service type as an alternative method. For example, communication services having a long allowable latency and long DRX intervals as seen in a Machine Type Communication (MTC) used in meters are classified into a group separately from communication services having a short allowable latency and short DRX intervals as seen in vehicle-to-vehicle communication. A different DRX period may be set to a group per service type. A node with a mobility management function may set the DRX period. Alternatively, the eNB may set the DRX period.

For example, in a case where the CN makes a flow-based setting per service and the eNB changes the setting to a bearer-based setting, the eNB may set the DRX period. The CN can make the flow-based setting, whereas a RAN can make the bearer-based setting, thus enabling a network slicing function.

A P-RNTI that is an identifier unique to a group per service type is provided. The scheduling information of the PCCHs is masked by the P-RNTI. Consequently, the paging can be transmitted with the DRX period per service type. Thus, a wide variety of services can be supported.

Providing the plurality of the scheduling information of the PCCHs in such a manner can restrict the number of UEs that perform the process of receiving the PCCHs. Thus, the number of UEs that save reception of the PCCHs can be increased.

The plurality of the scheduling information of the PCCHs to be provided may be the same or different from one another. When the plurality of the scheduling information of the PCCHs are the same, one PCCH will suffice. When the plurality of the scheduling information of the PCCHs are different, a plurality of PCCHs may be used. A PCCH for each group may be provided. The plurality of PCCHs are multiplexed and mapped to the resources of a beam unit.

The UE detects, using the P-RNTI of its own group, the presence or absence of the scheduling information of PCCHs corresponding to the group.

In the presence of the scheduling information, receiving the PCCHs corresponding to the group according to the scheduling information enables the recognition of the presence or absence of the paging addressed to its own UE. In the absence of the scheduling information, the absence of the PCCHs is determined. The determination saves reception of the PCCHs. Providing the plurality of PCCHs can reduce the number of the UE-IDs to be included in the PCCHs.

FIG. 27 illustrates example resources when the scheduling information of the PCCHs is transmitted via the same beam as that for transmitting the PCCHs. Although the number of beams is 4 and the number of symbols in each beam unit is 7 in the illustration, the number of beams and the number of symbols in each beam unit may be different values. The scheduling information of the PCCHs is mapped to the fifth symbol, and the PCCH is mapped to each of the sixth to the seventh symbols. The UE detects, using the P-RNTI, the presence or absence of the scheduling information of the PCCHs in the fifth symbol of the beam in the paging sweeping block. The beam is to be transmitted in the area where its own UE is located.

In the presence of the scheduling information, the scheduling information of the PCCHs is received, and to which resources in the sixth to the seventh symbols the PCCHs are mapped is recognized. The UE can receive the PCCHs using the scheduling information and recognize the presence or absence of the paging addressed to its own UE. In the absence of the scheduling information, the absence of the PCCHs is determined, and the reception process is stopped until the reception timing of the next paging without receiving the PCCHs.

A frame structure of a beam sweeping block in which the paging can be transmitted may be different from that of a beam sweeping block in which the paging cannot be transmitted. The beam sweeping block in which the paging can be transmitted includes the resources to which the PCCHs are mapped or the resource to which the scheduling information of the PCCHs is mapped. The beam sweeping block in which the paging cannot be transmitted includes neither the resources to which the PCCHs are mapped nor the resource to which the scheduling information of the PCCHs is mapped.

Differing in frame structure between the beam sweeping block in which the paging can be transmitted and the beam sweeping block in which the paging cannot be transmitted may cause differences, for example, in the duration of each of the beam sweeping blocks, in the beam unit duration, and in the transmission timing of each beam unit.

The eNB may include, in information to be transmitted in the downlink beam sweeping block, information on the beam sweeping block in which the paging can be transmitted and the beam sweeping block in which the paging cannot be transmitted, and notify the UE of such information. Only different information may be notified. Alternatively, information indicating the same information may be included.

Consequently, the UE can receive the beam sweeping blocks with the different frame structures. Since the beam sweeping block in which the paging cannot be transmitted need not include, for example, the resources to which the PCCHs are mapped in such a method, the wasteful use of the resources can be reduced and the use efficiency of the radio resources can be increased.

As an alternative method, the frame structure of the beam sweeping block in which the paging can be transmitted may be the same as that of the beam sweeping block in which the paging cannot be transmitted. Both the beam sweeping block in which the paging can be transmitted and the beam sweeping block in which the paging cannot be transmitted include, in advance, the resources to which the PCCHs are mapped or the resource to which the scheduling information of the PCCHs is mapped.

Matching the frame structure of the beam sweeping block in which the paging can be transmitted to that of the beam sweeping block in which the paging cannot be transmitted equates, for example, durations of the beam sweeping blocks, the beam unit durations, and the transmission timings of the beam units. Thus, there is no need to sort these pieces of information and notify such information to the UE. The amount of information through signaling can be reduced with such a method.

According to the methods disclosed in the fourth embodiment, the UE can receive the paging from the cell that is sweeping beams and also communicate upon receipt of the paging.

The cell may notify the UE of information indicating the presence or absence of sweeping beams. The information may be included in the broadcast information to broadcast the information. The information may be transmitted in a PBCH. The information may be notified using signaling different from that for the information to be transmitted in the beam sweeping block. Alternatively, the information may be included in the information to be transmitted in the beam sweeping block.

Consequently, the UE can recognize whether the searched cell is sweeping beams.

When information indicating the presence or absence of sweeping beams is notified using the signaling different from that for the information to be transmitted in the beam sweeping block and then received by the UE, the UE may receive the information to be transmitted in the beam sweeping block in the presence of sweeping beams, or the UE may not receive the information to be transmitted in the beam sweeping block in the absence of sweeping beams. Consequently, the UE eliminates wasteful reception and can reduce the power consumption.

As an alternative method, a sequence corresponding to the presence or absence of sweeping beams may be used as a sequence of the SS. Upon receipt of the SS of the cell, the UE can recognize whether the cell is sweeping beams.

A mapping correlation between the SS and the PBCH including the broadcast information may be consistent irrespective of whether the cell is sweeping beams. The correlation may be statically determined in, for example, a standard. Irrespective of whether the cell is sweeping beams, the UE can receive the PBCH upon receipt of the SS.

Fifth Embodiment

The fifth embodiment will disclose another method for solving the problems disclosed in the fourth embodiment. Beam sweeping for the paging is provided. A beam sweeping block for the paging is provided. In the following description, the beam sweeping used for the paging will be referred to as "beam sweeping for paging", and the beam sweeping block used for the paging will be referred to as a "beam sweeping block for paging". The paging is transmitted via all beams in the beam sweeping block for paging. The eNB holds the paging from the high-level node until a beam sweeping timing for paging.

The beam sweeping block for paging is provided separately from a beam sweeping block for beam search to which a synchronization signal is mapped. The period of the beam sweeping block for paging can be set separately from that of the beam sweeping block for beam search. The period of the beam sweeping block for paging may be set identical to or different from that of the beam sweeping block for beam search.

A method for setting the beam sweeping block for paging will be disclosed. The cell sets the beam sweeping block for paging. Upon setting the beam sweeping block for paging, the cell notifies the UE of information on the set beam sweeping block for paging. The information may be included in the broadcast information to broadcast the information as a notification method. The cell may transmit the information on the beam sweeping block for paging to the UE, using the beam sweeping block to which the broadcast information is mapped and which is disclosed in the fourth embodiment. Alternatively, the cell may include the information not in the beam sweeping block but in the broadcast information to be transmitted using a data block to notify the UE of the information.

Examples of the information on the beam sweeping block for paging include the information to be transmitted in the beam sweeping block disclosed in the fourth embodiment. The other example is an offset from the timing of the beam sweeping block for beam search. A value of the offset may be predetermined in, for example, a standard. The UE can recognize the timing of the beam sweeping block for paging upon obtainment of the timing of the beam sweeping block for beam search.

Information with the same setting as that of the beam sweeping block for beam search may be omitted. Examples of the information include the number of beam units, etc. The information can be omitted by predetermining in, for example, a standard that settings are the same. The amount of information can be reduced with the omission.

Another method for setting the period of the beam sweeping block for paging will be disclosed. The CN sets the period of the beam sweeping block for paging. For example, the node with the mobility management function performs the setting, and notifies the eNBs being served thereby of the set period of the beam sweeping block for paging. The cell notifies the UE of the received period of the beam sweeping block for paging as the information on the beam sweeping block for paging. The aforementioned methods may be applied as the notification method.

Consequently, the DRX period set by the conventional CN can be used as the period of the beam sweeping block for paging. For example, even when the conventional CN is connected to a 5G eNB, the 5G eNB can transmit the paging to the UEs being served thereby with the period of the paging set by the conventional CN.

FIG. 28 illustrates a method for transmitting the paging when the beam sweeping for paging is provided. Since FIG. 28 is similar to FIG. 24, the differences will be mainly described. A beam sweeping block 3601 for paging is provided. The block 3601 includes a plurality of resources 3602 as denoted by a reference 3621. Each of the resources 3602 is transmitted via a beam denoted by a reference 3622.

An eNB (cell) 3612 provides the beam sweeping block 3601 for paging. The beam sweeping block 3601 for paging is set separately from the beam sweeping block in which a synchronization signal (SS), a PBCH, and a reference signal (RS) are transmitted via each of the beams. The beam sweeping block 3601 for paging is transmitted with the period of the beam sweeping block for paging. In FIG. 28, the period of the beam sweeping block for paging is the DRX period (TDRX) notified from a CN 3611. The paging is transmitted via each of the beams in the beam sweeping block 3601 for paging.

Consequently, the eNB (cell) 3612 can transmit the paging received from the CN 3611, in the beam sweeping block for paging with the period of the beam sweeping block for paging set by the CN 3611.

A UE 3613 receives the beam sweeping block for paging transmitted with the period of the beam sweeping block for paging. The UE 3613 may receive it during the beam-sweeping duration. Consequently, the UE 3613 can receive the paging transmitted from the eNB (cell) 3612.

Figure 29:
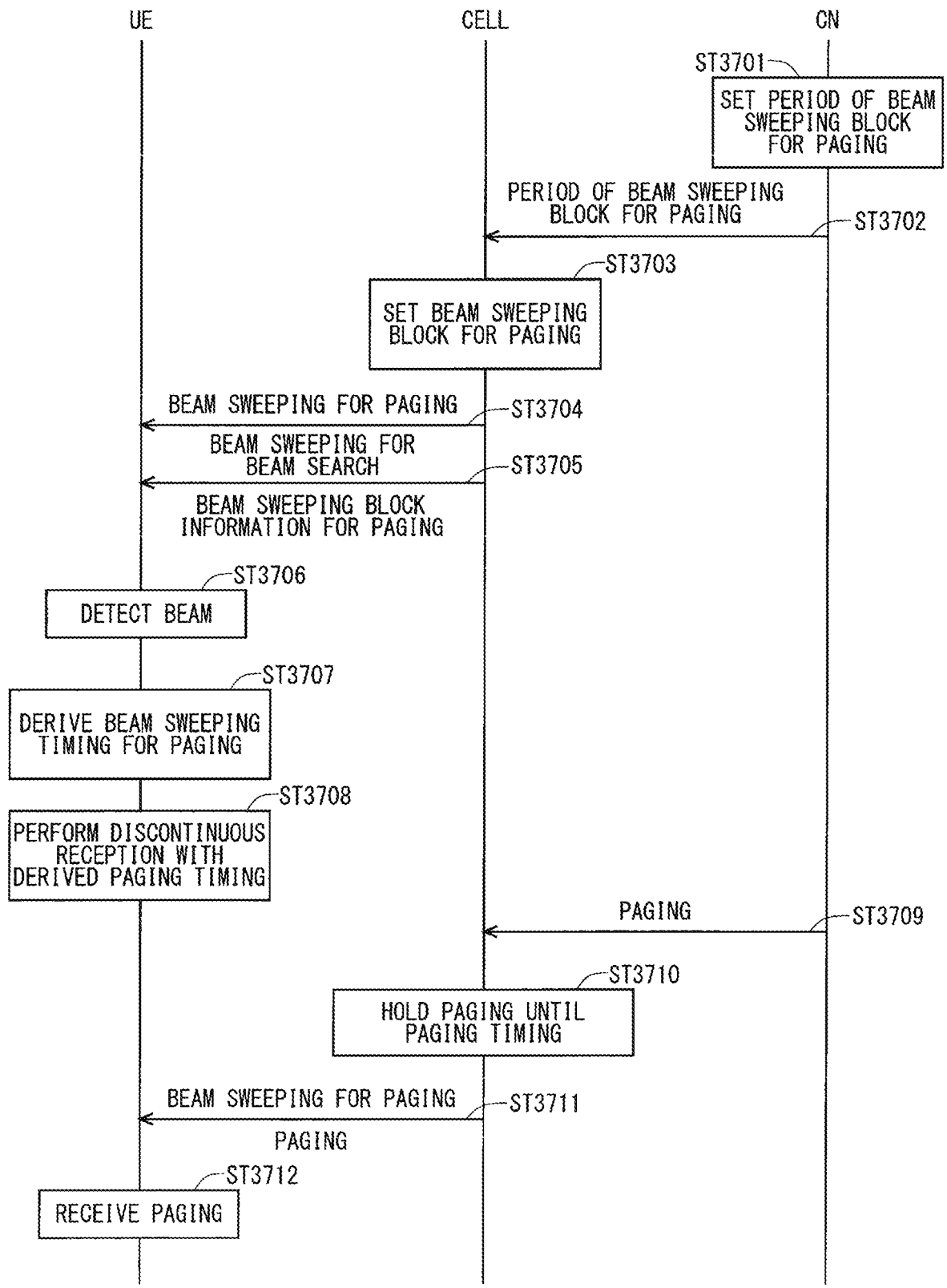
FIG. 29 illustrates an example sequence on paging processes according to the fifth embodiment.

FIG. 29 illustrates an example sequence on paging processes according to the fifth embodiment.

In Step ST3701, the CN sets the period of the beam sweeping block for paging.

In Step ST3702, the CN transmits the period of the beam sweeping block for paging to the cell.

In Step ST3703, the cell sets the beam sweeping block for paging. The period of the beam sweeping block for paging received from the CN in Step ST3702 is used as the period of the beam sweeping block for paging.

In Step ST3704, the cell transmits the beam sweeping block for paging to the UE.

In Step ST3705, the cell transmits, to the UE, a beam sweeping block to which the synchronization signals are mapped, that is, a beam sweeping block for beam search.

Information on the beam sweeping block for paging is transmitted via all beams in the beam sweeping block for beam search.

In Step ST3706, upon receipt of the beam sweeping block for beam search and a receivable synchronization signal, the UE detects a beam that can be received by its own UE.

Upon receipt of the beam that can be received by its own UE, the UE obtains the information on the beam sweeping block for paging in Step ST3707.

In Step ST3707, the UE derives the paging timing from the obtained information on the beam sweeping block for paging. In other words, the UE derives the timing of the beam sweeping block for paging.

In Step ST3708, the UE performs the discontinuous reception (DRX) with the derived paging timing. Upon receipt during the beam sweeping block for paging duration that is the paging timing, the UE detects the presence or absence of the paging. In the absence of the paging, the UE stops a receiving operation after the beam sweeping block for paging duration ends. The UE starts reception in a beam sweeping block for paging after the period of the beam sweeping block for paging, and continues reception during the beam sweeping block for paging duration to detect the presence or absence of the paging. These are repeated.

In Step ST3709, the CN notifies the paging to the cell. In Step ST3710, the cell holds the received paging until the timing of the next beam sweeping block for paging.

In Step ST3711, the cell transmits the held paging with the timing of the next beam sweeping block for paging. The paging is transmitted in all blocks of the beam sweeping block for paging.

Upon detection of the presence or absence of the paging through reception of the beam sweeping block for paging with the period of the beam sweeping block for paging, the UE receives a beam that can be received by its own UE in the beam sweeping block for paging in which the paging has been transmitted to detect the transmitted paging in Step ST3712.

Consequently, the UE can receive the paging from the cell that is sweeping beams.

Figure 30:
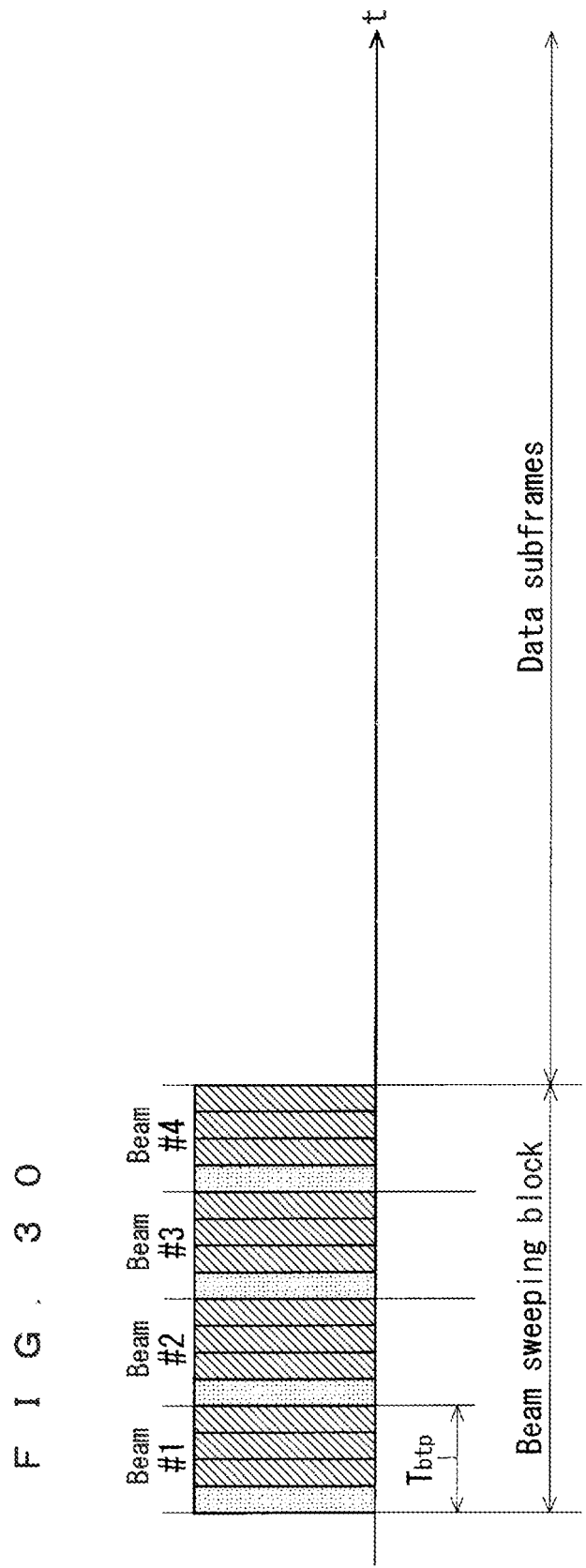
FIG. 30 illustrates a method for transmitting the paging when the beam sweeping for paging is provided.

FIG. 30 illustrates a method for transmitting the paging when the beam sweeping for paging is provided. The beam sweeping block for paging may be paging-specific, or not paging-specific but used for transmitting another signal or channel. FIG. 30 illustrates the paging-specific case.

The methods disclosed in the fourth embodiment may be applied as the method for transmitting the paging. FIG. 30 illustrates an example case where the scheduling information of the PCCHs is transmitted via the same beam as that for transmitting the PCCHs. FIG. 30 illustrates transmission of four beams of beams #1 to #4 in a beam sweeping block. Each beam unit consists of 4 symbols. The scheduling information of the PCCHs is mapped to the first symbol, and the PCCH is mapped to each of the second to the fourth symbols. The UE detects, using the P-RNTI, the presence or absence of the scheduling information of the PCCHs in the first symbol of the beam in the paging sweeping block. The beam is to be transmitted in the area where its own UE is located.

In the presence of the scheduling information, the scheduling information of the PCCHs is received, and to which resources in the second to the fourth symbols the PCCHs are mapped is recognized. The UE can receive the PCCHs using the scheduling information and recognize the presence or absence of the paging addressed to its own UE. In the absence of the scheduling information, the absence of the PCCHs is determined, and the reception process is stopped until the reception timing of the next paging without receiving the PCCHs.

According to the methods disclosed in the fifth embodiment, the UE can receive the paging from the cell that is sweeping beams and also communicate upon receipt of the paging.

Depending on settings of the timing of the beam sweeping block for paging and the timing of the beam sweeping block for beam search, the two timings may overlap. The cell may set the timing of the beam sweeping block for paging without overlapping the timing of the beam sweeping block for beam search.

When the CN determines the period of the beam sweeping block for paging, the cell may set the timing of the beam sweeping block for paging to be derived using the period, and the timing of the beam sweeping block for beam search without overlapping one another.

The setting to prevent the two timings from overlapping one another enables the UE to receive beam sweeping blocks with the respective timings.

Another solution to overlapping of the two timings will be disclosed. The cell preferentially transmits one of two blocks. For example, the beam sweeping block for paging is prioritized. This is effective when the allowable latency from the paging to start of communication is short. Alternatively, this is effective when emergency information such as Public Warning System (PWS) is notified using the paging. For example, the beam sweeping block for beam search is prioritized. This is effective, for example, when a synchronization process of the UE needs to be accelerated. The time for the UE to measure an adjacent cell can be shortened. This is effective when the UE with high mobility performs an inter-cell HO.

This can eliminate a conflict occurring when the timing of the beam sweeping block for beam search overlaps the timing of the beam sweeping block for paging. The UE can receive the beam sweeping block preferentially transmitted.

The alternative method is to determine which one of the two blocks is preferentially transmitted depending on a service. For example, when the service has a short allowable latency from receipt of an incoming call to start of the communication or when the service is an emergency information service such as the PWS, the beam sweeping block for paging is prioritized.

The alternative method is to determine which one of the two blocks is preferentially transmitted depending on a setting period of the beam sweeping block.

For example, the block with a longer setting period is prioritized. When the setting period is longer and no beam sweeping block is transmitted, a state where necessary information is not transmitted for a long time is continued until the next beam sweeping block. This further causes latency. This latency can be prevented by prioritizing the one with a longer setting period.

Conversely, the block with a shorter setting period may be prioritized. When the setting period is determined according to an allowable latency, the block with a shorter setting period has a shorter allowable latency. Thus, preferentially transmitting the block with a shorter setting period can maintain the allowable latency.

This can eliminate a conflict occurring when the timing of the beam sweeping block for beam search overlaps the timing of the beam sweeping block for paging. The UE can receive the beam sweeping block preferentially transmitted.

Another solution to overlapping of the timing of the beam sweeping block for beam search with the timing of the beam sweeping block for paging will be disclosed.

The frequency resources of the beam sweeping block for paging are made different from those of the beam sweeping block for beam search. When the frequency resources are made different, allocation information of the frequency resources may be included as information on the beam sweeping block for paging or the beam sweeping block for beam search.

Figure 31:
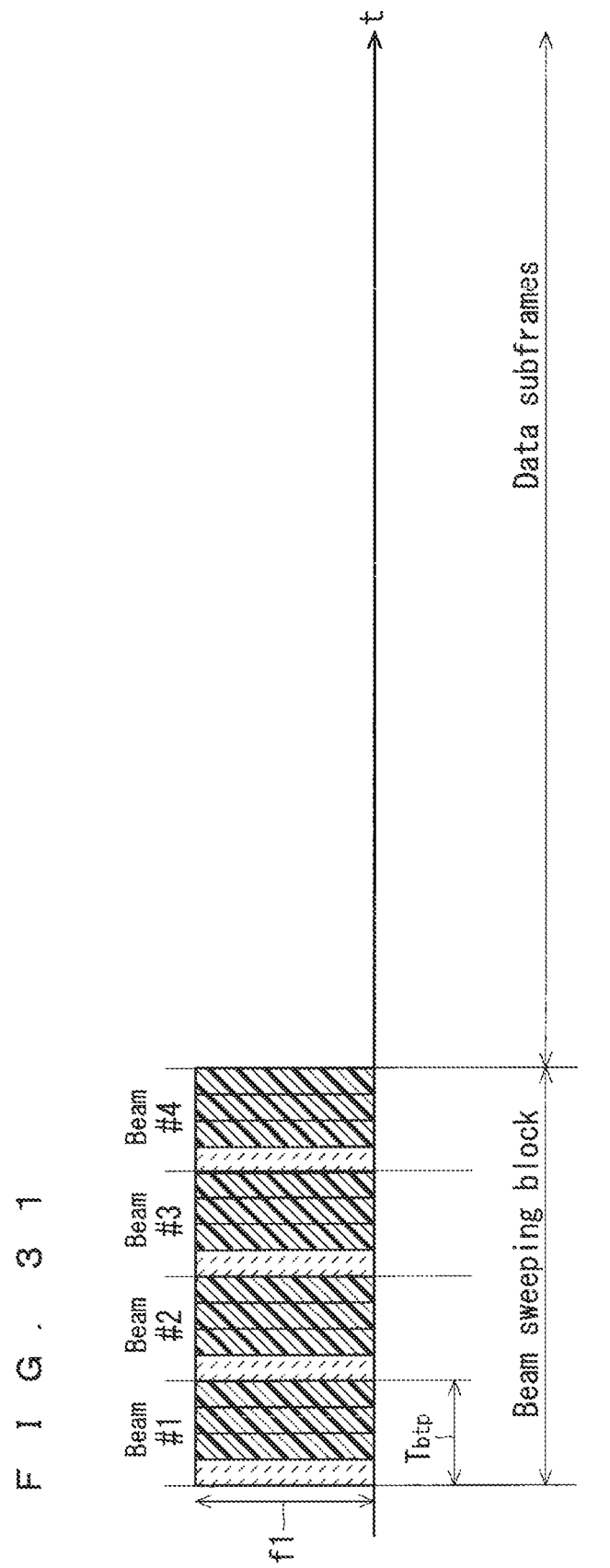
FIG. 31 illustrates a beam sweeping block for beam search.
Figure 32:
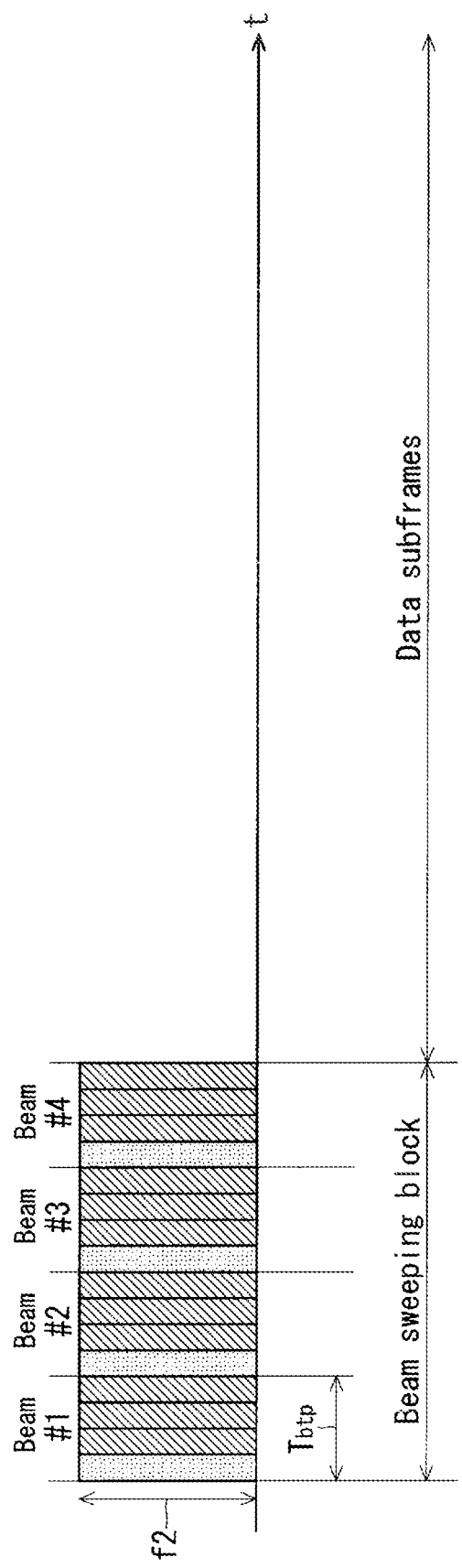
FIG. 32 illustrates a beam sweeping block for paging.

FIG. 31 illustrates the beam sweeping block for beam search. FIG. 32 illustrates the beam sweeping block for paging. In FIGS. 31 and 32, the vertical axis represents the frequency resources, and the horizontal axis represents a time t. FIGS. 31 and 32 illustrate examples where the frequency resources for the beam sweeping block for paging are made different from those for the beam sweeping block for beam search.

The different frequency resources are allocated to the respective beam sweeping blocks. The beam sweeping block for beam search is allocated to a frequency band f1 illustrated in FIG. 31. The beam sweeping block for paging is allocated to a frequency band f2 illustrated in FIG. 32.

The frequency resources may be allocated per sub-carrier. The bandwidths of the beam sweeping blocks may be identical or different from each other. The bandwidth of each of the beam sweeping blocks may be set according to the amount of information to be transmitted in the beam sweeping. This can reduce wasteful use of the resources, and increase the use efficiency of the resources.

Consequently, even when the timing of the beam sweeping block for beam search overlaps the timing of the beam sweeping block for paging, both of the blocks can be transmitted.

Yet another solution to overlapping of the timing of the beam sweeping block for beam search with the timing of the beam sweeping block for paging will be disclosed.

A beam sweeping block including information to be transmitted in the beam sweeping block for beam search and information to be transmitted in the beam sweeping block for paging is provided. This beam sweeping block will be referred to as an "exceptional beam sweeping block". For example, a SS and a PBCH are mapped to the beam sweeping block for beam search to transmit the beam sweeping block. A PCCH and a channel bearing the PCCH scheduling information for transmitting the paging are mapped to the paging beam sweeping block.

Here, the SS, the PBCH, the channel bearing the PCCH scheduling information, and the PCCH are mapped to the exceptional beam sweeping block. Methods for multiplexing these signals channels include time-division multiplexing, frequency-division multiplexing, code-division multiplexing, and combinations of these.

Consequently, even when the timing of the beam sweeping block for beam search overlaps the timing of the beam sweeping block for paging, both of the blocks can be transmitted.

Sixth Embodiment

The sixth embodiment will disclose another method for solving the problems disclosed in the fourth embodiment. The cell transmits the paging with the beam sweeping timing after the paging timing determined using a UE-ID. The cell transmits the paging via all beams in a beam sweeping block. The eNB holds the paging from the high-level node until the beam sweeping timing after the paging timing determined using the UE-ID. The UE receives the paging with the beam sweeping timing after the paging timing determined using its own UE-ID. The UE performs the discontinuous reception.

The timing after the paging timing determined using the UE-ID may be the immediately subsequent beam sweeping timing. Consequently, the amount of latency can be reduced. The timing may not be the immediately subsequent beam sweeping timing. The timing may be a beam sweeping timing after a predetermined timing. For example, in consideration of a processing time until the paging can be transmitted by the eNB that has received the paging from the CN, the time equal to or longer than the processing time may be used for the predetermined timing.

When the paging timing determined using the UE-ID overlaps the beam sweeping timing, the paging may be transmitted with the beam sweeping timing. The cell transmits the paging via all beams in the beam sweeping block. The UE receives the paging with the beam sweeping timing overlapping the paging timing determined using its own UE-ID.

The method for deriving the paging timing using the UE-ID may be predetermined in a standard. A conventional method may be applied thereto. The CN may set the DRX period. Even when the conventional CN is connected to the 5G eNB, the 5G eNB can receive the paging from the conventional CN, and the eNB (cell) can transmit the paging to the UEs being served thereby.

Figure 33:
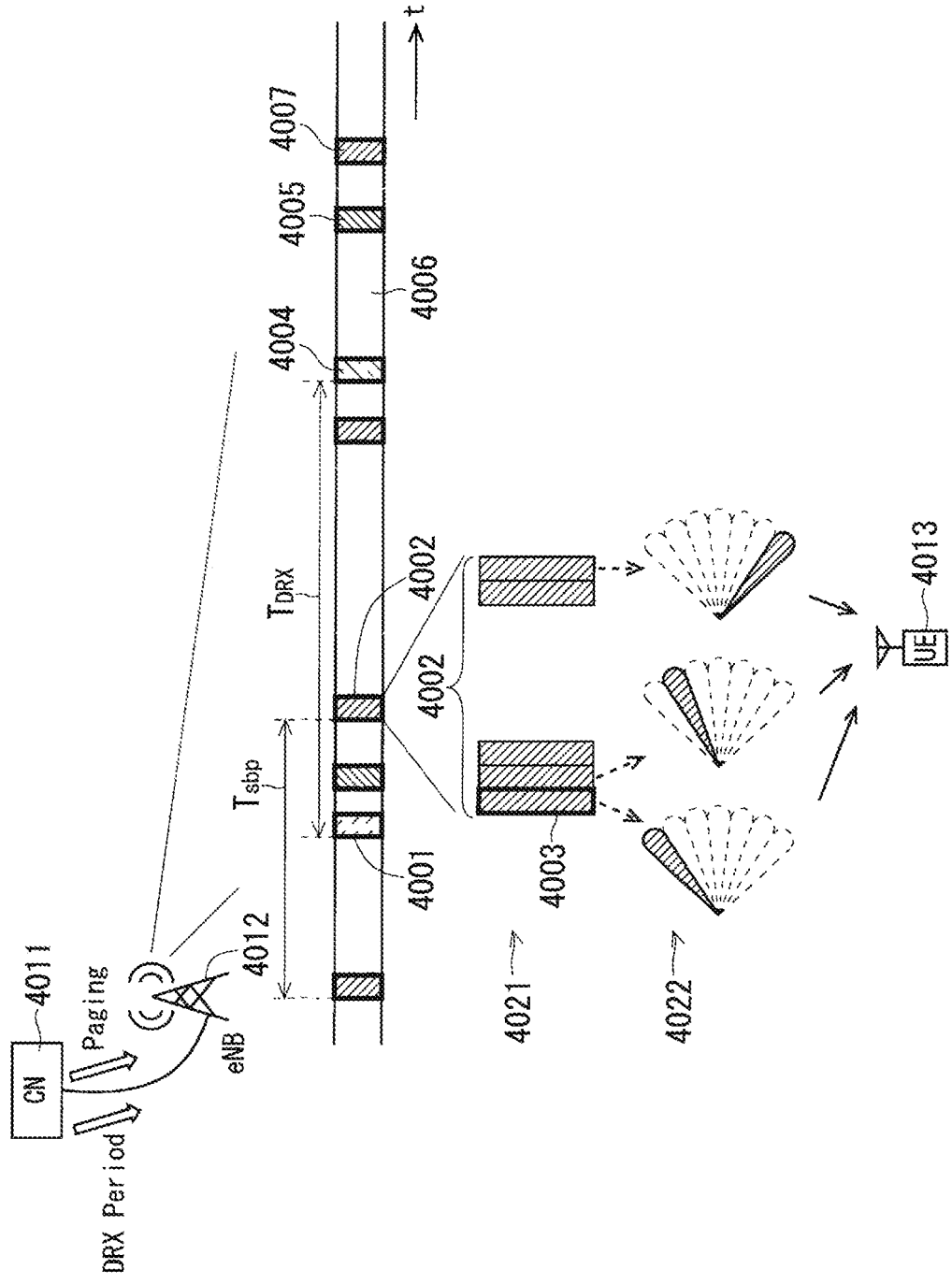
FIG. 33 illustrates a method for transmitting the paging with the beam sweeping timing after the paging timing determined using a UE-ID.

FIG. 33 illustrates a method for transmitting the paging with the beam sweeping timing after the paging timing determined using the UE-ID. FIG. 33 illustrates transmission with the immediately subsequent beam sweeping timing. Since FIG. 33 is similar to FIG. 24, the differences will be mainly described.

An eNB (cell) 4012 derives the paging timing in a predetermined deriving method using the DRX period (TDRX) notified from a CN 4011 and a UE-ID of a UE #n. Paging timings 4001 and 4004 of the UE #n are generated with the DRX period. Upon receipt of the paging for the UE #n from the CN 4011, an eNB 4012 derives the paging timing 4001 with which the paging for the UE #n is to be transmitted.

The eNB (cell) 4012 transmits the paging to the UE #n in a downlink beam sweeping block 4002 with a downlink beam sweeping timing immediately subsequent to the derived paging timing. The eNB (cell) 4012 transmits the paging to the UE #n via all beams in the downlink beam sweeping block 4002 immediately subsequent to the derived paging timing.

A UE 4013 derives the paging timings 4001 and 4004 generated with the DRX period, in the predetermined deriving method using the DRX period notified from the eNB (cell) 4012 and the UE-ID of its own UE #n.

The UE 4013 receives the downlink beam sweeping blocks 4002 and 4007 with the downlink beam sweeping timing that are immediately subsequent to the derived paging timings 4001 and 4004 generated with the DRX period, respectively. The UE 4013 performs reception during the derived paging block duration. Consequently, the UE 4013 can receive the paging of the downlink beam sweeping block 4002 in which the paging has been transmitted.

The downlink beam sweeping block 4002 includes a plurality of resources 4003 as denoted by a reference 4021. Each of the resources 4003 is transmitted via a beam denoted by a reference 4022. A DL/UL data subframe 4006 in which downlink data and uplink data are transmitted is interposed between the downlink beam sweeping block 4004 and an uplink beam sweeping block 4005.

The first embodiment may be applied to the method for transmitting the PCCHs and the method for transmitting the scheduling information of the PCCHs.

Consequently, the eNB (cell) 4012 can transmit the paging received from the CN 4011, with the beam sweeping timing immediately subsequent to the paging timing derived using the DRX period and the UE-ID. The UE 4013 can receive the paging transmitted from the cell through the discontinuous reception with the timing of the beam sweeping block for paging that is immediately subsequent to the paging timing derived using the DRX period and the UE-ID of its own UE.

Figure 34:
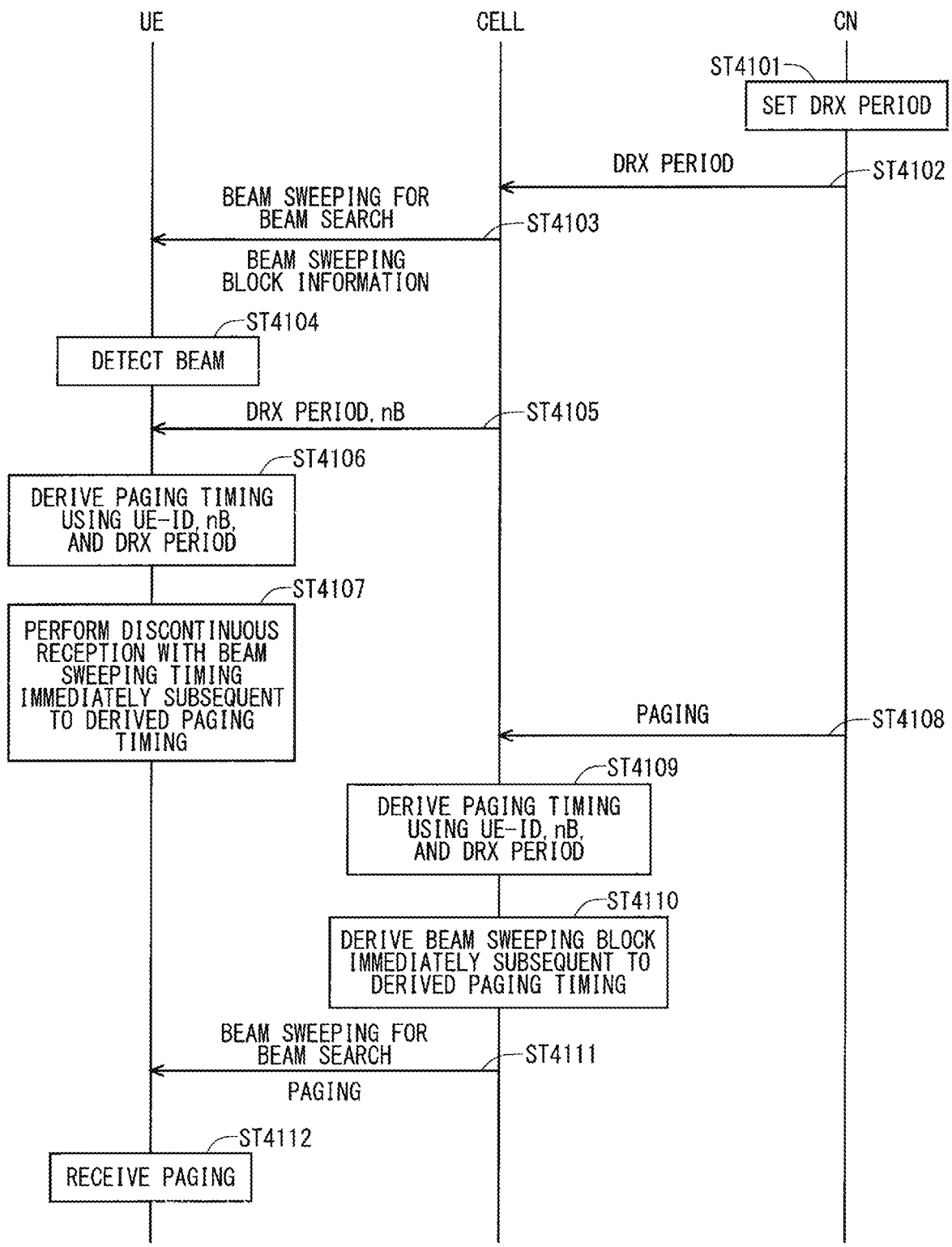
FIG. 34 illustrates an example sequence on paging processes according to the sixth embodiment.

FIG. 34 illustrates an example sequence on paging processes according to the sixth embodiment.

In Step ST4101, the CN sets a DRX period. In Step ST4102, the CN notifies the cell of the DRX period.

The cell sets a beam sweeping block for beam search. In Step ST4103, the cell transmits, to the UE, the beam sweeping block for beam search with the beam sweeping timing for beam search. Information on the beam sweeping block is transmitted via all beams in the beam sweeping block for beam search.

In Step ST4104, upon receipt of the beam sweeping block for beam search and a receivable synchronization signal, the UE detects a beam that can be received by its own UE.

In Step ST4105, the cell transmits, to the UE, the DRX period received from the CN and a parameter nB for deriving the paging timing. The DRX period and the parameter nB to be transmitted may be included in the broadcast information to be broadcast, or included in a UE dedicated message to be transmitted through the UE-dedicated signaling. The DRX period and the parameter nB may be included in the beam sweeping block for beam search and transmitted in all the blocks. The UE receives the DRX period and the parameter nB that have been transmitted from the cell.

In Step ST4106, the UE derives the paging timing in a predetermined method using the DRX period and the parameter nB that have been received, and its own UE-ID.

In Step ST4107, the UE derives a beam sweeping timing immediately subsequent to the paging timing derived in Step ST4106, and performs the discontinuous reception with the beam sweeping timing.

Consequently, the UE can perform the discontinuous reception with the closest beam sweeping timing after the paging timing derived in the predetermined method using the DRX period and the parameter nB that have been received, and its own UE-ID.

In Step ST4108, the CN notifies the cell of the paging. In Step ST4109, the cell derives the paging timing in the predetermined method using the DRX period and the parameter nB that have been received, and its own UE-ID.

In Step ST4110, the cell derives the beam sweeping timing block immediately subsequent to the paging timing. Here, the beam sweeping block for beam search is derived.

In Step ST4111, the cell transmits the paging via all beams in the derived beam sweeping block for beam search to the UE. The cell holds the paging received from the CN in Step ST4108 until the sweeping timing for beam search in Step ST4111.

Upon detection of the presence or absence of the paging through the discontinuous reception with the beam sweeping timing immediately subsequent to the paging timing derived using the DRX period, the parameter nB, and its own UE-ID, the UE receives the beam that can be received by its own UE in the beam sweeping block for beam search in which the paging is transmitted to detect the transmitted paging in Step ST4112.

Consequently, the UE can receive the paging from the cell that is sweeping beams.

Although the cell transmits the paging in the downlink beam sweeping block that is the closest from the paging timing with which the paging received from the CN is to be transmitted, the downlink beam sweeping block may not be the one immediately subsequent to the paging timing. The paging may be transmitted in a downlink beam sweeping block after a lapse of a predetermined duration. The eNB holds the paging received from the CN until the transmission timing of the downlink beam sweeping block after a lapse of the predetermined duration. The predetermined duration may be set in consideration of a processing duration of the cell from derivation of the paging timing to transmission of the paging. This eliminates the need for the processing for a short duration and can reduce malfunctions in the eNB.

Seventh Embodiment

The seventh embodiment will disclose another method for solving the problems disclosed in the fourth embodiment. The timing of sweeping beams which enables transmission of the paging is derived using a UE-ID. The timing may be derived using a function. The UE-ID may be used as an input parameter.

Beam sweeping blocks are numbered. Beam sweeping block numbers (BSBNs) are assigned. Predetermined values may be repeatedly assigned as the BSBNs. The BSBNs are, for example, the numbers from 0 to 1023. After 1023, the numbers from 0 are again repeatedly assigned. The BSBNs may be included in the broadcast information in all the beams in the beam sweeping block. The BSBNs may be broadcast via all the beams. Alternatively, a signal using a sequence derived from the BSBN may be mapped to each of the beams in the beam sweeping block to be transmitted. The UE can recognize the BSBN by receiving the signal of the beam in the beam sweeping block.

The paging is transmitted in a beam sweeping block. Here, the timing of sweeping beams which enables transmission of the paging can be represented by the BSBN. For example, a BSBN is assigned to a beam sweeping block for beam search. The UE receives the beam sweeping block for beam search to obtain the timing of the beam sweeping for beam search and also the BSBN. When the paging is transmitted in the beam sweeping block for beam search, the UE derives a BSBN of beam sweeping for beam search which enables transmission of the paging, using its own UE-ID.

There may be one or more BSBNs. A function for deriving the BSBN as an output parameter using a UE-ID as an input parameter may be provided. The UE performs the DRX reception using the derived BSBN. When the paging to the UE is generated, the cell transmits the paging in the beam sweeping block for beam search with the BSBN derived using the UE-ID. Consequently, the UE can receive the paging in the beam sweeping block with the BSBN derived using its own UE-ID.

The BSBN is applicable when the beam sweeping block for paging is provided. The BSBN for the beam sweeping block for paging may be assigned. For example, the UE receives the beam sweeping block for beam search to obtain the timing of the beam sweeping for paging. The UE receives the beam sweeping block for paging to obtain the BSBN. The UE derives a BSBN of the beam sweeping for beam search which enables transmission of the paging, using its own UE-ID.

The UE performs the DRX reception using the derived BSBN. When the paging to the UE is generated, the cell transmits the paging in the beam sweeping block for paging with the BSBN derived using the UE-ID. Consequently, the UE can receive the paging in the beam sweeping block with the BSBN derived using its own UE-ID.

According to the method disclosed in the seventh embodiment, the beam sweeping block timing with which the paging is transmitted can vary depending on the UE-ID. This can avoid the concentration of the pagings of many UEs at one timing.

The previous example describes the case where the UE recognizes the timing of the beam sweeping block. The BSBN may be associated with at least one of a radio frame number, a subframe number, and a symbol number as an alternative method. Association with at least one of the first radio frame number, the first subframe number, and the first symbol number in the beam sweeping block enables the UE that has recognized the BSBN to recognize the timing of the beam sweeping block.

Eighth Embodiment

The fourth embodiment discloses transmission of the paging via all the beams in the beam sweeping block. The fourth embodiment also discloses the method for mapping the PCCH to each of the beams to transmit the PCCH. To transmit the PCCH via each of the beams, the resources per beam of a beam sweeping block may be larger than or equal to the resources necessary for transmitting the PCCH. For example, a time domain, that is, a beam transmission duration per beam may be 1 subframe, 1 slot, or a predetermined number of symbols. Alternatively, a TTI per beam of the beam sweeping block may be provided to set the TTI to the beam transmission duration per beam. The TTI may be 1 subframe, 1 slot, or a predetermined number of symbols.

The paging may be multiplexed with another signal or another channel in each of the beams of the beam sweeping block. Examples of the other signal and the other channel include a synchronization signal (SS), a PBCH, a channel bearing the PCCH scheduling information, etc. that are disclosed in the first embodiment.

The multiplexing may be performed on the time axis or the frequency axis as the multiplexing method. The unit of multiplexing on the time axis is, for example, per symbol. The unit of multiplexing on the frequency axis is, for example, per sub-carrier. The multiplexing may be performed per predetermined resource block on both the time axis and the frequency axis in combination.

Consequently, the paging (PCCH) can be transmitted via each of the beams in the beam sweeping block.

First Modification of Eighth Embodiment

Mapping the paging to each of the beams in the beam sweeping block prolongs the duration of the beam sweeping block. Thus, the UE has to perform reception for a long duration. When another signal and another channel such as a synchronization signal and a PBCH are multiplexed with the paging, the UE has to perform reception for a long duration to receive the signal and the channel. This causes a problem with increase in the power consumption of the eNB as well as that of the UE.

The first modification will disclose a method for solving such a problem.

The cell transmits information indicating the presence of the paging in the beam sweeping block. The cell may transmit the information indicating the presence of the paging via all beams in the beam sweeping block. The cell also transmits scheduling information of the resource to which the PCCH is mapped, in the beam sweeping block. The scheduling information may be used as the information indicating the presence of the paging. The scheduling information is transmitted via all beams in the beam sweeping block.

The following (1) and (2) will be disclosed as examples of the scheduling information of the resource to which the PCCH is mapped:

(1) timing: the timing may be a temporal offset from the resource to which the scheduling information is mapped; and (2) resource allocation.

Upon receipt of these pieces of information transmitted from the cell, the UE can recognize the resource to which the PCCH is mapped and receive the PCCH. These pieces of information may be predetermined in, for example, a standard. Predetermining these pieces of information in, for example, a standard can omit transmission of these.

The resource allocation in the example (2) may be transmitted in a subframe in which the PCCH is to be transmitted. The resource allocation may be included in the scheduling information of the PCCH and mapped to an L1/L2 control signal to be transmitted.

The other examples of the scheduling information of the resource to which the PCCH is mapped include a beam ID. Upon receipt of a PCCH and in the presence of a signal enabling recognition of a beam ID using the resource with which the PCCH is to be transmitted, the UE can verify whether the beam ID is correct.

The masking method using the P-RNTI that is an identifier unique to the paging disclosed in the fourth embodiment may be used for information indicating the presence of the paging. The UE detects the presence or absence of the information indicating the presence of the paging, using the P-RNTI. In the presence of the information indicating the presence of the paging, the resource to which the PCCH is mapped is received according to the scheduling information of the resource to which the PCCH is mapped. Upon receipt of the PCCH through receipt of the resource to which the PCCH is mapped, the UE can recognize the presence or absence of the paging addressed to its own UE. In the absence of the information indicating the presence of the paging, the absence of the PCCH is determined. The determination saves reception of the resource to which the PCCH is mapped. The reception process can be stopped earlier until the reception timing of the next paging.

The cell maps a PCCH corresponding to the paging to the resource subsequent to the beam sweeping block in which the information indicating the presence of the paging has been transmitted to transmit the PCCH. The PCCH may be mapped to a data subframe to be transmitted. The scheduling information of the PCCH and the PCCH may be mapped to the resource. The L1/L2 control signal may be transmitted with the resource. The scheduling information of the PCCH may be mapped to the L1/L2 control signal to be transmitted. The PCCH may be mapped to a dedicated data channel to be transmitted.

Examples of the scheduling information of the PCCH include resource allocation information, modulating information, coding information, etc. The masking method using the P-RNTI that is an identifier unique to the paging disclosed in the fourth embodiment may be used for the scheduling information of the PCCH.

Figure 35:
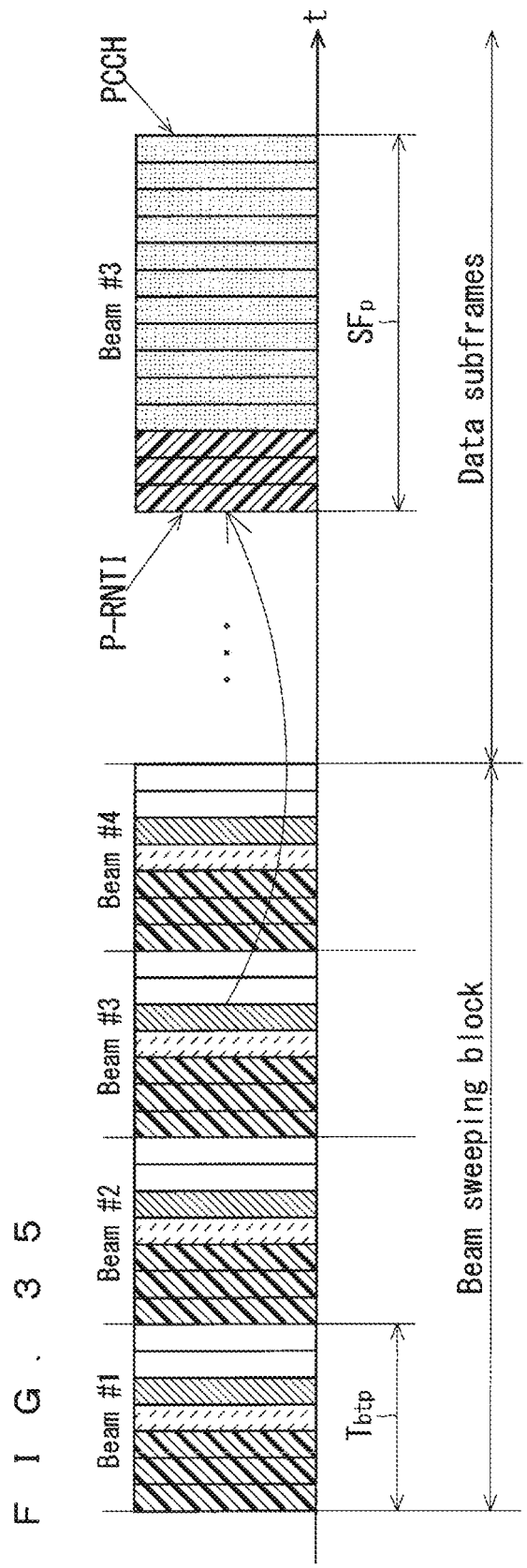
FIG. 35 illustrates example resources when information indicating the presence of the paging is to be transmitted in the beam sweeping block.

FIG. 35 illustrates example resources when the information indicating the presence of the paging is to be transmitted in a beam sweeping block. The information indicating the presence of the paging is mapped to the resources of all the beams in the beam sweeping block. The scheduling information of the PCCHs and the PCCHs are mapped to data subframes subsequent to the beam sweeping block in which the information indicating the presence of the paging has been transmitted.

FIG. 35 illustrates transmission of four beams in the beam sweeping block. In FIG. 35, a reference $SF_p$ denotes a duration for transmitting each of the beams. Each beam unit consists of 7 symbols. SSs, a PBCH, and information indicating the presence of the paging are mapped to each of the beam units. A channel including the information indicating the presence of the paging may be mapped thereto. The SSs and the PBCH are time-multiplexed with the information indicating the presence of the paging. FIG. 35 also illustrates that a symbol to which the information indicating the presence of the paging is mapped is statically predetermined in, for example, a standard.

The information indicating the presence of the paging is mapped to the fifth symbol of the resources to be transmitted via each of the beams to transmit the information. The information indicating the presence of the paging includes the scheduling information of the resources to which the PCCHs are mapped to transmit the information. The PCCHs are to be transmitted in the subsequent data subframes. The UE can recognize the presence or absence of the paging addressed to its own UE by receiving the information indicating the presence of the paging through reception of the fifth symbol of the beam in the paging sweeping block. The beam is to be transmitted in the area where its own UE is located. The UE also receives the information indicating the presence of the paging, and the scheduling information of the resources to which the PCCHs are mapped. The PCCHs are to be transmitted in the subsequent data subframes. Consequently, the UE can receive the resources to which the PCCHs are mapped.

The cell maps the PCCHs corresponding to the paging to the resources subsequent to the beam sweeping block in which the information indicating the presence of the paging has been transmitted to transmit the PCCHs. The resources may be data subframes. The scheduling information of the PCCHs and the PCCHs are mapped to the resources. The scheduling information of the PCCHs is mapped to the L1/L2 control signal to be transmitted, whereas the PCCHs are mapped to dedicated data channels to be transmitted.

The UE receives the L1/L2 control signal of the resources to which the PCCHs are mapped to obtain the scheduling information of the PCCHs. The UE receives the PCCHs to be mapped to the data channels in the same subframe, according to the scheduling information.

Consequently, the UE can receive the resources to which the PCCHs are mapped to receive the paging. The PCCHs are to be transmitted in the data subframes subsequent to the information indicating the presence of the paging.

The cell may set a subframe to which the PCCHs are mapped only when the paging is generated, and transmit the subframe. When the paging is not generated, the resources can be used in another communication. This can increase the use efficiency of the resources and also the transmission rate.

The method disclosed in the first modification is applicable to the method for transmitting the paging in the beam sweeping. For example, the method is applicable not only to transmission of the paging in the beam sweeping for beam search but also to transmission of the paging in the beam sweeping for paging.

The masking method using the P-RNTI that is an identifier unique to the paging has been disclosed for application to at least one of the information indicating the presence of the paging and the scheduling information of the PCCHs. As an alternative method, the UEs may be grouped, and the masking using a P-RNTI that is an identifier unique to each group may be performed. The masking method using the P-RNTI that is the identifier unique to each group, which is disclosed in the fourth embodiment, is applicable. The resources to which the PCCHs corresponding to each of the groups are mapped may differ. The number of the UEs included in one PCCH can be reduced through the grouping. Thus, the contention when the paging is generated can be reduced.

As an alternative method, at least one of the information indicating the presence of the paging and the scheduling information of the PCCHs may be masked using an identifier unique to the UE. A UE-dedicated identifier may be an identifier used in a mobility management entity. Alternatively, the UE-dedicated identifier may be an identifier used for each cell. The identifier used for each cell may be obtained from the cell when the UE is RRC connected to the cell. The UE holds the identifier used for each cell even in an idle state.

When the UE moves and a serving cell is changed, the UE may stop using the identifier. When the serving cell is changed, the UE may again access the cell to be RRC connected to the cell to obtain a Cell-Radio Network Temporary Identifier (C-RNTI) from the cell. The UE may apply the identifier used for each cell in an inactive state, while being in an RRC connected state.

Using the identifier for each cell as the UE-dedicated identifier can further reduce the number of the UEs included in one PCCH. Thus, the contention when the paging is generated can be further reduced.

Ninth Embodiment

The ninth embodiment will disclose another method for solving the problems disclosed in the fourth embodiment. The paging is transmitted with the paging timing derived using the UE-ID and the DRX period as conventionally performed. When the paging timing overlaps a data subframe, the paging is transmitted in the data subframe with the paging timing. Since the beam sweeping is not performed in the data subframe, the entire coverage of the cell cannot be covered. Thus, the cell needs to recognize a beam area where a UE exists to transmit the paging via the beams in the beam area where the UE exists with the timing of the data subframe.

A method by which the cell recognizes the beam area where the UE exists will be disclosed. An identifier per beam is provided, and transmitted via each of the beams in a beam sweeping block for beam search. The cell may broadcast the beam identifiers as broadcast information, or use them in a sequence for RS. Alternatively, the cell may use the beam identifiers in a sequence for a synchronization signal, or in a sequence for a discovery signal (hereinafter also referred to as a "DS") if the DS exists. Consequently, the UE can recognize a beam identifier of the received beam.

The UE recognizes in which beam area the UE exists by obtaining the beam identifier of the beam received through the beam sweeping for beam search.

The UE recognizes an UL transmission timing of the beam area where its own UE exists, using the beam identifier. The UE transmits an uplink signal or an uplink physical channel with the UL transmission timing. A PRACH may be transmitted as the uplink physical channel. A PRACH that does not involve any scheduling request may be transmitted. Information to be transmitted in the PRACH may include an identifier of the UE. For example, a sequence used for the PRACH may be derived using the UE-ID.

The identifier of the UE may be a value obtained by grouping UE identifiers used for the paging. The cell can recognize the paging timing of the UE by obtaining the UE identifier through reception of the PRACH and deriving the paging timing using the UE identifier. The paging timing information derived using the identifier of the UE may be included as the information to be transmitted in the PRACH. The paging timing information may be, for example, information on PF and PO. The cell can obtain the paging timing information.

The cell identifies a beam in the beam area where the UE exists from the beam via which the PRACH has been received, and obtains a UE identifier of the UE that has received the PRACH to derive the paging timing. Consequently, the cell recognizes via which beam and with which timing the paging should be transmitted. Alternatively, the cell recognizes with which paging timing and via which beam the paging should be transmitted. The cell transmits the paging with the paging timing and via the beam in the beam area where the UE exists.

Although what is disclosed is that the UE may transmit the PRACH that does not involve any scheduling request, this method is not restrictive. The PRACH may include information indicating a PRACH for identifying a beam area as an alternative method. When the cell receives the PRACH and recognizes that the PRACH is for identifying a beam area, the subsequent RA process is not performed. Consequently, a wasteful process can be omitted. Furthermore, the signaling load on the cell, and the power consumption of the cell and the UE can be reduced.

Although what is disclosed is that the UE transmits the PRACH that does not involve any scheduling request with the UL transmission timing, this method is not restrictive. As an alternative method, the UE may transmit the PRACH, and the cell and the UE may perform the subsequent RA process. This is effective when the available resource for the PRACH is less and the PRACH cannot include the aforementioned information. The UE may include the previously disclosed information to be transmitted in the PRACH, not in the PRACH but in a message 3 of the RA process to transmit the information to the cell.

Consequently, the cell can identify the beam in the beam area where the UE exists, and obtain the UE identifier to derive the paging timing.

The UE may not make an RRC Connection Request to the cell using the message 3 of the RA process. The cell may stop the subsequent processes unless the UE makes the RRC Connection Request. Consequently, a wasteful process can be omitted. Furthermore, the signaling load on the cell, and the power consumption of the cell and the UE can be reduced.

The paging timing may overlap the beam sweeping timing. Here, the transmitting method using the data subframe is not applicable. The paging may be transmitted with the beam sweeping timing as a method for solving such a problem, using the method disclosed in the sixth embodiment to be applied when the paging timing determined using a UE-ID overlaps the beam sweeping timing.

The cell transmits the paging via all beams in a beam sweeping block. The UE receives the paging with the beam sweeping timing overlapping the paging timing determined using its own UE-ID.

The methods disclosed in the fourth and eighth embodiments may be applied as the method for transmitting and receiving the paging via all the beams in the beam sweeping block.

Another method for solving the case where the paging timing overlaps the beam sweeping timing will be disclosed.

Overlapping of the paging timing with the beam sweeping timing is prevented. The paging timing is made different from a radio frame and a subframe in which the beam sweeping block is to be transmitted. A predetermined subframe may be used as a beam sweeping block, and any subframe except for the predetermined subframe may be set as a subframe in which the paging can be transmitted.

The paging timing using the UE-ID may be set to the subframe in which the paging can be transmitted.

Consequently, overlapping of the paging timing derived using the UE-ID with the beam sweeping timing is eliminated, and the paging can be transmitted in the data subframe.

According to the method disclosed in the ninth embodiment, the cell that recognizes the beam area where the UE exists can transmit the paging via the beam in the beam area where the UE exists, with the paging timing derived using the DRX period and the UE-ID of the UE in which the paging has been generated. The UE can receive the paging when the paging is generated, through discontinuous reception with the paging timing derived using the UE-ID of its own UE and the DRX period.

Figure 36:
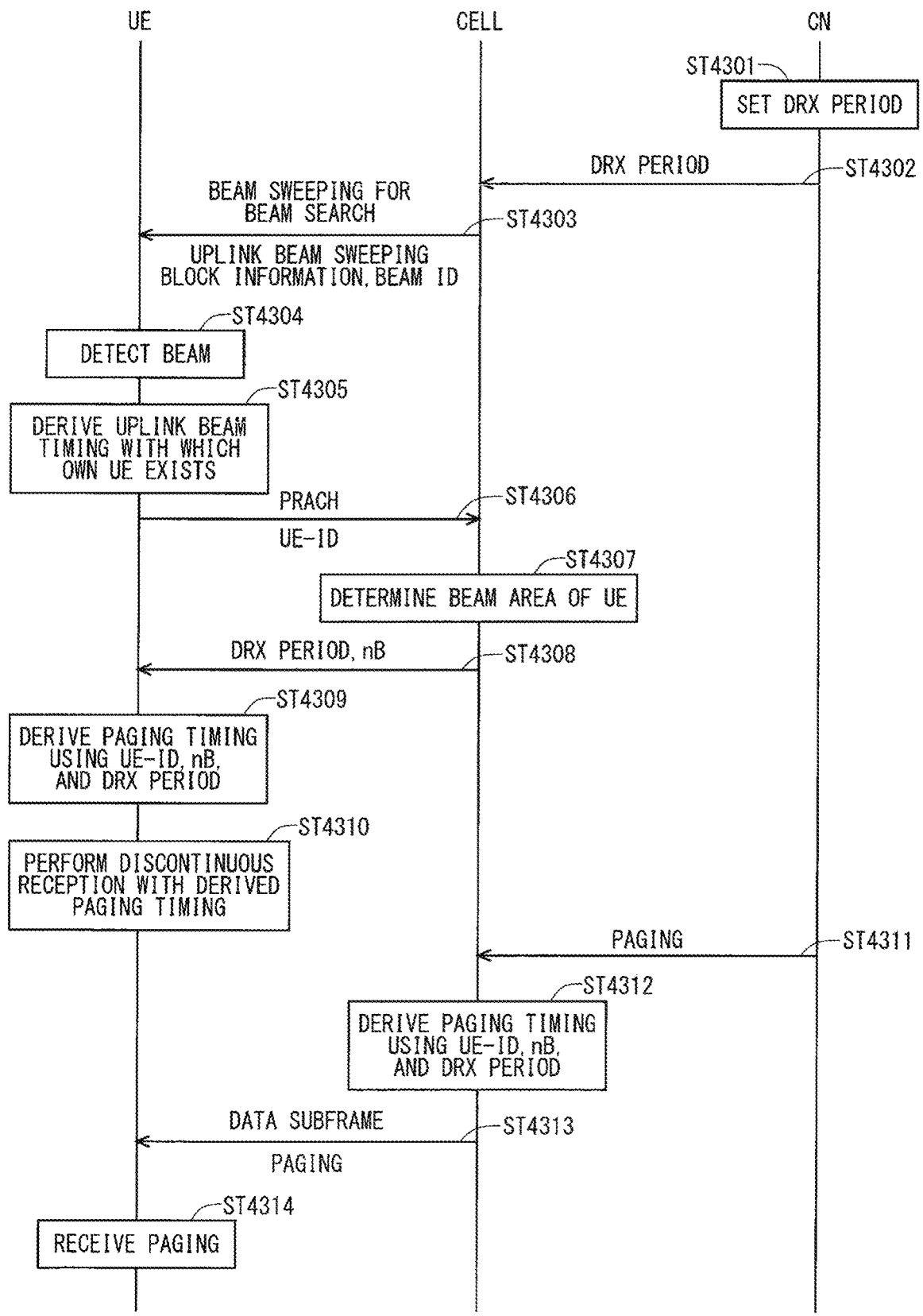
FIG. 36 illustrates an example sequence on paging processes according to the ninth embodiment.

FIG. 36 illustrates an example sequence on paging processes according to the ninth embodiment.

In Step ST4301, the CN sets a DRX period. In Step ST4302, the CN notifies the cell of the DRX period.

The cell sets a beam sweeping block for beam search. In Step ST4303, the cell transmits, to the UE, the beam sweeping block for beam search with the beam sweeping timing for beam search. Information on the uplink beam sweeping block is transmitted via all beams in the beam sweeping block for beam search. A beam identifier (beam ID) of each of the beams in the beam sweeping block for beam search is transmitted via the beam. The beam identifier may be included in the PRACH to transmit the beam identifier, or transmitted using a sequence for each beam in the RS.

In Step ST4304, upon receipt of the beam sweeping block for beam search and a receivable synchronization signal, the UE detects a beam that can be received by its own UE.

In Step ST4305, the UE derives an uplink beam timing with which its own UE exists, from information on the uplink beam sweeping block and the beam identifier that have been received. For example, a time interval between the beam sweeping timing for beam search and the uplink beam sweeping timing, etc. may be used as the information on the uplink beam sweeping block.

In Step ST4306, the UE transmits the PRACH with the timing of the beam unit of its own UE in the derived uplink beam sweeping block. A sequence using its own UE identifier is used as the PRACH.

In Step ST4307, the cell identifies the identifier of the UE and a beam area transmitted, from the received PRACH. Identifying the beam area enables the beam unit number to be identified. Consequently, the cell can recognize which UE exists in which beam area.

In Step ST4308, the cell transmits the DRX period received from the CN and the parameter nB for deriving the paging timing. The DRX period and the parameter nB to be transmitted may be included in the broadcast information to be broadcast. Alternatively, the DRX period and the parameter nB may be included in the beam sweeping block for beam search and transmitted in all the blocks. Alternatively, the DRX period and the parameter nB may be included in a UE dedicated message and transmitted through the UE-dedicated signaling. When the cell recognizes the beam area of the UE, it may transmit the DRX period and the parameter nB to each of the UEs using a data subframe.

In Step ST4309, the UE derives the paging timing in a predetermined method using the DRX period and the parameter nB that have been received, and its own UE-ID.

In Step ST4310, the UE performs the discontinuous reception with the derived paging timing.

Consequently, the UE can perform the discontinuous reception with the paging timing derived in the predetermined method using the DRX period and the parameter nB that have been received, and its own UE-ID.

In Step ST4311, the CN notifies the cell of the paging. In Step ST4312, the cell derives the paging timing in the predetermined method using the DRX period and the parameter nB that have been received, and its own UE-ID.

In Step ST4313, the cell transmits the paging to the UE using the data subframe with the derived paging timing. The cell holds the paging received from the CN in Step ST4311 until the derived paging timing.

Upon detection of the presence or absence of the paging through the discontinuous reception with the paging timing derived using the DRX period, the parameter nB, and its own UE-ID, the UE receives the data subframe in which the paging has been transmitted to detect the transmitted paging in Step ST4314.

Consequently, the UE can receive the paging from the cell that is sweeping beams.

The method disclosed in the ninth embodiment by which the UE transmits the uplink signal or the uplink physical channel with the UL transmission timing may be applied to a case where the UE in the RRC connected state performs a DRX process. While the UE is moving in the DRX process during no reception or no transmission, the cell cannot recognize the beam area where the UE exists. This is effective as a method by which the cell can recognize the beam area where the UE exists. For example, assuming the UL transmission timing as the UL beam sweeping timing, the UE transmits the uplink signal or the uplink physical channel which includes the UE-ID information, in the UL beam sweeping block.

3GPP is studying an inactive state (see Non-Patent Documents 22 and 23). The method disclosed in the ninth embodiment by which the UE transmits the uplink signal or the uplink physical channel with the UL transmission timing may be applied to such a state. The cell can recognize the beam area where the UE exists.

Tenth Embodiment

Upon receipt of the paging with the beam sweeping timing, the UE transmits a response signal to the paging with the next uplink beam sweeping timing. The PRACH is considered to be transmitted as the response signal. As described in Non-Patent Documents 18 and 19, a predetermined data subframe duration is provided between the downlink beam sweeping timing and the uplink beam sweeping timing in the conventional beam sweeping.

Upon receipt of the paging with the downlink beam sweeping timing, the UE waits for the predetermined data subframe duration until the next uplink beam sweeping timing and then starts UL access. Thus, a problem with increase in the latency until start of communication occurs due to increase in the latency from receipt of the paging to transmission of the PRACH.

The tenth embodiment will disclose a method for solving such a problem.

The uplink beam sweeping timing is set immediately subsequent to the downlink beam sweeping timing. An uplink beam sweeping block is configured immediately subsequent to a downlink beam sweeping block. The downlink beam sweeping timing may be a beam sweeping block in which the paging can be transmitted. Consequently, the latency for the UE from receipt of the paging to transmission of the PRACH can be reduced.

FIG. 37 illustrates a method for setting the uplink beam sweeping timing immediately subsequent to the downlink beam sweeping timing. Since FIG. 37 is similar to FIG. 24, the differences will be mainly described.

An eNB (cell) 4412 sets the uplink beam sweeping timing immediately subsequent to the downlink beam sweeping timing. The cell sets an uplink beam sweeping block 4403 immediately subsequent to a downlink beam sweeping block 4401. Information on the uplink beam sweeping block is included in all blocks of the downlink beam sweeping block to transmit the information. The downlink beam sweeping block immediately subsequent to which the uplink beam sweeping block is set may be a beam sweeping block in which the paging can be transmitted.

A DL/UL data subframe 4406 in which downlink data and uplink data are transmitted is interposed between the uplink beam sweeping block 4403 and the downlink beam sweeping block 4401.

Another example will be disclosed.

Figure 38:
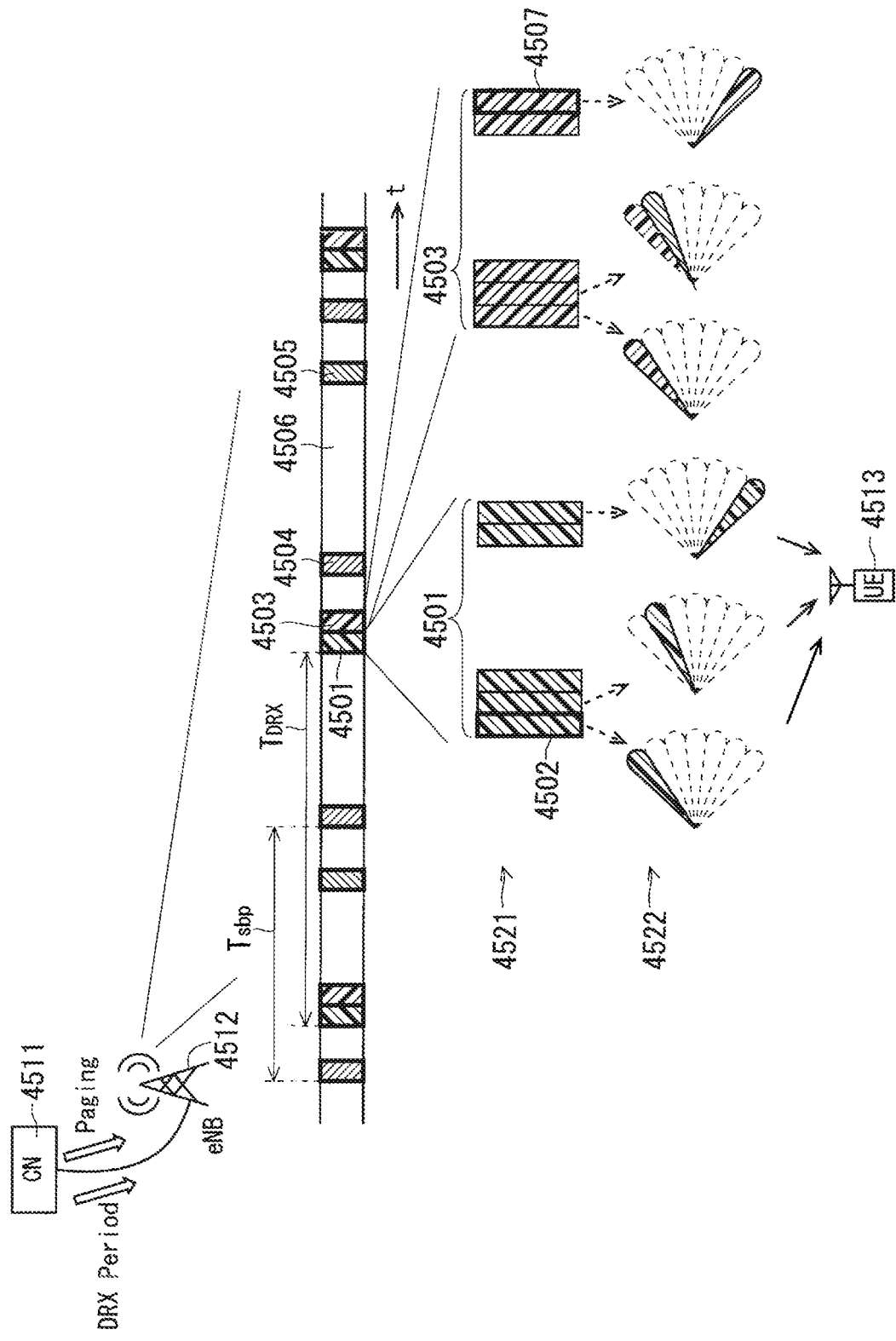
FIG. 38 illustrates a method for setting a beam sweeping timing for paging response immediately subsequent to the beam sweeping timing for paging.

FIG. 38 illustrates a method for setting a beam sweeping timing for paging response immediately subsequent to the beam sweeping timing for paging. Since FIG. 38 is similar to FIG. 28, the differences will be mainly described.

As denoted by a reference 4521, a beam sweeping block 4501 for paging includes a plurality of resources 4502. As denoted by the reference 4521, a beam sweeping block 4503 for paging response includes a plurality of resources 4507. Each of the resources 4502 and 4507 is transmitted via a beam denoted by a reference 4522.

An eNB (cell) 4512 sets the beam sweeping timing for paging response immediately subsequent to the beam sweeping timing for paging. The cell sets the beam sweeping block 4503 for paging response immediately subsequent to the beam sweeping block 4501 for paging. Information on the beam sweeping block for paging and information on the beam sweeping block for paging response are included in all blocks of the beam sweeping block for beam search to transmit the information. The information may include a time interval between the beam sweeping block for paging and the beam sweeping block for paging response.

The beam sweeping block for paging response may be used not only for responding to the paging but for the overall uplink access. The beam sweeping block for paging response may be used for, for example, uplink access in making a call from a UE 4513.

Although a conventional uplink beam sweeping block is provided besides the beam sweeping block for paging response in FIG. 38, only the beam sweeping block for paging response may be provided without the conventional uplink beam sweeping block. The overall uplink access may be performed using the beam sweeping block for paging response. Consequently, the resources required for the uplink beam sweeping block can be omitted, and the use efficiency of the resources can be increased.

In the method for setting the uplink beam sweeping timing immediately subsequent to the downlink beam sweeping timing, the UE that has received the paging with the downlink beam sweeping timing transmits the PRACH with the next uplink beam sweeping timing to start access to a network. Consequently, the latency for the UE from receipt of the paging to transmission of the PRACH can be reduced.

The UE that has recognized that it can receive the paging with the downlink beam sweeping timing need not receive a beam unit in the downlink beam sweeping block in which the paging has been received. At least one process of reception and transmission may be stopped until transmission of the PRACH with the beam timing corresponding to the received beam in the uplink beam sweeping block. This can reduce the power consumption of the UE.

Although the uplink beam sweeping timing is set immediately subsequent to the downlink beam sweeping timing, it may not be necessarily so. A predetermined duration may be delayed in the setting. The shorter the predetermined duration is, the more the latency for the UE from receipt of the paging to transmission of the PRACH can be reduced.

The same holds true for the method for setting the beam sweeping timing for paging response immediately subsequent to the beam sweeping timing for paging.

First Modification of Tenth Embodiment

The first modification will disclose another method for solving the problem disclosed in the tenth embodiment. Each beam in a beam sweeping block includes DL resources and an UL resource. Each beam in a beam sweeping block in which the paging can be transmitted may include the DL resources and the UL resource. These can increase the use efficiency of the resources. The cell performs DL transmission and UL reception via each of the beams. Each of the beams may be self-contained. The UE performs DL reception and transmits a response signal to the DL reception, via each of the beams. Each of the beams may include a self-contained subframe disclosed in the first embodiment. The self-contained subframe may be applied when the unit of resources used in each of the beams is a subframe.

The cell transmits the paging with the DL resource, and receives a response signal to the paging with the UL resource, via each of the beams in the beam sweeping block. Upon receipt of the paging with the DL resources of a certain beam, the UE transmits a response signal to the paging with the UL resource of the beam. Consequently, the UE can transmit the response signal to the paging in each of the beam sweeping blocks. Consequently, the latency for the UE from receipt of the paging to transmission of the response signal to the paging can be reduced.

Figure 39:
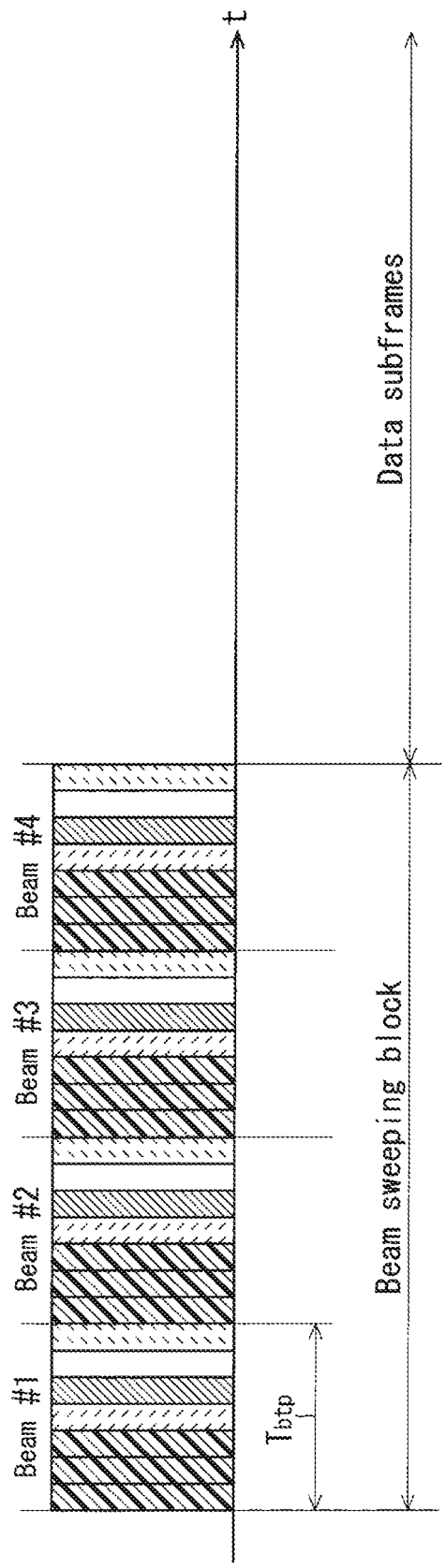
FIG. 39 illustrates example resources when each beam in the beam sweeping block is self-contained.

FIG. 39 illustrates example resources when each beam in the beam sweeping block is self-contained. Since FIG. 39 is similar to FIG. 26, the differences will be mainly described.

Each beam in the beam sweeping block includes DL resources and an UL resource. The UL resource follows the DL resources, and a gap duration is provided between the DL resources and the UL resource. The paging is mapped to each of the DL resources of the beams. The PCCHs including the paging information may be mapped to the DL resources. The response signal to the paging is mapped to the UL resource in the same beam to which the paging is mapped.

In FIG. 39, the first to fifth symbols in each of the beam units are configured as DL resources, the sixth symbol is configured as a gap, and the seventh symbol is configured as an UL resource. In each of the beam units, the paging is mapped to the fifth symbol, and a response to the paging is mapped to the seventh symbol.

The method disclosed in the first modification eliminates the need for the UE to wait for the end of the downlink beam sweeping block and transmit the response signal to the paging in the uplink beam sweeping block. The UE can transmit the response signal to the paging via the same beam as the beam via which the paging has been transmitted. Consequently, the latency for the UE from receipt of the paging to transmission of the response signal to the paging can be reduced more than that in the method disclosed in the tenth embodiment.

The UE that has received the paging with the downlink beam sweeping timing need not receive a beam unit in the downlink beam sweeping block in which the paging has been received. This can reduce the power consumption of the UE.

Each beam only in a beam sweeping block in which the paging can be transmitted may be self-contained as a beam sweeping block. Alternatively, each beam only in a beam sweeping block for paging may be self-contained. Consequently, each beam unit duration of the beam sweeping block that is not used for the paging, and also the beam sweeping block duration can be shortened.

Second Modification of Tenth Embodiment

The second modification will disclose another method for solving the problem disclosed in the tenth embodiment. Each of the subframes subsequent to the beam sweeping block includes DL resources and an UL resource. In other words, the cell performs DL transmission and UL reception in the subframe. The subframe may be self-contained. The UE performs DL reception and transmits a response signal to the DL reception, in the subframe. The cell transmits the paging with the DL resource, and receives the response signal to the paging with the UL resource. Upon receipt of the paging with the DL resource, the UE transmits the response signal to the paging with the UL resource.

The first modification of the eighth embodiment may be applied to a method for transmitting the paging in a beam sweeping block and in subframes subsequent to the beam sweeping block.

The cell maps the PCCH to the resource subsequent to the beam sweeping block in which the information indicating the presence of the paging has been transmitted, to transmit the PCCH. The resource to which the PCCH is mapped forms a subframe, and the subframe includes the DL resources and the UL resource.

The UE transmits a response signal to the PCCH with the UL resource included in the subframe to which the PCCH is mapped.

Consequently, the UE can transmit the response signal to the PCCH, in the subframe in which the PCCH has been received. Thus, the latency for the UE from receipt of the paging to transmission of the response signal to the paging can be reduced.

Figure 40:
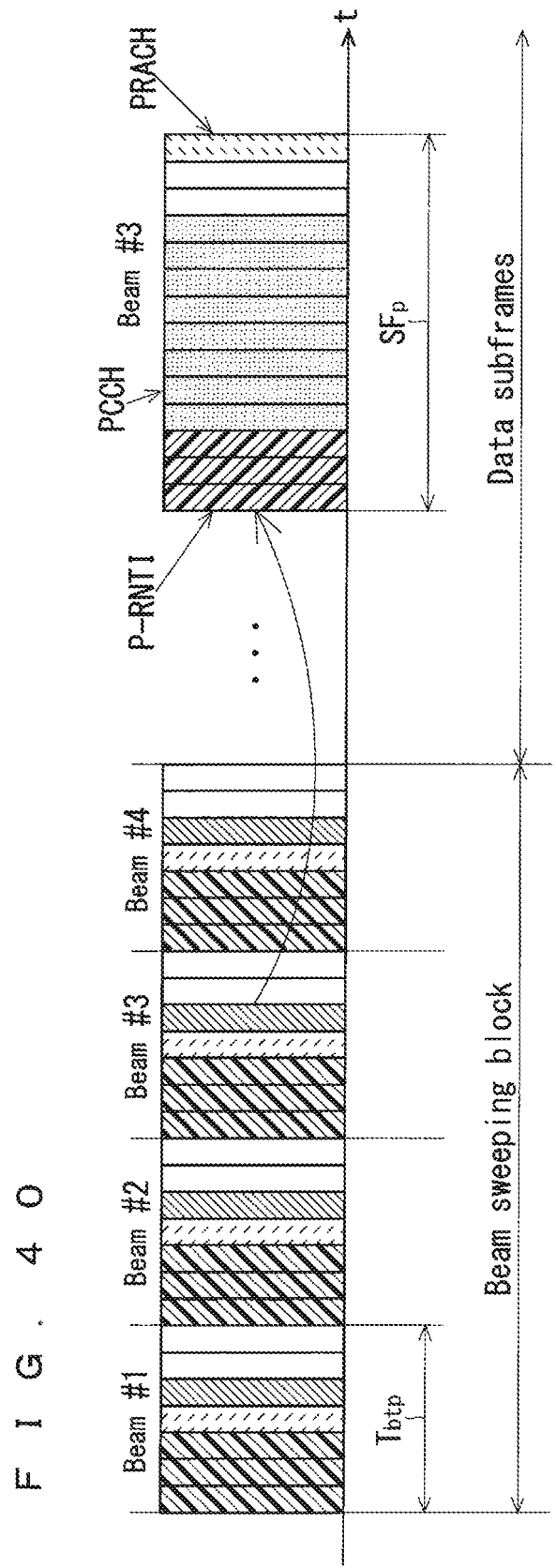
FIG. 40 illustrates an example method for transmitting a response signal to the PCCHs, in a subframe to which the PCCHs are mapped.

FIG. 40 illustrates an example method for transmitting the response signal to the PCCHs, in a subframe to which PCCHs are mapped. Since FIG. 40 is similar to FIG. 35, the differences will be mainly described. In FIG. 40, a reference $SF_p$ denotes a duration for transmitting each of the beams.

Application of the first modification of the eighth embodiment is disclosed herein. The cell transmits information indicating the presence of the paging via all the beams in the beam sweeping block. The cell maps the scheduling information of the PCCHs and the PCCHs to the data subframes subsequent to the beam sweeping block in which the information indicating the presence of the paging has been transmitted, and transmits the scheduling information of the PCCHs and the PCCHs. The subframes to which the scheduling information of the PCCHs and the PCCHs are mapped include the DL resources and the UL resource. The UL resource follows the DL resources, and a gap duration is provided between the DL resources and the UL resource.

In FIG. 40, the first to eleventh symbols in the subframe to which the scheduling information of the PCCHs and the PCCHs are mapped are configured as DL resources, the twelfth and thirteenth symbols are configured as a gap, and the fourteenth symbol is configured as an UL resource. L1/L2 control information is mapped to the first to third symbols, and a downlink common channel is mapped to each of the fourth to eleventh symbols. An uplink signal and an uplink channel are mapped to the fourteenth symbol.

The L1/L2 control information of the DL resources includes the scheduling information of the PCCHs, and the downlink common channel includes the PCCH. The response signal to the PCCHs is mapped to the UL resource. When the UE receives the PCCHs with the DL resources in the subframe and recognizes the existence of the UE identifier of its own UE in the PCCHs, it maps the response signal to the paging, to the UL resource to transmit the response signal. The response signal to the paging may be a PRACH. The UE transmits the PRACH with the UL resource of the subframe.

When the UL resource in 1 subframe is insufficient for mapping the response signal to the paging, the response signal may be transmitted using the following one or more subframes. The consecutive subframes may be used. For example, when a two-consecutive-subframe structure is used, DL resources, a gap, and an UL resource may be mapped to the first subframe, and another UL resource may be mapped to the second subframe. The scheduling information of the PCCHs and the PCCHs are mapped to the DL resources in the first subframe to transmit the scheduling information of the PCCHs and the PCCHs, whereas the response signal to the paging is mapped to each of the UL resources in the first and second subframes to transmit the response signal.

Even when the UL resource in a subframe to which the PCCH is mapped is insufficient for mapping the response signal to the paging, the response signal can be transmitted using the next subframe.

Information on how many subframes subsequent to the first subframe are used for the UL resources may be provided. Information on which resource in the UL resource is used as a response signal to the paging may also be provided. This is effective when the UL resource is used for another signal or channel. The information representing resources in the time axis direction may be per symbol, per slot, or per subframe, and the information representing resources in the frequency axis direction may be per sub-carrier. Alternatively, the information representing resources may be per predetermined resource block.

The information on which resource is used as a response signal to the paging may be set to each cell or to each UE. The cell may determine the information. Alternatively, the CN may determine the information and notify it to the eNBs being served thereby.

The cell notifies the UE of the information. When the information is determined for each cell, it may be broadcast as broadcast information or notified as information common to cells using the RRC signaling. When the information is set to each UE, it may be notified using the RRC-dedicated signaling. The information can be set when the UE is in an RRC connected state.

When the information is set to each UE, it may be notified using the MAC signaling. Alternatively, the information may be included in the L1/L2 control information to notify the information. Alternatively, the information may be included in the scheduling information of the PCCHs in the L1/L2 control information to notify the information.

Upon receipt of the information from the cell, the UE can recognize which subframe and which symbol become the UL resource, and to which subframe and to which symbol the response signal to the paging is mapped.

Thus, the UE can transmit the response signal to the PCCHs, in the subframe in which the PCCHs have been received or the subsequent subframes thereof.

The method disclosed in the second modification eliminates the need for the UE to wait for the end of the downlink beam sweeping block and transmit the response signal to the paging in the uplink beam sweeping block. The UE can transmit the response signal to the paging via the same beam as the beam via which the paging has been transmitted. Consequently, the latency for the UE from receipt of the paging to transmission of the response signal to the paging can be reduced more than that in the method disclosed in the tenth embodiment.

Upon receipt of the information indicating the presence of the paging with the downlink beam sweeping timing, the UE need not receive the downlink beam sweeping block in which the information indicating the presence of the paging has been received. This can reduce the power consumption of the UE.

Eleventh Embodiment

The eleventh embodiment will disclose another method for solving the problems disclosed in the fourth embodiment. A cell requiring the beam sweeping is configurable only as a SCell for carrier aggregation (CA). Assuming the cell requiring the beam sweeping as a SCell, a cell sets CA to the UE. A PCell transmits the paging to the UE. The UE receives the paging from the PCell. The paging timing may be derived using a UE identifier. The DRX period may be set by the CN, and the radio frame and the subframe in which the paging is to be transmitted may be derived from the UE identifier and the parameter nB set by the cell, as conventionally.

Consequently, the cell requiring the beam sweeping need not transmit the paging to the UE. The UE need not receive the paging from the cell requiring the beam sweeping, but can receive the paging from the PCell and communicate with the CN. Thus, there is no need to provide a configuration enabling transmission of the paging in a beam sweeping block, which can avoid increase in complexity of the system.

First Modification of Eleventh Embodiment

The first modification will disclose another method for solving the problems disclosed in the fourth embodiment. The cell requiring the beam sweeping is configurable only as a cell of a SeNB with dual connectivity (abbreviated as DC). The cell may be configured only as a cell in a SeNB Cell Group (SCG). Assuming an eNB having the cell requiring the beam sweeping as a SeNB, a MeNB sets DC to the UE. The MeNB transmits the paging to the UE. The UE receives the paging from the MeNB. The paging timing may be derived using a UE identifier. The DRX period may be set by the CN, and the radio frame and the subframe in which the paging is to be transmitted may be derived from the UE identifier, as conventionally.

Consequently, the cell requiring the beam sweeping need not transmit the paging to the UE. The UE need not receive the paging from the cell requiring the beam sweeping, but can receive the paging from the MeNB and communicate with the CN. Thus, there is no need to provide a configuration enabling transmission of the paging in a beam sweeping block, which can avoid increase in complexity of the system.

What is previously disclosed is that the MeNB transmits the paging to the UE and the UE receives the paging from the MeNB. As an alternative method, the SeNB may configure the cell requiring the beam sweeping only as a SCell for CA. The eleventh embodiment may be applied to the SeNB. The PCell of the SeNB may transmit the paging to the UE. The UE receives the paging from the PCell of the SeNB.)

Consequently, the cell requiring the beam sweeping need not transmit the paging to the UE. The UE need not receive the paging from the cell requiring the beam sweeping, but can receive the paging from the SeNB.

Although the DC is previously disclosed, the multi-connectivity (abbreviated as MC) may replace the DC. The cell requiring the beam sweeping is configurable only as a cell that does not transmit the paging of the MC. Consequently, the cell requiring the beam sweeping need not transmit the paging to the UE. The UE need not receive the paging from the cell requiring the beam sweeping, but can receive the paging from the other cells configuring the MC.

Twelfth Embodiment

The twelfth embodiment will disclose another method for solving the problems disclosed in the first embodiment. The cell transmits the paging via beams with a wide coverage. The beams with a wide coverage may be beams covering the entire coverage necessary for a cell.

The received power in the coverage through the beams with a wide coverage decreases more than that in sweeping beams with a narrow coverage. Thus, when the cell transmits the paging via the beams with a wide coverage, the received power of the paging in the UE decreases.

To compensate for the decrease, the cell may repeatedly transmit the paging. Reception of the paging repeatedly transmitted enables the UE to increase the received power of the paging and receive and demodulate the paging.

Information on the repeated transmission of the paging may be provided to enable the repeated transmission of the paging. The following (1) to (3) will be disclosed as specific examples of the information on the repeated transmission of the paging:

(1) the number of repetitions;
(2) a repeated transmission pattern; and
(3) a combination of (1) and (2) above.

The information on the repeated transmission of the paging may be statically determined or predetermined in, for example, a standard. Consequently, both nodes of the cell and the UE can recognize the same number of repetitions and the same repeated transmission pattern, and perform processes of transmitting and receiving the paging without any error.

Alternatively, the information on the repeated transmission of the paging may be semi-statically determined. For example, the cell may include, in the broadcast information, the information on the repeated transmission of the paging to broadcast the information. Upon receipt of the broadcast information, the UE can recognize the number of repetitions and the repeated transmission pattern. The reception error rate of the paging can be further reduced because the cell can be modified according to, for example, a required coverage and a radio propagation situation.

For example, information indicating being temporally continuous or being periodical may be included as information on the repeated transmission pattern of the paging. If the pattern is periodical, the periodical information may be included.

The UE can receive the paging repeatedly transmitted upon receipt of the information on the repeated transmission of the paging.

The UE need not receive the entirety of the paging repeatedly transmitted. After reception and demodulation of the paging are possible and information included in the PCCH has been obtained, reception of the paging to be repeatedly transmitted may be omitted. This can reduce the power consumption of the UE.

The cell transmits the paging via beams with a wide coverage with the paging timing derived using the UE-ID and the DRX period as conventionally performed. The paging may be repeatedly transmitted from the first paging timing as the paging timing derived using the UE-ID and the DRX period. The paging may be repeatedly transmitted via the beams with a wide coverage.

The cell transmits the beams with a wide coverage and beams with a narrow coverage. The beams may be transmitted with different timings or with the same timing. The resource to be transmitted via a beam with a wide coverage may be made different from the resource to be transmitted a beam with a narrow coverage. Examples of the unit of the resources on the time axis include per symbol, per slot, per subframe, and per TTI. Examples of the unit of the resources on the frequency axis include per sub-carrier. The unit of the resources on both the time axis and the frequency axis in combination may be per predetermined resource.

These can avoid the interference in simultaneous transmission via the beams with a wide coverage and the beams with a narrow coverage. When the paging timing with the beams with a wide coverage overlaps the beam sweeping timing, the interference in simultaneous transmission via the beams with a wide coverage and the beams with a narrow coverage can be avoided.

Thus, wherever the UE in an idle state is in the cell coverage, the cell can transmit the paging to the UE via the beams with a wide coverage. Wherever being in the cell coverage, the UE in an idle state can receive the beams with a wide coverage and also the paging transmitted via the beams with a wide coverage.

The method disclosed in the twelfth embodiment eliminates the need for the cell to transmit the paging in a beam sweeping block. Thus, there is no need to provide a configuration enabling transmission of the paging in the beam sweeping block, which can avoid increase in complexity of the system.

In the disclosed method, the cell repeatedly transmits the paging to compensate for decrease in the received power of the paging in the UE when transmitting the paging via the beams with a wide coverage.

The cell may increase the transmission power of the paging as an alternative method. The transmission power of the resources to be used for transmitting the paging may be increased. This can compensate for decrease in the received power of the paging in the UE.

The cell may increase the transmission power of the paging by changing at least one of the modulating method or the coding method to be used for the paging. The cell may increase the transmission power of the paging by changing at least one of the number of bits or the radio resource to be used for the paging. The transmission power of the resources to be used for transmitting the paging may be increased in such a method. This can compensate for decrease in the received power of the paging in the UE.

The paging method disclosed according to the present invention may differ for each UE or for each UE group. The paging method may differ depending on the UE capability, for example, the demodulation performance to the received power, the presence or absence of the repeated reception capability, etc. The paging method may also differ for each UE category.

The paging method disclosed according to the present invention may differ for each communication service type. The paging method may differ depending on the service type, for example, whether a service has a long allowable latency. For example, the method for repeatedly transmitting the paging via the beams with a wide coverage is applied to a service having a long allowable latency, whereas the method for transmitting the paging through the beam sweeping is applied to a service having a short allowable latency. Upon receipt of an incoming call, the latency until start of communication can be optimized according to the allowable latency.

The paging method disclosed according to the present invention may vary according to various conditions. Consequently, the paging method suitable for each of these conditions can be used.

Each of the methods for transmitting the paging disclosed in the fourth to twelfth embodiments according to the present invention may be applied as the method for transmitting the paging to the UE being RRC connected. The cell that applies the beam sweeping can transmit the paging to the UE being RRC connected, whereas the UE being RRC connected can receive the paging.

The method for transmitting the paging to the UE being RRC connected may be different from the method for transmitting the paging to the UE being in RRC_IDLE. For example, the method disclosed in the twelfth embodiment is used as the method for transmitting the paging to the UE being RRC connected, whereas the methods for transmitting the paging in the beam sweeping block that are disclosed in the fourth and fifth embodiments are used as the method for transmitting the paging to the UE being in RRC_IDLE.

The UE being RRC connected may also need to receive the paging. For example, the paging is used to notify change in the System Information (SI) and also the PWS under the LTE. Thus, the UE being RRC connected needs to receive the paging. Each of the methods for transmitting the paging that are disclosed in the fourth to twelfth embodiments according to the present invention may be applied as the method for transmitting the paging to the UE being RRC connected. Consequently, the cell can transmit the paging to the UE being RRC connected, whereas the UE being RRC connected can receive the paging.

The cell recognizes the beam area where the UE exists being RRC connected. The method by which the cell recognizes the beam area where the UE exists may be omitted in the method disclosed in the ninth embodiment. Thus, the method for transmitting the paging can be simplified. Malfunctions as a system and also the power consumption of the cell and the UE can be reduced.

The method for transmitting the paging to the UE being RRC connected may be different from or identical to the method for transmitting the paging to the UE being in RRC_IDLE. For example, the method disclosed in the ninth embodiment is applied to the method for transmitting the paging to the UE being RRC connected, whereas the method for transmitting the paging in the beam sweeping block that is disclosed in the fifth embodiment is applied to the method for transmitting the paging to the UE being in RRC_IDLE.

When the method for transmitting the paging to the UE being RRC connected is identical to the method for transmitting the paging to the UE being in RRC_IDLE, both of the cell and the UE can use one processing method as the method for transmitting the paging, irrespective of a state of the UE. Thus, control in the cell and the UE can be simplified. Increase in complexity of the system can be avoided, and malfunctions can be reduced.

When the method for transmitting the paging to the UE being RRC connected differs from the method for transmitting the paging to the UE being in RRC_IDLE, the method for transmitting the paging according to, for example, a state of the UE, an allowable load of the cell, or an allowable latency amount can be used. Thus, the use efficiency of the radio resources as well as the transmission capacity and the transmission rate can be increased.

Which method for transmitting the paging is used may be statically predetermined in, for example, a standard. Alternatively, the method for transmitting the paging to the UE being in RRC_IDLE may be determined in, for example, a standard, whereas the cell may notify the UE of the method for transmitting the paging to the UE being RRC connected. Alternatively, the method may be broadcast as the broadcast information. Alternatively, the method may be notified using the RRC-dedicated signaling. Since the cell can semi-statically notify the method for transmitting the paging to the UE being RRC connected, a better method for transmitting the paging can be set according to a radio propagation environment and a load state of the cell.

The UE may hold information on transmission of the paging that is notified from the cell while being RRC connected, even after shifting to the RRC_IDLE state. The information may be used for transmitting the paging after the UE shifts to the RRC_IDLE state. Consequently, the information on transmission of the paging can be set to each UE, and the information set to each UE can be used to transmit the paging after the UE shifts to the RRC_IDLE state.

The information on transmission of the paging that is notified from the cell during the RRC connection may be effective when the cell is a serving cell. The information may be reset when the UE moves to another cell. Alternatively, when the UE is again RRC connected and is newly notified of information on transmission of the paging from the cell, the information may be changed to the new information.

Thirteenth Embodiment

Under the LTE, the slots and the symbols in which two synchronization signals of the P-SS and the S-SS are to be transmitted are the same, that is, fixed in any cell. In the FDD, for example, each of the P-SS and the S-SS is transmitted in the slots #1 and #11. The P-SS is transmitted in the last symbol of the slot, and the S-SS is transmitted in a symbol immediately preceding that of the P-SS. In the TDD, the P-SS is transmitted in the slots #3 and #13, and the S-SS is transmitted in the slots #2 and #12.

The P-SS is transmitted in the third symbol of the slot, and the S-SS is transmitted in the third preceding symbol from the P-SS. A signal with the same sequence in each of the slots is used for the P-SS, whereas signals with two different sequences are used for the S-SS. One of the signals with a sequence is used in the first slot of a subframe, and the other signal with a different sequence is used in the second slot of the subframe. The signals with two different sequences in each subframe are used for the S-SS. These sequences are predetermined in the 3GPP standard.

Since such two synchronization signals are preset as a system, the UE can recognize the slot timing upon receipt of the P-SS, and the slot number and the subframe timing upon receipt of the S-SS. Recognizing the slot number upon receipt of the S-SS enables recognition of the subframe number. Deriving a timing difference between the P-SS and the S-SS enables derivation of the cyclic prefix (CP) length being used.

The slot number and the subframe number are used to set the radio resources using various control messages to be notified from the cell to the UE, for example, the RRC signaling. Thus, the UE can recognize with which timing the slot number and the subframe number used in the various control messages are transmitted by receiving the two synchronization signals and deriving the slot number and the subframe number.

However, as disclosed in the fourth embodiment, the SSs transmitted via each of the beams are transmitted in different slots or in different symbols with application of the beam sweeping.

Figure 41:
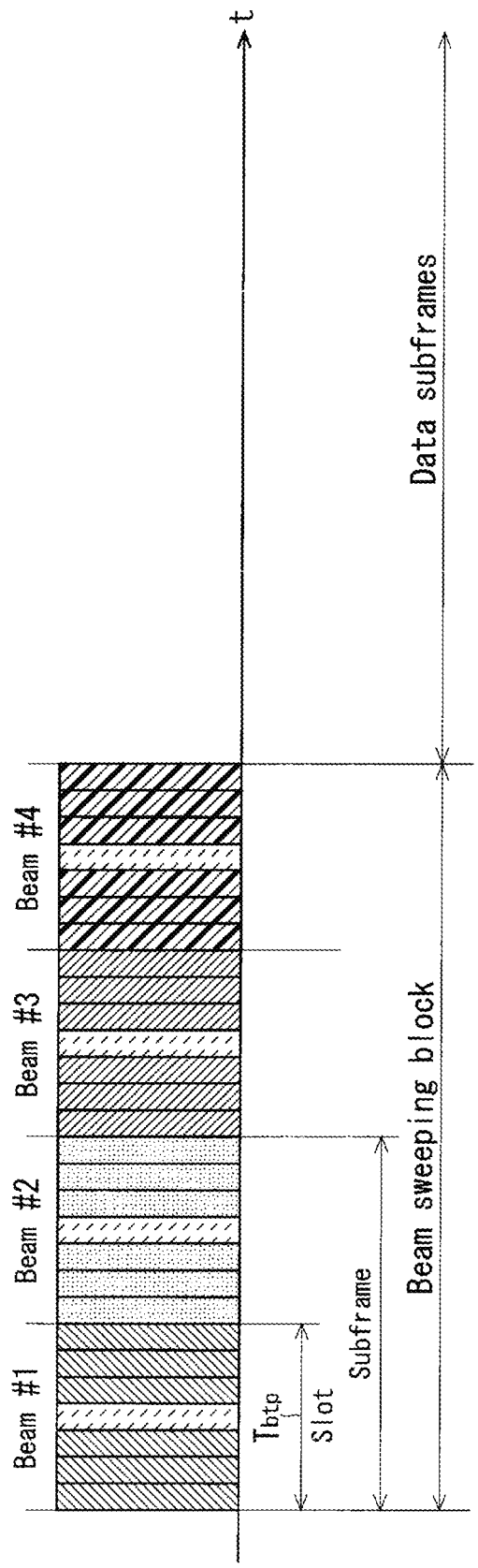
FIG. 41 illustrates an example where one SS is transmitted via all beams in the beam sweeping block.

FIG. 41 illustrates an example where one SS is transmitted via all beams in a beam sweeping block. FIG. 41 illustrates that the transmission duration of each of the beams in the beam sweeping block consists of 7 symbols. FIG. 41 also illustrates that 1 slot consists of 7 symbols. The SS is mapped to the fourth symbol of the slot. In such a case, although the symbol number in which the SS is mapped is consistent among the beams, the slot number is different in each of the beams.

Thus, although the UE can recognize the slot timing upon receipt of the SS, the UE has a problem with incapability to recognize not only the slot number but also the subframe number.

The thirteenth embodiment will disclose a method for solving such a problem.

Two synchronization signals are transmitted for each of the beams in the beam sweeping block. Here, the two synchronization signals will be referred to as an SS1 and an SS2. In which symbol of a slot or a subframe each of the SS1 and an SS2 is transmitted is predetermined. A signal with a different sequence is used for each slot number as the SS1. A signal with a different sequence is used for each subframe number as the SS2.

Figure 42:
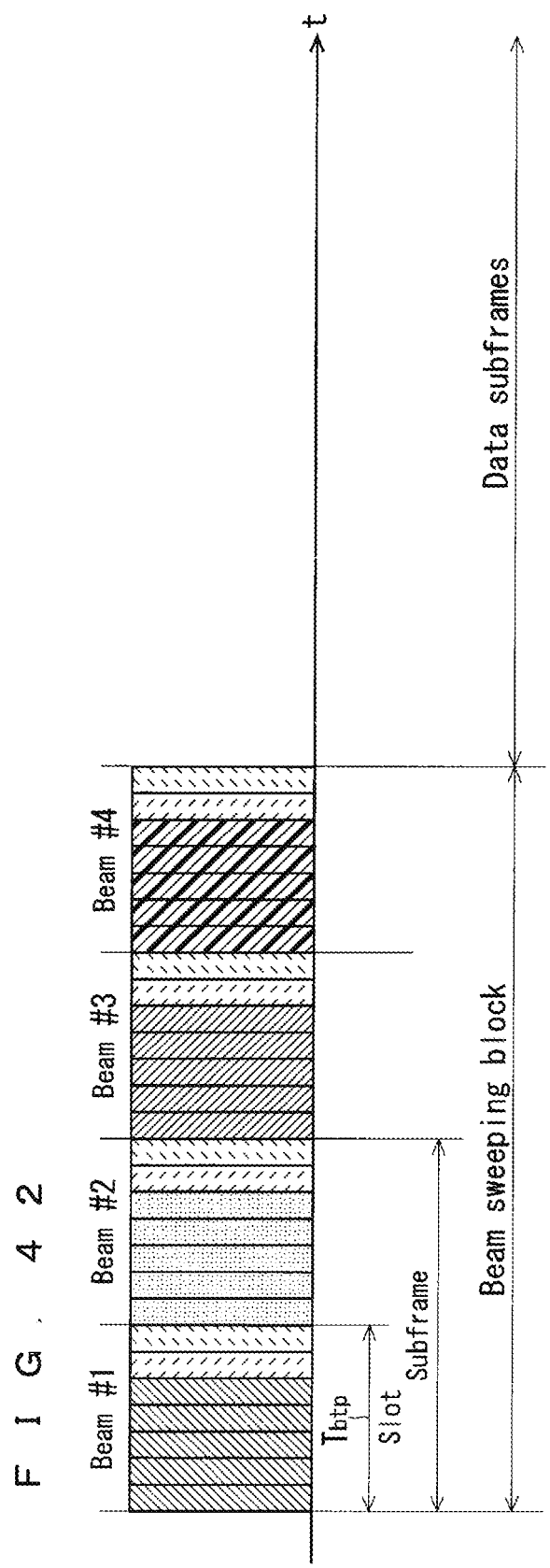
FIG. 42 illustrates an example where two synchronization signals are transmitted for each of the beams in the beam sweeping block.

FIG. 42 illustrates an example where the two synchronization signals are transmitted for each of the beams in the beam sweeping block. FIG. 42 illustrates that the transmission duration of each of the beams in the beam sweeping block consists of 7 symbols. FIG. 42 also illustrates that 1 slot consists of 7 symbols. The SS1 is transmitted in the sixth symbol of the slot. The SS2 is transmitted in the seventh symbol of the slot.

Figure 43:
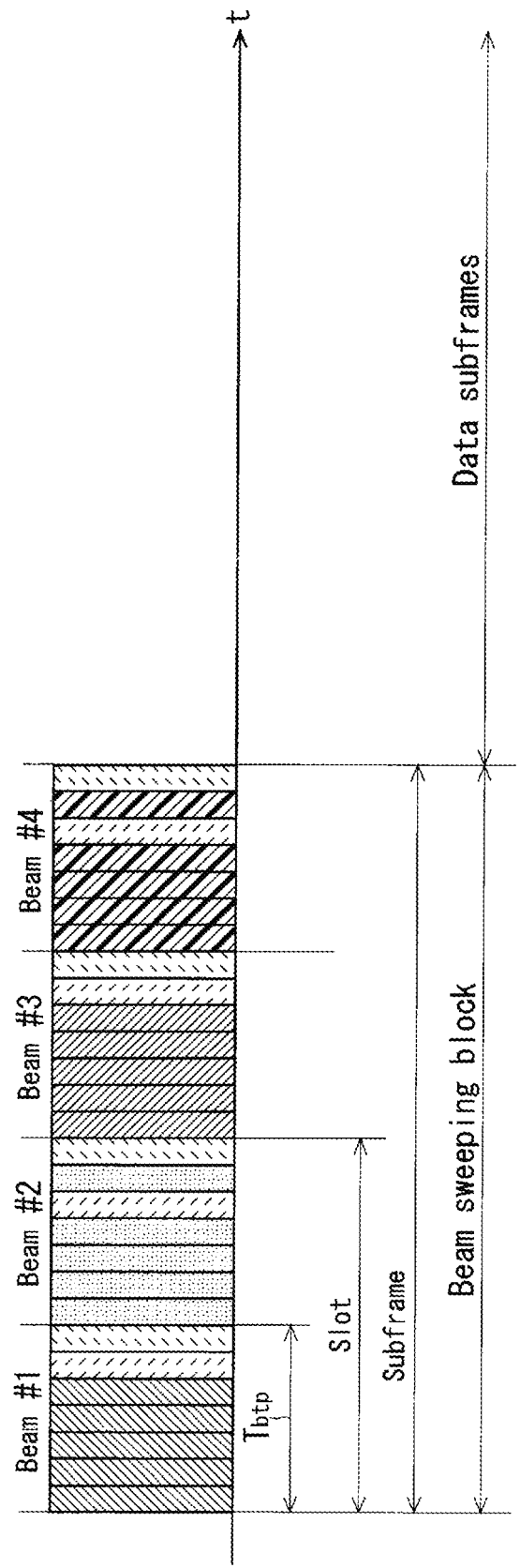
FIG. 43 illustrates another example where two synchronization signals are transmitted for each of the beams in the beam sweeping block.

FIG. 43 illustrates another example where the two synchronization signals are transmitted for each of the beams in the beam sweeping block. FIG. 43 illustrates that the transmission duration of each of the beams in the beam sweeping block consists of 7 symbols. FIG. 43 also illustrates that 1 slot consists of 14 symbols. The SS1 is transmitted in the sixth and twelfth symbols of the slot. The SS2 is transmitted in the seventh and fourteenth symbols of the slot. The interval between the symbols in which the two SSs are transmitted may be different for each of the beams. Alternatively, the interval between the symbols in which the two SSs are transmitted may be different, within one slot, from another interval between the symbols in which the two SSs are transmitted.

Upon receipt of the SS1 of the beam transmitted in the beam area where its own UE exists, the UE can recognize the slot number in which the beam is transmitted. Similarly, upon receipt of the SS2, the UE can recognize the subframe number in which the beam is transmitted. The UE can also recognize, from the interval between the SS1 and the SS2, whether the SS1 and the SS2 are transmitted in the sixth and seventh symbols or in the twelfth and fourteenth symbols.

Thus, the UE that has received the SS1 and the SS2 can recognize the slot timing, the slot number, and the subframe number.

Thus, the UE can recognize with which timing the slot number and the subframe number used in the various control messages are transmitted by receiving the two synchronization signals and deriving the slot number and the subframe number.

When a relationship between subframes and slots is predetermined, signals with different sequences the number of which corresponds to the number of slots in one subframe may be used as the SS1. For example, when 1 subframe consists of 2 slots as in the LTE, the signals with two different sequences may be used as the SS1. One of the signals with a sequence is used in the first slot of a subframe, and the other signal with a different sequence is used in the second slot of the subframe. Similarly, the signals with two different sequences in each of the subframes are used for the SS1. Consequently, the number of sequences used for the SS1 can be reduced.

Here, the two synchronization signals of the SS1 and the SS2 are used as synchronization signals for each of the beams. Predetermining the interval between the symbols in which the SS1 and the SS2 are transmitted enables the UE to derive the CP length. Thus, a plurality of CP lengths can be used as a system. Cells with different coverage areas can be operated as a system.

Another method for solving the problem disclosed in the thirteenth embodiment will be disclosed. One synchronization signal is transmitted for each beam in a beam sweeping block. Here, the signal will be the SS1. In which symbol of a slot or a subframe the SS1 is transmitted is predetermined. A signal with a different sequence is used for each slot number as the SS1. The number of slots in a subframe is predetermined.

Figure 44:
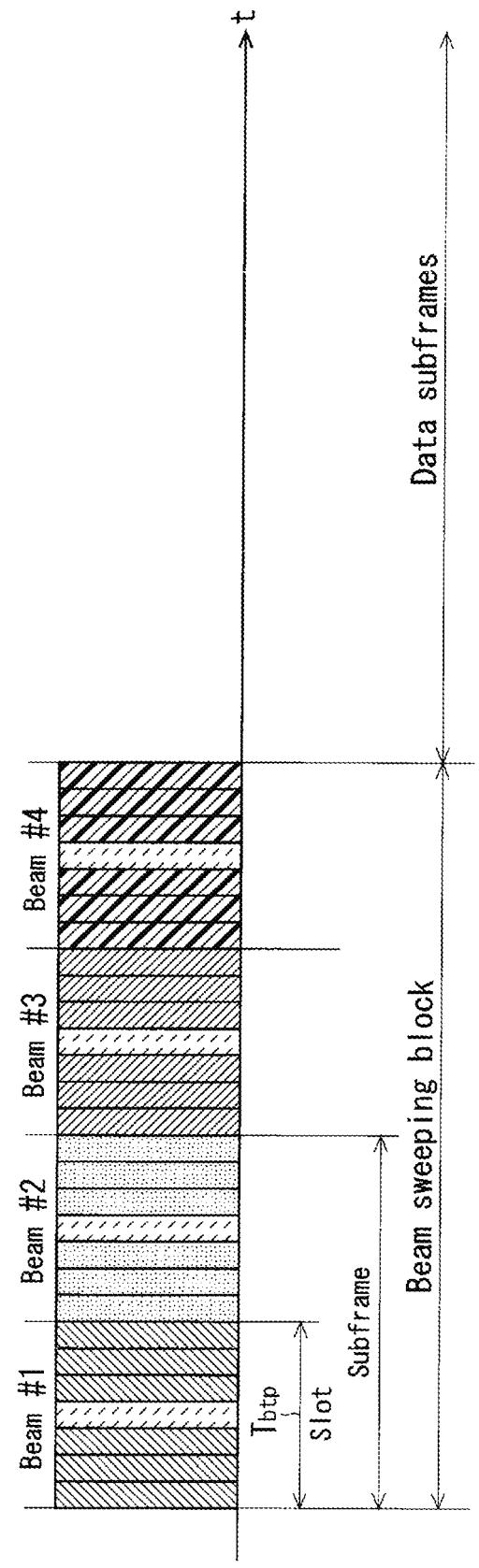
FIG. 44 illustrates an example where one synchronization signal is transmitted for each of the beams in the beam sweeping block.

FIG. 44 illustrates an example where one synchronization signal is transmitted for each of the beams in the beam sweeping block. Since FIG. 44 is similar to FIG. 41, the differences will be mainly described. The SS1 is transmitted in the fourth symbol of the slot.

The previous method shows that signals with different sequences the number of which corresponds to the number of slots in one subframe may be used as the SS1 when the relationship between subframes and slots is predetermined. Here, the SS to be transmitted for each beam is the one signal SS1 with the different sequence for each slot number. Thus, different sequences the number of which corresponds to the number of the slot number are necessary.

Upon receipt of the SS1 of the beam transmitted in the beam area where its own UE exists, the UE can recognize the slot number in which the beam is transmitted. The UE that has recognized the slot number derives the subframe number from the slot number using the predetermined number of slots in a subframe.

Thus, the UE that has received the SS1 can recognize the slot timing, the slot number, and the subframe number.

Thus, the UE can recognize with which timing the slot number and the subframe number used in the various control messages are transmitted by receiving the one synchronization signal and deriving the slot number and the subframe number.

The UE has only to receive the one SS, in comparison with the method using signals with different sequences the number of which corresponds to the number of slots in one subframe. Thus, the synchronizing time can be shortened. The one SS has only to be transmitted via each beam. Thus, the number of symbols necessary for the SSs can be reduced. The resources of each beam can be used for another signal or channel. Alternatively, the amount of resources per beam, that is, the number of symbols herein can be reduced.

Thus, the radio resources can be efficiently used, and the transmission capacity and the transmission rate can be increased. Shortening the reception duration for sweeping beams can reduce the latency.

Since only one SS is transmitted per beam, the CP length cannot be identified. Thus, this method may be applied in the presence of one CP length.

First Modification of Thirteenth Embodiment

When a frame structure consists of radio frames, subframes, slots, and symbols, a method for deriving, for example, each of the timings and the subframe number will be disclosed herein.

A synchronization signal is mapped per symbol. Here, the synchronization signal is mapped to one symbol.

The following four synchronization signals of (1) to (4) are transmitted via each of the beams in the beam sweeping block:

(1) an SS for deriving the symbol number, which is the SS1 herein;
(2) an SS for deriving the slot number, which is the SS2 herein;
(3) an SS for deriving the subframe number, which is the SS3 herein; and
(4) an SS for deriving the radio frame number, which is the SS4 herein.

Signals with different sequences the number of which corresponds to the number of symbols in one slot may be used as the SS1. Signals with different sequences the number of which corresponds to the number of slots in one subframe may be used as the SS2. Signals with different sequences the number of which corresponds to the number of subframes in one radio frame may be used as the SS3. Signals with different sequences the number of which corresponds to the number of a system frame number may be used as the SS4.

Consequently, upon receipt of the SS1, the SS2, the SS3, and the SS4, the UE can recognize the symbol number, the slot number, the subframe number, and the radio frame number. The UE can also recognize the symbol timing, the slot timing, the subframe timing, and the radio frame timing. Thus, upon receipt of the four synchronization signals from the SS1 to the SS4 and deriving these timings and numbers, for example, the subframe number used in various control messages enables the UE to recognize with which timing transmission is performed.

The SSs for deriving the radio frame number, the subframe number, the slot number, and the symbol number used in the frame structure are provided in the previous method.

The number information may be included in the broadcast information to broadcast the information via each of the beams, instead of providing the SSs. Alternatively, the number information may be included in a PBCH to broadcast the information.

For example, the radio frame number is included in the PBCH to be broadcast via each of the beams. Here, each of the beams includes the three SSs of the SS1 to the SS3 to be transmitted. The aforementioned method may be applied as the sequence used for the SSs.

Consequently, upon receipt of the PBCH, the SS1, the SS2, and the SS3, the UE can recognize the symbol number, the slot number, the subframe number, and the radio frame number. The UE can also recognize the symbol timing, the slot timing, the subframe timing, and the radio frame timing. Thus, upon receipt of the PBCH and the three synchronization signals of the SS1 to the SS3 and deriving these timings and numbers, for example, the subframe number used in various control messages enables the UE to recognize with which timing transmission is performed.

Similarly, for example, the radio frame number and the subframe number may be included in the PBCH to be broadcast via each of the beams. Here, each of the beams includes the two SSs of the SS1 and the SS2 to be transmitted. The aforementioned method is applied as the sequence used for the SSs.

Consequently, upon receipt of the PBCH, the SS1 and the SS2, the UE can recognize the symbol number, the slot number, the subframe number, and the radio frame number. The UE can also recognize the symbol timing, the slot timing, the subframe timing, and the radio frame timing. Thus, upon receipt of the PBCH and the two synchronization signals of the SS1 and the SS2 and deriving these timings and numbers, for example, the subframe number used in various control messages enables the UE to recognize with which timing transmission is performed.

The SSs for deriving the radio frame number, the subframe number, the slot number, and the symbol number used in the frame structure are provided in the previous method. Alternatively, the number information is included in the broadcast information to broadcast the information via each of the beams, instead of providing the SSs.

As an alternative method, each of the numbers may be fixed instead of these. Each of the numbers may be predetermined in, for example, a standard.

For example, the radio frame number is included in the PBCH to be broadcast via each of the beams. Each of the beams includes the two SSs of the SS2 and the SS3 to be transmitted. The symbol number in which the SS is transmitted is predetermined. The aforementioned method is applied as the sequence used for the SSs.

Consequently, upon receipt of the PBCH, the SS2, and the SS3, the UE can recognize the symbol number, the slot number, the subframe number, and the radio frame number. The UE can also recognize the symbol timing, the slot timing, the subframe timing, and the radio frame timing. Thus, upon receipt of the PBCH and the two synchronization signals of the SS2 and the SS3 and deriving these timings and numbers, for example, the subframe number used in various control messages enables the UE to recognize with which timing transmission is performed.

When parameters such as slots and subframes increase, the number of SSs may be increased accordingly. Alternatively, when the parameters such as slots and subframes decrease, the number of SSs may be reduced accordingly. Since the optimal number of SSs can be appropriately set according to the number of parameters, the use efficiency of the radio resources can be increased. The UE need not receive any useless SS, and the processing latency in the UE can be reduced. This can reduce the power consumption of the UE.

Second Modification of Thirteenth Embodiment

The thirteenth embodiment discloses the example where the transmission duration of each of the beams in the beam sweeping block is 1/n of a slot, where n is an integer. However, the transmission duration of each of the beams in the beam sweeping block may not be per slot or per subframe. In other words, the transmission duration of each of the beams may be of an arbitrary symbol length.

FIG. 45 illustrates an example where the transmission duration of each of the beams in the beam sweeping block is of an arbitrary symbol length. In FIG. 45, a transmission duration of 1 beam consists of 4 symbols, and 7 beams are transmitted in 2 subframes. The SS is mapped to the fourth symbol to be transmitted via each beam.

Here, each of the beams differs in which symbol of a slot or a subframe the SS is transmitted. Thus, predetermining in which symbol of a slot or a subframe the SS is transmitted is complicated.

Although the slot number and the subframe number can be identified using the method disclosed in the thirteenth embodiment, the symbol number cannot be determined. This may cause a problem with incapability to determine the slot timing and the subframe timing.

The second modification will disclose a method for solving such a problem.

One synchronization signal is transmitted for each beam in a beam sweeping block. Here, the synchronization signal will be an SS1. The n symbols are used to transmit one beam, where n is an integer. The SS1 is transmitted in the m-th symbol of the beam, where m is an integer. The beam sweeping block is transmitted from the beginning of the a-th slot, where a is an integer. Here, 1 slot consists of k symbols, where k is an integer. n, m, a, and k may be predetermined. A signal with a different sequence is used for each beam as the SS1.

The UE can recognize the beam number upon receipt of the SS1 of the beam to be transmitted in the beam area where its own UE exists.

The UE that has recognized the beam number derives the symbol number and the slot number using n, m, a, and k.

The symbol number and the slot number may be derived using, for example, the following Equation (1) and Equation (2), respectively.

Symbol number=mod($n$×(beam number−1)+($m$−1),$k$)   (1)

Slot number=$a$−1+int(($n$×(beam number−1)+($m$−1))/$k$)+1   (2)

Here, the symbol numbers in the slot range from 0 to k−1. In other words, the symbol number of the first symbol in the slot is 0. The symbol number of the k-th symbol in the slot is k−1.

Upon receipt of the SS1, the UE can recognize the symbol number, the slot number, and the subframe number. The UE can also recognize the slot timing and the subframe timing. Thus, the UE can recognize with which timing the slot number and the subframe number used in the various control messages are transmitted by receiving the one synchronization signal and deriving the slot number and the subframe number.

The aforementioned method enables the UE that has received the synchronization signal to recognize the beam number, using the sequence of the synchronization signal that differs in each beam.

Without being limited by this method, the UE has only to recognize the beam number by receiving one beam in a beam sweeping block. For example, a sequence differing in each beam may be used as a sequence of the RS to be transmitted in the beam. Upon receipt of the RS for each beam, the UE can recognize the beam number. Thus, the slot number and the subframe number can be derived with application of the aforementioned method using the recognized beam number.

Although the subframe consists of two slots in the aforementioned method, the subframe may consist of any number of slots. The number of slots (c) included in a subframe may be predetermined, where c is an integer. The subframe number can be derived from the derived slot number.

What is disclosed is that the beam sweeping block is transmitted from the beginning of the a-th slot in the aforementioned method. As an alternative method, the beam sweeping block may be transmitted from the beginning of the b-th subframe, where b is an integer. b may be predetermined. The UE that has recognized the beam number may derive the symbol number and the slot number using n, m, b, c, and k.

For example, a may be derived from the following Equation (3) using b that is the subframe number and c that is the number of slots in the subframe, and substituted into Equation (2).

$$a=(b-1)\times c+1 \qquad (3)$$

When no slot is included, the result of Equation (2) derived assuming that the number of slots in the subframe is 1 may be used as the subframe number.

Consequently, even when in which symbol of the slot or the subframe the SS is transmitted differs in each beam, the symbol number, the slot number, and the subframe number in which the SS is to be transmitted can be identified.

Although the methods disclosed from the fourth embodiment to the second modification of the thirteenth embodiment are directed to the eNBs or the cells, they may be applied when a beam sweeping block is configured by the RRH or the RRU. Alternatively, they may be applied when the eNBs are divided into a Central Unit (CU) and Distributed Units (DUs) and a beam sweeping block is configured by the DUs.

The embodiments and the modifications are merely illustrations of the present invention, and can be freely combined within the scope of the present invention. Any constituent elements of the embodiments and the modifications can be appropriately modified or omitted.

3GPP is discussing the scheduling per slot or per mini-slot smaller than the slot. The subframe in the Description may be the slot or the mini-slot.

While the invention has been described in detail, the foregoing description is in all aspects illustrative and not restrictive. It is therefore understood that numerous modifications and variations can be devised without departing from the scope of the invention.

DESCRIPTION OF REFERENCES 800, 801 first downlink signal (DL #1), 802, 803 second downlink signal (DL #2), 804, 805 first uplink signal (UL #1), 806, 807 second uplink signal (UL #2), 808 first gap duration (Gap #1), 809 second gap duration (Gap #2).

The invention claimed is:

1. A communication system configured to support a self-contained subframe that includes both of downlink communication and uplink communication and in which the uplink communication includes a response to the downlink communication, comprising:
   a user apparatus; and
   a base station configured to wirelessly communicate with the user apparatus,
   wherein, with respect to the self-contained subframe, the base station configures a gap from the downlink communication to the uplink communication, and configures downlink communication length and uplink communication length in symbols,
   the base station transmits, to the user apparatus, a first list for the downlink communication length and a second list for the uplink communication length,
   the self-contained subframe includes downlink data, downlink scheduling information including an identifier for selecting the downlink communication length from the first list, and uplink scheduling information including an identifier for selecting the uplink communication length from the second list, and
   the base station transmits, to the user apparatus, information indicating a delay time from notification of the downlink scheduling information to reception of the downlink data.

2. The communication system according to claim 1, wherein the uplink communication includes an Ack/Nack for downlink data of the downlink communication in the self-contained subframe.

3. The communication system according to claim 1, wherein the user apparatus transmits, to the base station, capability information related to demodulation/decoding.

4. The communication system according to claim 3, wherein the user apparatus transmits, to the base station, the capability information when the user apparatus receives capability enquiry transmitted from the base station by RRC signalling.

5. The communication system according to claim 1, wherein, with respect to the gap in the self-contained subframe, the base station applies a semi-static configuration using RRC dedicated signalling and a dynamic configuration using L1/L2 signalling.

6. The communication system according to claim 1, wherein, with respect to the gap in the self-contained subframe, the base station notifies the user apparatus of timing to reflect a configuration of the gap.

7. The communication system according to claim 1, wherein the base station transmits information related to scheduling over multiple subframes to the user apparatus using RRC dedicated signalling or L1/L2 signalling.

8. The communication system according to claim 1, wherein the gap of the self-contained subframe is configured in Frequency Division Duplex.

9. The communication system according to claim 1, wherein the base station transmits, to the user apparatus, a parameter related to whether or not the self-contained subframe is used.

10. The communication system according to claim 1, wherein the base station transmits, to the user apparatus, a configuration of a gap for a case in which the self-contained subframe is not used.

11. The communication system according to claim 1, further configured to support a plurality of self-contained subframe types including a first self-contained subframe in which downlink data and an Ack/Nack for the downlink data are transmitted, and a second self-contained subframe in which an uplink scheduling grant and uplink data are transmitted,
    wherein gaps are respectively configured for the first self-contained subframe and the second self-contained subframe.

12. The communication system according to claim 11, wherein the base station separately or simultaneously transmits, to the user apparatus, identification information corresponding to a self-contained subframe type and a gap configuration.

13. The communication system according to claim 11, wherein the base station transmits configurations of the gaps for the first self-contained subframe and the second self-contained subframe to the user apparatus using RRC signalling and L1/L2 signalling.

14. The communication system according to claim 11, wherein the base station transmits identification information corresponding to a self-contained subframe type using L1/L2 signalling for each subframe.

15. The communication system according to claim 1, wherein the base station allocates a different frequency to the user apparatus for each symbol.

16. The communication system according to claim 1, wherein the base station obtains information of a neighbouring base station using an inter-base station interface, the information including at least any of an identifier of the neighbouring base station, a frequency used by the neighbouring base station, and downlink transmission timing of the neighbouring base station.

17. A base station in a communication system configured to support a self-contained subframe that includes both of downlink communication and uplink communication and in which the uplink communication includes a response to the downlink communication, the base station comprising:
    a processor configured to wirelessly communicate with a user apparatus of the communication system,
    wherein, with respect to the self-contained subframe, the base station configures a gap from the downlink communication to the uplink communication, and configures downlink communication length and uplink communication length in symbols,
    the base station transmits, to the user apparatus, a first list for the downlink communication length and a second list for the uplink communication length,
    the self-contained subframe includes downlink data, downlink scheduling information including an identifier for selecting the downlink communication length from the first list, and uplink scheduling information including an identifier for selecting the uplink communication length from the second list, and
    the base station transmits, to the user apparatus, information indicating a delay time from notification of the downlink scheduling information to reception of the downlink data.

18. A user apparatus in a communication system configured to support a self-contained subframe that includes both of downlink communication and uplink communication and in which the uplink communication includes a response to the downlink communication, the user apparatus comprising:
- a processor configured to wirelessly communicate with a base station of the communication system,
- wherein, with respect to the self-contained subframe, the user apparatus wirelessly communicates based on a gap from the downlink communication to the uplink communication configured by the base station, and downlink communication length and uplink communication length configured in symbols by the base station,
- the user apparatus receives, from the base station, a first list for the downlink communication length and a second list for the uplink communication length,
- the self-contained subframe includes downlink data, downlink scheduling information including an identifier for selecting the downlink communication length from the first list, and uplink scheduling information including an identifier for selecting the uplink communication length from the second list, and
- the user apparatus receives, from the base station, information indicating a delay time from notification of the downlink scheduling information to reception of the downlink data.

* * * * *